United States Patent
Washisu

(10) Patent No.: US 6,393,215 B1
(45) Date of Patent: *May 21, 2002

(54) CONTROL APPARATUS FOR IMAGE BLUR CORRECTION

(75) Inventor: Koichi Washisu, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/468,863

(22) Filed: Dec. 21, 1999

(30) Foreign Application Priority Data

Dec. 24, 1998 (JP) .......................................... 10-366288
Dec. 24, 1998 (JP) .......................................... 10-366289
Dec. 24, 1998 (JP) .......................................... 10-366291

(51) Int. Cl.$^7$ .............................................. G03B 17/00
(52) U.S. Cl. ....................................................... 396/52
(58) Field of Search .............................. 396/55, 52, 53

(56) References Cited

U.S. PATENT DOCUMENTS

| | | | |
|---|---|---|---|
| 4,869,108 A | 9/1989 | Washisu ........................ 73/517 |
| 4,965,619 A | 10/1990 | Shikaumi et al. ............ 354/410 |
| 5,020,369 A | 6/1991 | Washisu et al. ................ 73/517 |
| 5,402,202 A | 3/1995 | Washisu et al. .............. 354/435 |
| 5,534,967 A | * 7/1996 | Matsuzawa .................... 396/52 |
| 5,608,703 A | 3/1997 | Washisu ....................... 369/55 |
| 5,617,176 A | * 4/1997 | Matsuzawa et al. ........... 396/55 |
| 5,774,266 A | 6/1998 | Otani et al. .................. 359/554 |
| 5,835,799 A | 11/1998 | Washisu ....................... 396/55 |
| 5,940,630 A | 8/1999 | Washisu ....................... 396/55 |
| 5,974,269 A | 10/1999 | Sato et al. ..................... 396/55 |
| 5,978,599 A | * 11/1999 | Wakabayashi et al. ........ 396/55 |
| 6,035,131 A | 3/2000 | Washisu ....................... 396/55 |
| 6,067,418 A | * 5/2000 | Sato ............................. 396/52 |
| 6,263,161 B1 | 7/2001 | Washisu ....................... 396/50 |

* cited by examiner

Primary Examiner—W. B. Perkey
(74) Attorney, Agent, or Firm—Fitzpatrick, Cella, Harper & Scinto

(57) ABSTRACT

A control apparatus for image blur correction is applied to an image blur correction device. The control apparatus comprises a microcomputer which forms a driving signal for driving the image blur correction device in accordance with a signal corresponding to an output of a vibration detection sensor, an offset signal removing circuit which removes an offset signal from the output of the vibration detection sensor before the signal corresponding to the output of the vibration detection sensor is entered into the microcomputer and which supplies a signal resulting from the removal of the offset signal, as the signal used for the formation of the driving signal by the microcomputer, to the microcomputer, a removal offset value of the offset signal removing circuit being set variably, a removal offset value setting circuit which sets the removal offset value for the offset signal removing circuit and which thereafter makes the offset signal removing circuit carry out a removal operation based on the removal offset value thus set and an instruction device (the functional part of the microcomputer, etc.) which gives an instruction for carrying out a setting operation of the removal offset value, to the removal offset value setting circuit, the instruction device giving the instruction for carrying out the setting operation of the removal offset value even in a state in which the offset signal removing circuit has already executed the offset signal removal operation and is entering the signal resulting from the removal of the offset signal into the microcomputer.

4 Claims, 33 Drawing Sheets

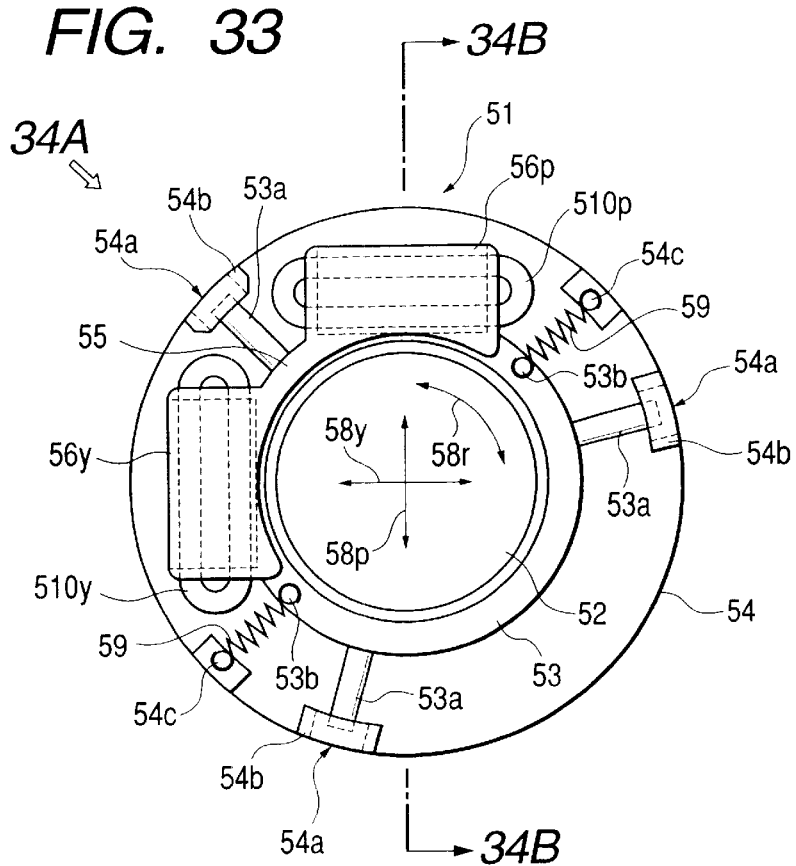
FIG. 33
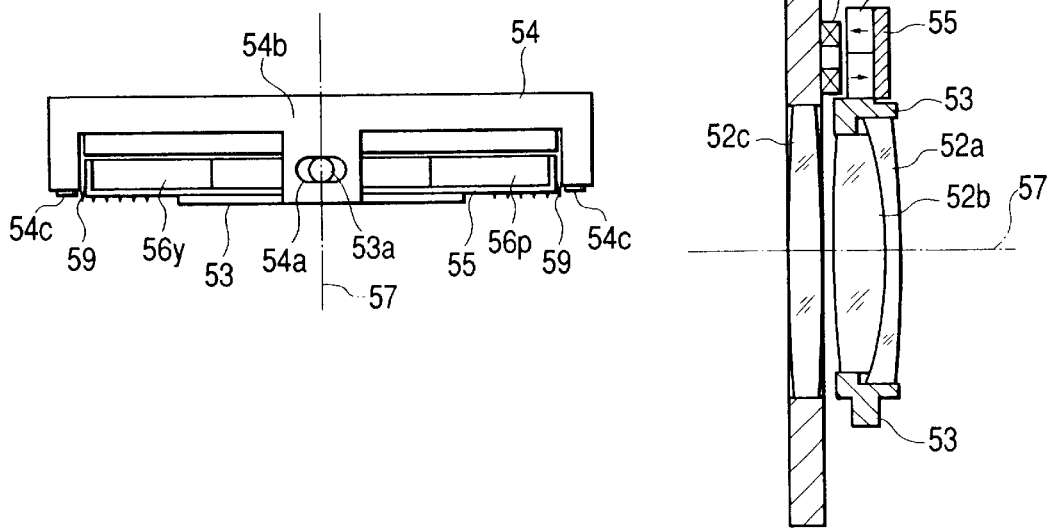
FIG. 34A
FIG. 34B

CONTROL APPARATUS FOR IMAGE BLUR CORRECTION

BACKGROUND OF THE INVENTION

1. Field of the Invention

The present invention relates to a control apparatus for image blur correction, which is applied to image blur correction devices for correcting an image blur occurring in optical equipment such as cameras and the like.

2. Related Background Art

In the cameras which are available presently, the important works for photography, including determination of exposure, focusing, etc., all are automated, and thus even those inexperienced in manipulation of camera have only a minimal possibility of causing a failure of photography.

In recent years research also has been conducted on systems for preventing hand vibration exerted on the camera and there are few factors to induce a photographer's mistake in photography.

A system for preventing the hand vibration will be described below briefly.

The hand vibration of camera during photography is normally vibration in the frequency range of 1 Hz to 10 Hz, and a basic idea for permitting a photograph without an image blur to be taken even with such hand vibration upon release of the shutter is to detect vibration of the camera due to the above hand vibration and displace a correction lens according to a detected value thereof. For taking a photograph without an image blur even under the camera vibration, therefore, the first requirement is to accurately detect the vibration of the camera and the second requirement is to correct variation of the optical axis due to the hand vibration.

The detection of this vibration (camera vibration) can be implemented theoretically by providing the camera with a vibration detection device which is comprised of a vibration detection sensor for detecting acceleration, angular acceleration, angular velocity, angular displacement, or the like, and a calculation portion for calculating an output therefrom in order to correct the camera vibration on necessary occasions. Then the image blur is restrained by driving a correction means which decenters the photographing optical axis, based on this detection information.

FIG. 30 is a perspective view of appearance of a compact camera having the blur prevention system, which has the function of effecting the vibration correction for vertical vibration and horizontal vibration of camera indicated by arrows 42p, 42y with respect to the optical axis 41.

In the camera body 43, reference symbol 43a designates a shutter release button, 43b a mode dial (including the main switch), 43c a retractable flash (strobe), and 43d a finder port.

FIG. 31 is a perspective view to show the internal structure of the camera illustrated in FIG. 30. Reference numeral 44 denotes the camera body, 51 the correction means, 52 a correction lens, and 53 a support frame which is arranged to freely drive the correction lens 52 in directions 58p, 58y in the figure to correct the vibration in the directions of the arrows 42p, 42y of FIG. 30 and which will be detailed hereinafter. Reference symbols 45p, 45y represent vibration detection devices such as angular velocity sensors, angular acceleration sensors, or the like, which detect the vibration about the arrows 46p, 46y, respectively.

An output from each of the vibration detection devices 45p, 45y is converted into a drive target value of the correction means 51 through a calculation device 47p or 47y, described hereinafter, and the target value is entered into a corresponding coil of the correction means 51 to effect the blur correction. Reference symbol 54 indicates a base plate, 56p and 56y permanent magnets, and 510p and 510y coils.

FIG. 32 is a block diagram to show the details of the above-stated calculation devices 47p, 47y. Since these devices have like structure, the figure will be explained using only the calculation device 47p.

The calculation device 47p is composed of a DC cut filter 48p, a low pass filter 49p, an analog-to-digital conversion circuit (hereinafter referred to as an A/D conversion circuit) 410p, a driving device 419p, and a camera microcomputer 411 indicated by a dashed line, which are enclosed in a chain line. The camera microcomputer 411 is composed of a memory circuit 412p, a differential circuit 413p, a DC cut filter 414p, an integration circuit 415p, a memory circuit 416p, a differential circuit 417p, and a PWM duty variation circuit 418p.

In this case, the vibration detection device 45p is a vibration gyro which detects the angular velocity of vibration of the camera. The vibration gyro is driven in synchronization with on of the main switch of the camera to start detection of the angular velocity of vibration exerted on the camera.

An output signal of the vibration detection device 45p is supplied to the DC cut filter 48p constructed as an analog circuit, which cuts off the DC bias component superimposed on the output signal. This DC cut filter 48p has such a frequency characteristic as to cut the signal at the frequencies of not more than 0.1 Hz and does not affect the frequency band of the hand vibration ranging from 1 Hz to 10 Hz on the camera. This characteristic to cut the component at and below 0.1 Hz, however, poses a problem that approximately ten seconds are necessary for completely having cut the DC component since input of the vibration signal from the vibration detection device 45p. For this reason, the time constant of the DC cut filter 48p is set to a small value (for example, such a characteristic as to cut the signal at the frequencies of not more than 10 Hz), for example, up to 0.1 second after on of the main switch of the camera, whereby the DC component is cut off in the short time of about 0.1 second. Thereafter, the time constant is increased to a large value (such a characteristic as to cut the signal only at the frequencies of not more than 0.1 Hz) in order to prevent the DC cut filter 48p from degrading the angular velocity signal of vibration.

An output signal from the DC cut filter 48p is supplied to the low pass filter 49p constructed as an analog circuit, which properly amplifies the output signal so as to match it with resolving power of the A/D conversion circuit 410p and which cuts noise of high frequencies superimposed on the angular velocity signal of vibration. This is for avoiding occurrence of a read error due to the noise in the angular velocity signal of vibration, in sampling by the A/D conversion circuit 410p when the angular velocity signal of vibration is entered into the camera microcomputer 411. The output signal from the low pass filter 49p is sampled by the A/D conversion circuit 410p to be read into the camera microcomputer 411.

Although the DC cut filter 48p has cut the DC bias component, the amplification thereafter by the low pass filter 49p again causes the DC bias component to be superimposed on the angular velocity signal of vibration. Therefore, the DC component has to be cut again inside the camera microcomputer 411.

The cut of the DC component is carried out, for example, by storing the angular velocity signal of vibration sampled 0.2 second after on of the main switch of the camera, in the memory circuit 412p and obtaining a difference between the thus stored value and the angular velocity signal of vibration by the differential circuit 413p. Since this operation permits only rough cut of DC (or since the angular velocity signal of vibration stored 0.2 second after on of the main switch of the camera also includes the actual hand vibration as well as the DC component), adequate DC cut is effected by the DC cut filter 414p constructed of a digital filter in the subsequent stage. The time constant of this DC cut filter 414p is also variable, similar to the analog DC cut filter 48p, and the time constant is gradually increased during the period of 0.2 second from 0.2 second after on of the main switch of the camera. Specifically, this DC cut filter 414p has such a filter characteristic as to cut the signal at the frequencies of not more than 10 Hz when 0.2 second has passed since on of the main switch, and thereafter the frequencies to be cut by the filter are lowered every 50 msec in the descending order of 5 Hz, 1 Hz, 0.5 Hz, and 0.2 Hz.

There are, however, cases in which it is not preferable to vary the time constant at the expense of time, because there is a high possibility of carrying out photography immediately after the photographer half depresses the release button 43a (to turn sw1 on) to initiate photometry and distance measurement during the above operation. In such cases the variation of the time constant is suspended on the way according to the photographing conditions. For example, in the case wherein the photographing shutter speed is found to be 1/60 from the photometry result and the photographing focal length is 150 mm, because the accuracy of blur prevention does not have to be so high, the variation of time constant of the DC cut filter 414p is completed at the time when the characteristic of cutting the signal at the frequencies of not more than 0.5 Hz is achieved. (A variation amount of the time constant is controlled by the product of the shutter speed and the photographing focal length.) This can reduce the time for the variation of time constant, so as to give a higher priority to a shutter chance. It is a matter of course that in cases of faster shutter speed or shorter focal length, the variation of time constant is completed at the time when the characteristic of the DC cut filter 414p reaches the characteristic of cutting the signal at the frequencies of not more than 1 Hz and that in cases of slower shutter speed or longer focal length, photography is inhibited until the variation of time constant is accomplished up to the last.

The integration circuit 415p starts integrating the output signal of the DC cut filter 414p in response to the half depression (on of sw1) of the release button 43a of the camera to convert the angular velocity signal to an angle signal. The integration circuit 415p, however, does not start the integral operation until the variation of time constant is completed in the above-stated cases wherein the variation of time constant of the DC cut filter 414p is not complete yet. Although not illustrated in FIG. 32, the angle signal as an integral result is amplified properly according to information of focal length and object distance at that time to be converted so as to drive the correction means 51 by an appropriate amount according to the angle of vibration. (This correction has to be carried out, because the photographing optical system is changed upon zooming or focusing to vary a decentering amount of the optical axis against a driving amount of the correction means 51.)

When the release button 43a is depressed fully (to turn sw2 on), the correction means 51 starts being driven according to the angle signal of vibration. At this time, it is necessary to exercise care to avoid suddenly starting the blur correction operation of the correction means 51. The memory circuit 416p and differential circuit 417p are provided as countermeasures against it. The memory circuit 416p stores the vibration angle signal from the integration circuit 415p in synchronization with the full depression of the release button 43a (on of sw2). The differential circuit 417p gains a difference between the signal of the integration circuit 415p and the signal of the memory circuit 416p. Therefore, the two signal input into the differential circuit 417p are equal upon on of the switch sw2, so that the drive target signal from the differential circuit 417p to the correction means 51 is zero at that time. Thereafter, the output is increased continuously from zero. (The memory circuit 416p functions to define the integral signal upon on of the switch sw2 as the origin.) This prevents the correction means 51 from being driven suddenly.

The target value signal from the differential circuit 417p is supplied to the PWM duty variation circuit 418p. When voltage or current corresponding to the vibration angle is applied to the coil 510p (see FIG. 31) of the correction means 51, the correction lens 52 is driven corresponding to the vibration angle. A desired driving method is PWM driving in terms of power saving of driving power consumption of the correction means 51 and power of a driving transistor of the coil.

The PWM duty variation circuit 418p varies the coil driving duty according to the target value. For example, in the case of the PWM at the frequency of 20 kHz, the duty is "0" when the target value of the differential circuit 417p is "2048"; the duty "100" for the target value of "4096"; between these two target values duties are determined according to respective target values at equal intervals. The determination of duty is finely controlled, not only depending on the target value, but also depending on the photographing conditions of the camera at that time (the temperature, the posture of the camera, a state of power supply), so as to effect the blur correction with accuracy.

An output from the PWM duty variation circuit 418p is supplied to the known driving device 419p such as a PWM driver or the like, and an output of the driving device 419p is applied to the coil 510p (see FIG. 31) of the correction means 51 to perform the blur correction. The driving device 419p is turned on in synchronization with on of the switch sw2 and is turned off after completion of exposure on film. As long as the release button 43a is kept depressed half (with sw1 on) even after completion of exposure, the integration circuit 415p keeps on integrating, and the memory circuit 416p again stores a new integral output upon next on of the switch sw2.

When the half depression of the release button 43a is stopped, the integration circuit 415p terminates the integral of the output from the DC cut filter 414p and the integration circuit 415p is reset. The "reset" operation is to null all the information as a result of integration heretofore.

With off of the main switch the vibration detection device 45p is turned off to terminate the blur prevention sequence.

When the output signal of the integration circuit 415p becomes greater than a predetermined value, it is judged that panning of the camera was done and the time constant of the DC cut filter 414p is varied. For example, the characteristic of cutting the signal at the frequencies of not more than 0.2 Hz is varied to the characteristic of cutting the signal at the frequencies of not more than 1 Hz and the time constant is returned again to the original value in a predetermined time.

This time constant variation amount is also controlled by the magnitude of the output of the integration circuit 415p. Namely, when the output signal exceeds a first threshold, the characteristic of the DC cut filter 414p is set to the characteristic of cutting the signal at the frequencies of not more than 0.5 Hz; when the output signal exceeds a second threshold, the characteristic is set to the characteristic of cutting the signal at the frequencies of not more than 1 Hz; when the output signal exceeds a third threshold, the characteristic is set to the characteristic of cutting the signal at the frequencies of not more than 5 Hz.

When the output of the integration circuit 415p becomes very large, the integration circuit 415p is reset once in order to prevent saturation (overflow) in calculation.

In FIG. 32, the DC cut filter 414p is constructed to be activated 0.2 second after on of the main switch, but, without having to be limited to this, it may also be constructed to be activated with half depression of the release button 43a. In this case the integration circuit 415p is activated upon completion of the variation of time constant of the DC cut filter.

Further, the integration circuit 415p is also constructed to be activated with the half depression of the release button 43a (on of sw1), but it may also be constructed to be activated with the full depression (on of sw2) of the release button 43a. In this case, the memory circuit 416p and the differential circuit 417p can be excluded.

In FIG. 32 the DC cut filter 48p and the low pass filter 49p are set in the calculation device 47p, but it is needless to mention that these may be installed in the vibration detection device 45p.

FIGS. 33, 34A, 34B and 35 are drawings to show the details of the correction means 51. More specifically, FIG. 33 is a front elevation of the correction means 51, FIG. 34A a side view thereof from the direction of an arrow 34A of FIG. 33, FIG. 34B a sectional view thereof along a line 34B—34B of FIG. 33, and FIG. 35 a perspective view of the correction means 51.

In FIG. 33, the correction lens 52 is fixed to the support frame 53. (As illustrated in FIG. 34B, this correction lens 52 is composed of two lenses 52a, 52b fixed to the support frame 53, and a lens 52c fixed to the base plate 54 and thus composes a lens group of the photographing optical system.)

A yoke 55 of a ferromagnetic material is attached to the support frame 53 and permanent magnets 56p, 56y of neodymium or the like are fixed by attraction to the back surface of the yoke 55 in the same figure (as indicated by hidden outlines). Three pins 53a radially extending out of the support frame 53 are fit in respective elongate holes 54a provided in side walls 54b of the base plate 54.

As illustrated in FIGS. 34A and 35, each pair of pin 53a and elongate hole 54a engage with each other without play in the direction of the optical axis 57 of the correction lens 52, but the elongate hole 54a extends in the direction perpendicular to the optical axis 57. Therefore, the support frame 53 is restrained from moving in the direction of the optical axis 57 relative to the base plate 54 but can freely move in the plane perpendicular to the optical axis (along arrows 58p, 58y, 58r). However, the support frame 53 is elastically restrained from moving in each direction (58p, 58y, 58r), because tension springs 59 are stretched between hooks 53b on the support frame 53 and hooks 54c on the base plate as illustrated in FIG. 33.

Coils 510p, 510y (indicated by hidden outlines in part) are attached to the base plate 54 opposite to the permanent magnets 56p, 56y. The placement of the yoke 55, permanent magnet 56p, and coil 510p is as illustrated in FIG. 34B (and the permanent magnet 56y and the coil 510y are also arranged in the same placement). The support frame 53 is driven in the directions of the arrow 58p with supply of current to the coil 510p, and the support frame 53 is driven in the directions of the arrow 58y with supply of current to the coil 510y.

A driving amount of the support frame is determined by a balance between the spring constant of the tension springs 59 and the thrust generated from the relation between the coils 510p, 510y and the permanent magnets 56p, 56y in each direction. Namely, a decentering amount of the correction lens 52 can be controlled based on current amperes supplied to the coils 510p, 510y.

As explained with FIG. 32, the DC bias component superimposed on the signal is cut off from the signal of the vibration detection device 45p (45y) by the DC cut filter 48p constructed as an analog circuit. This DC cut filter 48p is constructed in structure composed of an operational amplifier 420p, a capacitor 421p, resistors 422p, 423p, and a switch 424p, as illustrated in FIG. 36. (The DC cut filter of the vibration detection device 45y is also constructed in like structure.) For setting the characteristic of this DC cut filter 48p to the characteristic of cutting the frequencies of not more than 0.1 Hz, for example, the capacitor 421p is one with the capacitance of 10 $\mu$F and the resistor 422p is one with the resistance of 160 k$\Omega$.

Let us suppose here that the resistance of the resistor 423p is 1.6 k$\Omega$, for example. Then this DC cut filter 48p cuts the frequencies of not more than 10 Hz when the switch 424p is closed. When the switch 424p is opened, the DC cut filter 48p cuts the frequencies of not more than 0.1 Hz. Therefore, the DC component can be cut off in the early stage by closing the switch 424p, for example, during the period of 0.1 second after on of the main switch of the camera, as described previously.

Incidentally, the capacitance 421p used in the circuit configuration of FIG. 36 is the one with the large capacitance, 10 $\mu$F, which posed the problems that the circuit became considerably large and that the cost also became high. This configuration of the DC cut filter 48p also poses a further problem of degrading the accuracy of blur prevention. This will be explained referring to FIGS. 37A and 37B.

FIGS. 37A and 37B are conceptual diagrams to show the frequency characteristics of the DC cut filter 48p of FIG. 36, in which a line segment 425 indicates the ratio (gain) of output signal to input signal of the DC cut filter 48p and in which a line segment 426 indicates the phase of output signal to input signal similarly.

Referring to the line segment 425, the gain decreases in the frequency range lower than the frequency of 0.1 Hz and it is seen from this fact that signal outputs below this frequency are attenuated, so as to achieve the DC cut characteristic.

For carrying out the blur prevention with accuracy, it is necessary to enter the signal of the vibration detection device into the correction means with minimizing phase shift, but it is seen from the line segment 426 that the phase advances, particularly, in the lower frequency range than the main band of the hand vibration ranging from 1 to 10 Hz, so as to fail to carry out the blur prevention with accuracy.

The blur prevention accuracy can be improved by changing the DC cut filter now cutting the frequencies of not more than 0.1 Hz, to the characteristic of cutting the frequencies below 0.01 Hz, for example. This change, however, requires increase of the capacitance of the capacitor 421p, for example, to 100 μF (or needs to increase the resistance of the resistor 422p to 1.6 MΩ), which is not preferable from aspects of circuit scale and noise.

As described above, the DC cut filters heretofore had the problems of requiring the large capacitor, being unsuitable for reduction of size and cost, and degrading the blur prevention accuracy.

SUMMARY OF THE INVENTION

One aspect of the invention is a control apparatus for image blur correction, which is applied to an image blur correction device, said control apparatus comprising:

a microcomputer which forms a driving signal for driving the image blur correction device in accordance with a signal corresponding to an output of a vibration detection sensor;

an offset signal removing circuit (1) which removes an offset signal from the output of the vibration detection sensor before the signal corresponding to the output of the vibration detection sensor is entered into the microcomputer and (2) which supplies a signal resulting from the removal of the offset signal, as the signal used for the formation of said driving signal by said microcomputer, to said microcomputer, (3) a removal offset value of said offset signal removing circuit being set variably;

a removal offset value setting circuit which sets said removal offset value for said offset signal removing circuit and which thereafter makes said offset signal removing circuit carry out a removal operation based on the removal offset value thus set; and instruction means which gives an instruction for carrying out a setting operation of said removal offset value, to said removal offset value setting circuit, said instruction means giving the instruction for carrying out the setting operation of the removal offset value even in a state in which said offset signal removing circuit has already executed said offset signal removal operation and is entering said signal resulting from the removal of the offset signal into said microcomputer.

This allows the setting operation of the removal offset value to be carried out again in the state in which the offset signal removing circuit has executed the offset signal removal operation and is entering the signal resulting from the removal of the offset signal into the microcomputer, thereby realizing more accurate image blur correction control.

BRIEF DESCRIPTION OF THE DRAWINGS

FIG. 33 is a front elevation of the correction means illustrated in FIG. 31;

FIGS. 34A and 34B are a side view and a sectional view, respectively, of the correction means illustrated in FIG. 31;

DETAILED DESCRIPTION OF THE PREFERRED EMBODIMENTS

The present invention will be described in detail on the basis of the embodiments thereof illustrated.

Figure 1:
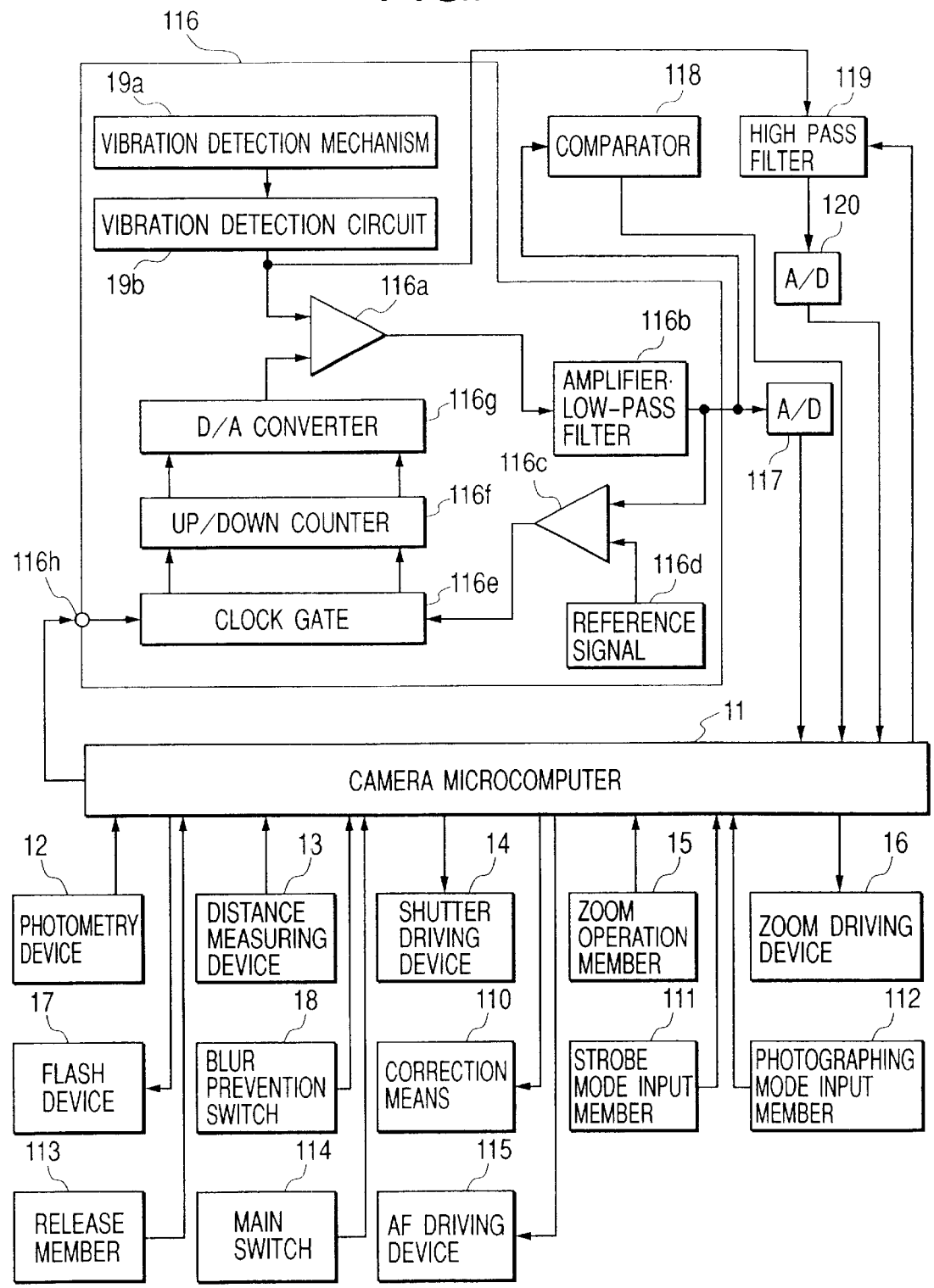
FIG. 1 is a block diagram to show the circuit structure of the main part of the camera according to the first embodiment of the present invention.

FIG. 1 is a block diagram to show the circuit structure of the main part of the camera according to the first embodiment of the present invention, in which the other components of the camera are omitted for simplicity of the description.

Figure 32:
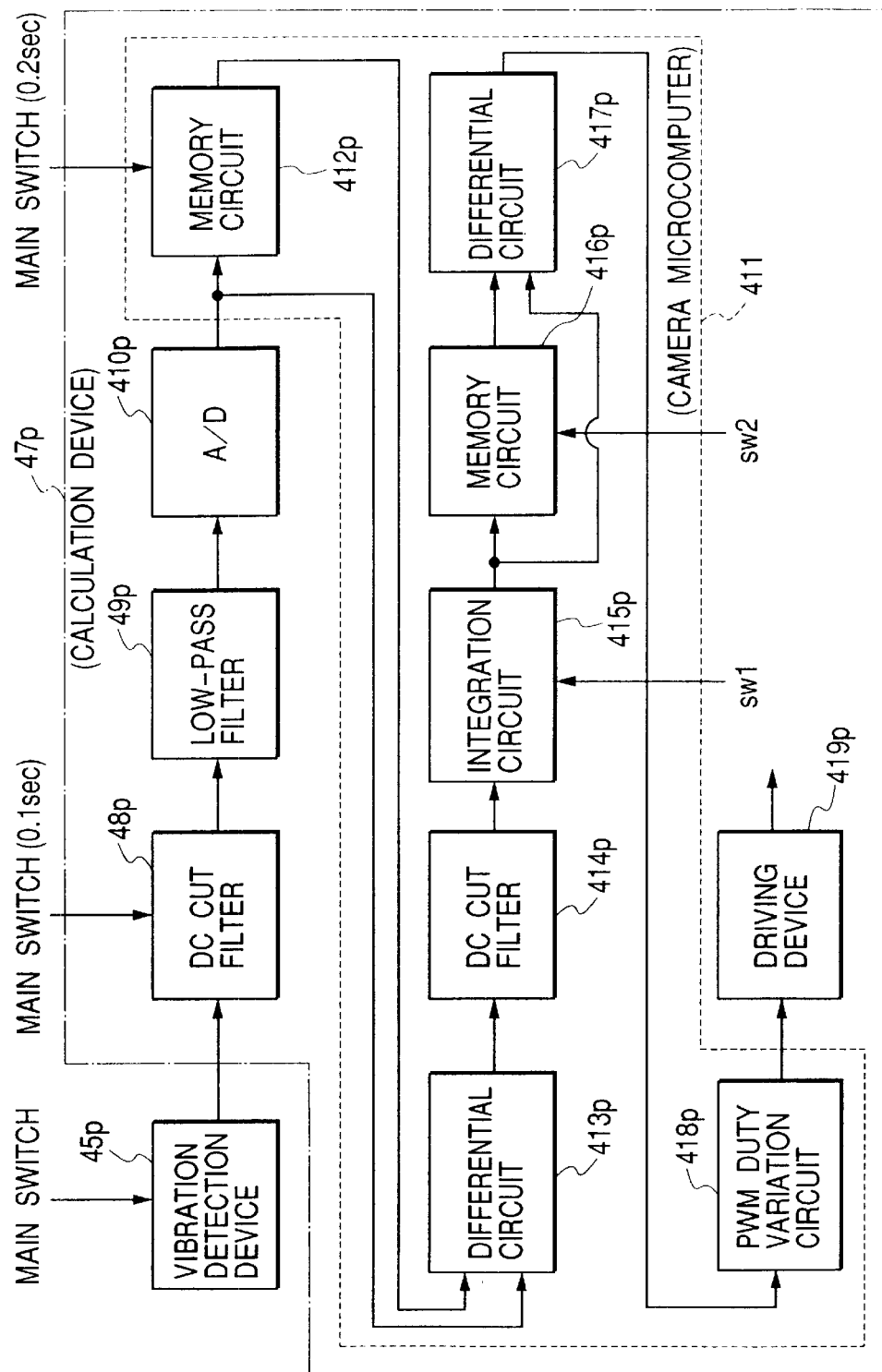
FIG. 32 is a block diagram to show the control circuit system of the correction means illustrated in FIG. 31.
Figure 35:
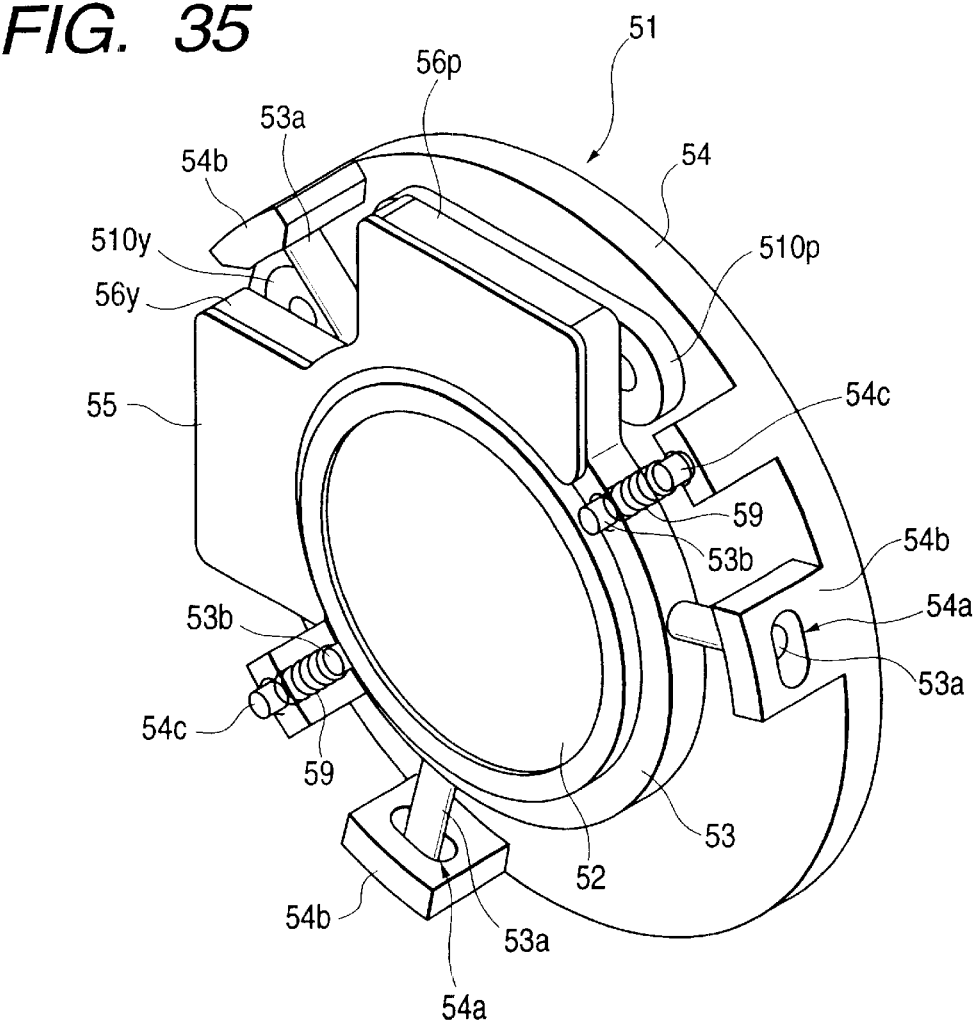
FIG. 35 is a perspective view of the correction means illustrated in FIG. 31.

In FIG. 1, when a signal from the main switch 114 is entered into the camera microcomputer 11 having the structure similar to that of the camera microcomputer 411 of FIG. 32, the camera microcomputer 11 feeds a photographing lens barrel from a collapsed state to a photographable state of the optical system and the lens barrier is opened at the same time. At this time, the vibration detection device 19, which is comprised of a vibration detection mechanism 19a and a vibration detection circuit 19b, is also activated.

A photographing mode selected by the photographer is supplied from a photographing mode input member 112 into the camera microcomputer 11. The photographing mode is selected, for example, from a sports mode suitable for photography of an object moving around, a portrait mode suitable for photography of a person or people in a close-up state, a macro mode suitable for photography of an object in close proximity, and a night view mode suitable for photography of night views. A strobe mode is entered from a strobe mode input member 111 into the camera microcomputer 11. The strobe mode is selected from a strobe-off mode for photography without use of the strobe, a strobe-on mode for photography with forced flashing of the strobe, and a strobe-auto mode in which whether the strobe should be on or off is controlled depending upon the luminance of the object, the direction of rays, or the like, and it is also possible to determine whether the red-eye relieving function is to be made active upon flashing of the strobe.

When the photographer manipulates a blur prevention switch 18 to determine whether the blur correction should be effected during photography, the information is entered into the camera microcomputer 11. When the photographer sets the camera and then manipulates a zoom operation member 15, a zoom signal is entered into the camera microcomputer 11 and the camera microcomputer 11 controls a zoom driving device 16 to vary the photographing focal length.

When the photographer then depresses a release member 113 as a shutter release button by a half stroke (to turn sw1 on) after the determination of the photographing focal length, a distance measuring device 13 measures the distance to the object at this timing and the distance information is entered into the camera microcomputer 11. Then the camera microcomputer 11 controls an AF driving device 115 to drive part or the whole of the photographing lens barrel, based on the measured distance information, to adjust the focus of the photographing optical system. At this time, a vibration signal from the vibration detection device 19 is also entered into the camera microcomputer 11, and the camera microcomputer 11 determines from the vibration state whether the camera is held by hands or is fixed on a tripod or on the ground.

Further, a photometry device 12 measures the luminance of the object with the half-stroke depression of the release member 113 (on of sw1) and the information is entered into the camera microcomputer 11. Then the camera microcomputer 11 calculates an exposure time and also determines whether the flash device 17 is to be used, based on the photographic information determined heretofore, including the luminance information, the speed and type of film, the use condition of the blur prevention system (comprised of the vibration detection device 19 and other signal processing system), the photographing focal length and brightness of the lens at that time, the photographing mode, selection of blur correction, the information of the distance to the object, the vibration information, and so on.

With the full-stroke depression of the release member 113 (on of sw2), the camera microcomputer 11 controls the correction means 110 (for example, having the structure of FIGS. 33, 34A, 34B and 35), based on the vibration signal from the vibration detection device 19, to start the blur correction. Thereafter, the camera microcomputer controls a shutter driving device 14 to execute exposure on the film and lights up the flash device 17 according to circumstances.

Numeral 116 designates a vibration detection unit composed of the vibration detection device consisting of the vibration detection mechanism 19a and the vibration detection circuit 19b, and an analog signal processing circuit (consisting of elements 116a to 116g described hereinafter) which removes the offset signal (hereinafter also referred to simply as offset) superimposed on the signal, the vibration detection unit 116 having the function of removing the offset and noise components from the vibration signal and outputting the result to an A/D converter 117. The A/D converter 117 samples the signal from the vibration detection unit 116 and sends the signal to the camera microcomputer 11.

The method of removing (or cutting) the offset signal of the vibration detection device 19 in the vibration detection unit 116 herein is one not using the filter with the frequency characteristics as described referring to FIG. 32 but making use of the following configuration.

A signal detected by the vibration detection mechanism 19a is processed in the vibration detection circuit 19b to become an angular velocity signal. Then a differential circuit 116a first subtracts an offset extract component described hereinafter from the angular velocity signal. Then an amplifier•low pass filter 116b cuts the noise superimposed on the signal from the output signal of the differential circuit 116a in like manner as the low pass filter 49p of FIG. 32 did, and amplifies the signal.

The output signal from the amplifier•low pass filter 116b is entered into the A/D converter 117 and also into a comparator 116c at the same time. This comparator 116c compares the signal from the amplifier•low pass filter 116b with a reference signal 116d. The reference signal 116d is approximately half of the power-supply voltage supplied to the vibration detection circuit 19b, and thus is a central value of the signal output range of the vibration detection device 19. This reference signal is also used as a reference in execution of the subsequent operations of DC removal by the digital filter and integration in the camera microcomputer 11.

The comparator 116c outputs a signal of "H" (which means a high level) to a clock gate 116e when the signal from the amplifier•low pass filter 116b is greater than the reference signal 116d (i.e., when a positive offset voltage is present). The comparator 116c outputs a signal of "L" (which means a low level) to the clock gate 116e when the signal from the amplifier•low pass filter 116b is smaller than the reference signal 116d (i.e., when a negative offset voltage is present). Receiving a clock signal from the camera microcomputer 11 via a reset terminal 116h, the clock gate 116e sends the signal from the comparator 116c to an up/down counter 116f. The up/down counter 116f counts one bit up every clock when the signal from the clock gate 116e is "H", and counts one bit down when the signal is "L".

A D/A converter 116g outputs an analog signal according to the output from the up/down counter 116f; for example, when the counter counts one bit up, the D/A converter 116g outputs +2 mV to the differential circuit 116a.

The above vibration detection circuit 19b, differential circuit 116a, amplifier * low pass filter 116b, comparator 116c, reference signal 116d, clock gate 116e, up/down counter 116f, and D/A converter 116g are integrated into a single circuit as an IC unit, and the vibration detection mechanism 19a is placed in the vicinity thereof, thus composing the compact vibration detection unit 116.

In the above structure, when the main switch 114 of the camera is first turned on, the vibration detection unit 116 is also activated to start the detection of the angular velocity of vibration by associated action of the vibration detection mechanism 19a and the vibration detection circuit 19b.

Let us suppose here for explanation's sake that the vibration including the hand vibration and the like is little. In this case, the output of the vibration detection device 19 varies as indicated by a waveform 121 of FIG. 2A from the start of the operation and becomes an offset $V_1$ finally. Here the signal varies greatly during the period from immediately after the start of the operation to the time To. When the vibration detection device 19 is, for example, a well-known vibration gyro, it is the variation of the signal before stabilization of the vibration. When the vibration detection device 19 is an angular acceleration sensor, it is the variation of the signal before stabilization of the circuit. For this reason, accurate DC removal would not be able to be made even if the DC offset removing operation were carried out during this period.

Therefore, during a period from the time $T_1$ (for example, 0.1 second) up to the time $T_2$ after the start of the operation of the vibration detection device 19, the camera microcomputer 11 keeps outputting clock signals via the reset terminal 116h to the clock gate 116e. Since the output of the differential circuit 116a is initially the signal offset $V_1$ at the time $T_1$, the comparator 116c outputs "H", so that the signal of the D/A converter 116g entered into the differential circuit 116a is increased every input of one clock into the clock gate 116e. Therefore, the offset component of the signal of the differential circuit 116a decreases with increase of clocks (as indicated by a waveform 122 of FIG. 2A) and in the final stage the signal of the differential circuit 116a varies alternately according to clocks in the range of the minimum resolving power (for example, 2 mV) of the D/A converter 116g (as indicated by an arrow 123 of FIG. 2A). The frequency of clocks is set, as illustrated in FIG. 2B, so that the frequency of clocks 124 is first high (first group 125) and the frequency is lowered thereafter (second group 126). Setting of the higher clock frequency permits rough offset removal to be executed first and setting of the lower clock frequency thereafter permits stable offset removal to be executed, thereby reducing the time necessary for the offset removal.

Since the camera microcomputer 11 stops the output of clock signal a t the time $T_2$, the signal outputted from the DA converter 116g to the differential circuit 116a is fixed to a signal at the end of the output of clock signal. This terminates the variation of the signal of the arrow 123 and the offset component decreases to $V_2$.

In the case of the conventional DC cut filter 48p described referring to FIG. 32, the final offset component can be made zero; whereas in the structure of the present embodiment there are possibly cases in which the small offset ($V_2$) remains. However, the offset signal will be removed by the digital operation of the DC cut filter 414p in the camera microcomputer 11, and thus there will arise no problem in terms of the blur prevention performance.

Described below is why the offset removal also has to be carried out in the vibration detection unit 116, though the offset removal is finally effected in the camera microcomputer 11.

Let us suppose that the offset removal were not carried out in the vibration detection unit 116. The output of the vibration detection device 19 is amplified with a considerably high gain before the A/D conversion and entry into the camera microcomputer 11. This is because the output of the hand vibration component detected by the vibration detection device 19 is very small. For that reason, the signal of the amplifier can become saturated because of the offset component superimposed on the signal. For preventing this saturation, the offset of the signal of the vibration detection device 19 needs to be decreased to a certain level before the amplification.

Figure 2A:
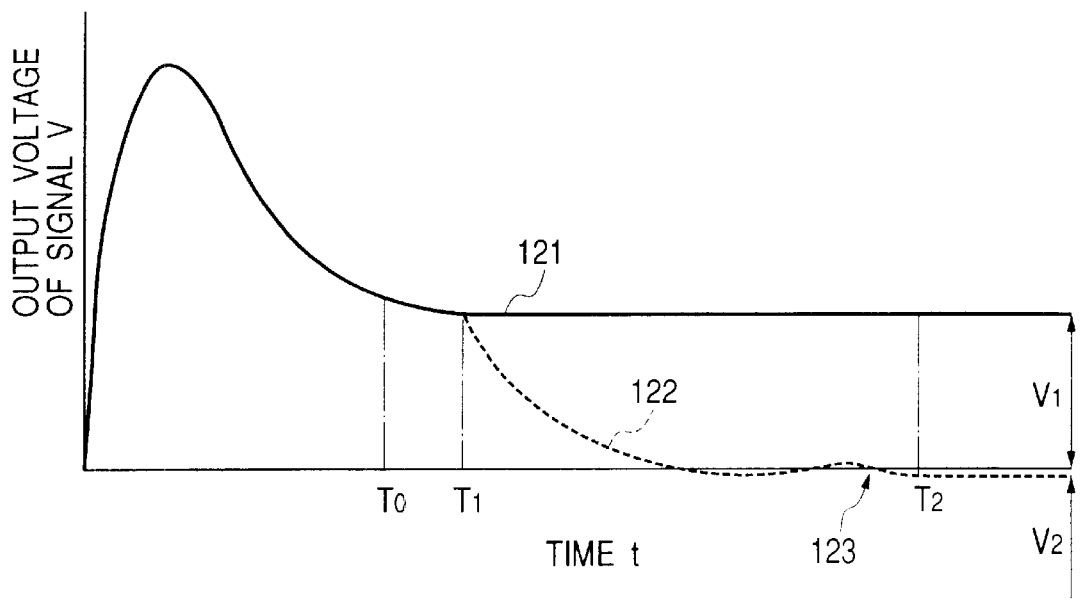
FIGS. 2A and 2B are drawings for explaining removal of the offset signal carried out in the initial stage of driving of the vibration detection device in each embodiment of the present invention.
Figure 2B:
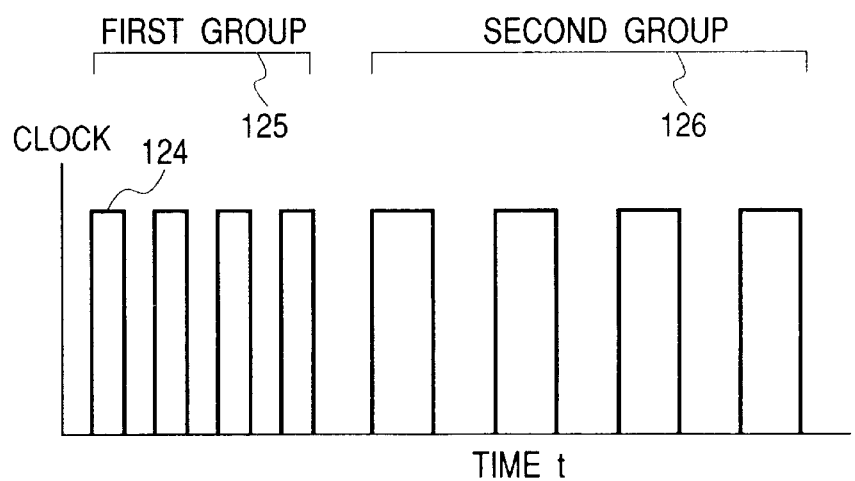

In the structure of FIG. 1, the offset component $V_1$ is decreased to $V_2$ as illustrated in FIG. 2A, whereby the signal of the amplifier•low pass filter 116b can be prevented from becoming saturated.

Figure 3:
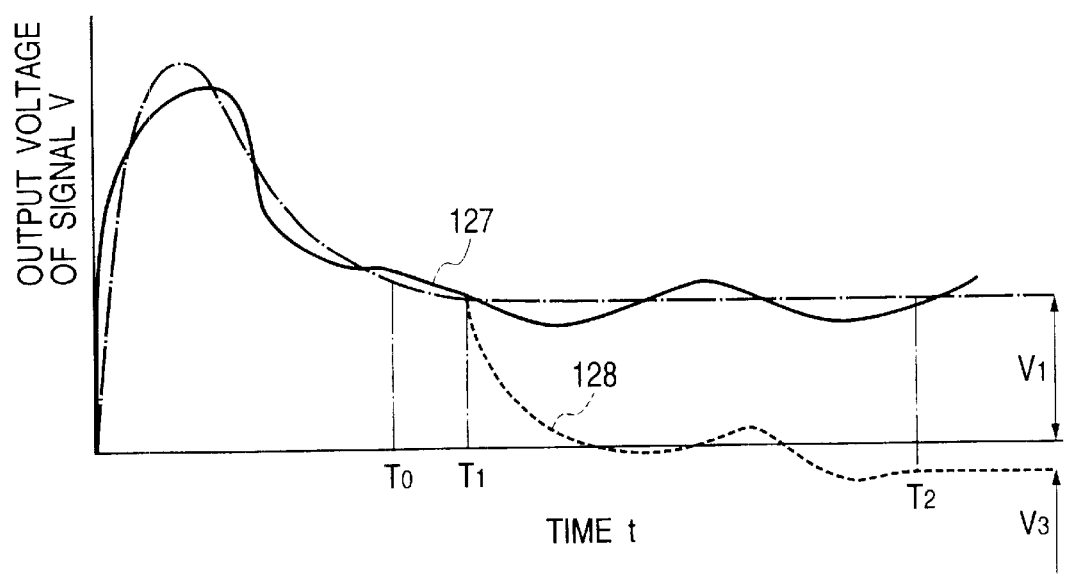
FIG. 3 is a diagram to show actual output waveforms of the vibration detection device of FIGS. 2A and 2B.

The actual output of the vibration detection device 19 is not so smooth as the waveform 121 of FIG. 2A, but it also includes the signal due to the hand vibration as indicated by a waveform 127 of FIG. 3. Therefore, the offset signal $V_3$ remains at a level of the hand vibration output at the time $T_2$ when the camera microcomputer 11 stops the output of clock (as indicated by a waveform 128). However, this offset is sufficiently smaller than the initial offset component $V_1$ and this can prevent the saturation of the signal on the amplifier•low pass filter 116b.

When the offset component is removed by the structure as described above, it can obviate the need for the large-capacitance capacitor as was used in the conventional DC cut filter and thus the circuit can be compactified considerably. Further, the structure of the present embodiment does not include the time constant circuit composed of the capacitor and resistors, and thus has the advantage that there is no possibility of the degradation of blur prevention accuracy due to the phase shift in the hand vibration frequency band.

In FIG. 1, the signal from the vibration detection unit 116 is also supplied to a comparator 118. The structure of the vibration detection unit 116 as described above can normally prevent the saturation of the amplifier•low pass filter 116b.

It is, however, conceivable that the output of the amplifier•low pass filter 116b becomes saturated or close to it in cases wherein correct offset removal is not effected because of superposition of noise on the output of the vibration detection circuit 19b upon extraction of the DC component or in cases wherein correct offset removal is not effected because of great vibration (for example, due to panning) exerted on the camera upon extraction of the DC component. The comparator 118 is given as countermeasures against such cases.

When the signal of the amplifier•low pass filter 116b is off a predetermined range or when the signal is off the predetermined range continuously for a fixed period (for example, when the signal is off the range of 1 V to 3 V for 0.5 second), the comparator 118 outputs a signal to the camera microcomputer 11. Then the camera microcomputer 11 receives the output from the comparator 118 and again outputs clock signals to the reset terminal 116h of the vibration detection unit 116 for a fixed time. By employing this structure, the offset removal operation can be executed again even when the amplifier•low pass filter 116b becomes close to saturation; therefore, the saturation can be avoided for sure.

FIG. 1 shows the configuration in which the comparator 118 is set outside the camera microcomputer 11, but, without having to be limited to it, any other configuration may also be adopted; for example, the comparator 118 can be omitted by employing such a configuration that clock signals are generated again when the signal subjected to A/D by the A/D converter 117 and read out by the camera microcomputer 11 is off a fixed range over a fixed time.

Figure 36:
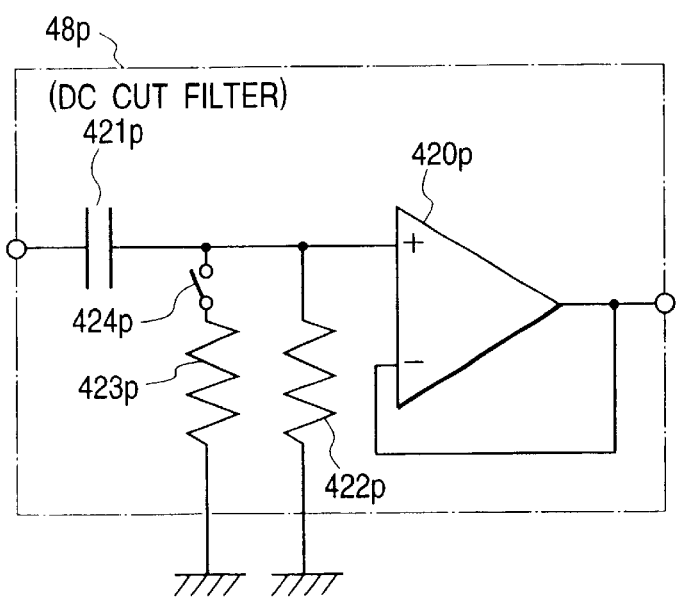
FIG. 36 is a circuit diagram to show the detailed structure of the DC cut filter illustrated in FIG. 31.
Figure 37A:
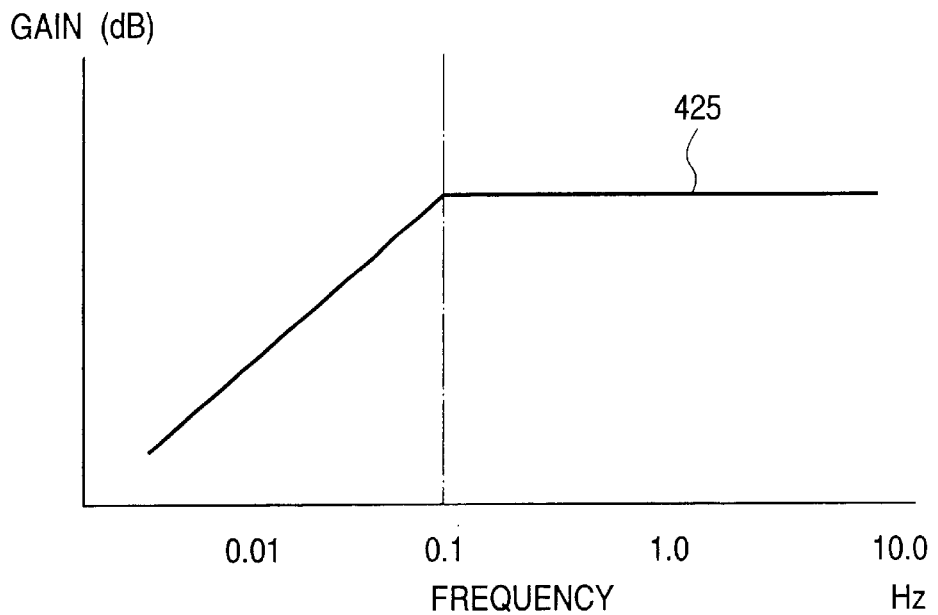
FIGS. 37A and 37B are drawings for explaining the frequency characteristics of the DC cut filter of FIG. 36.
Figure 37B:
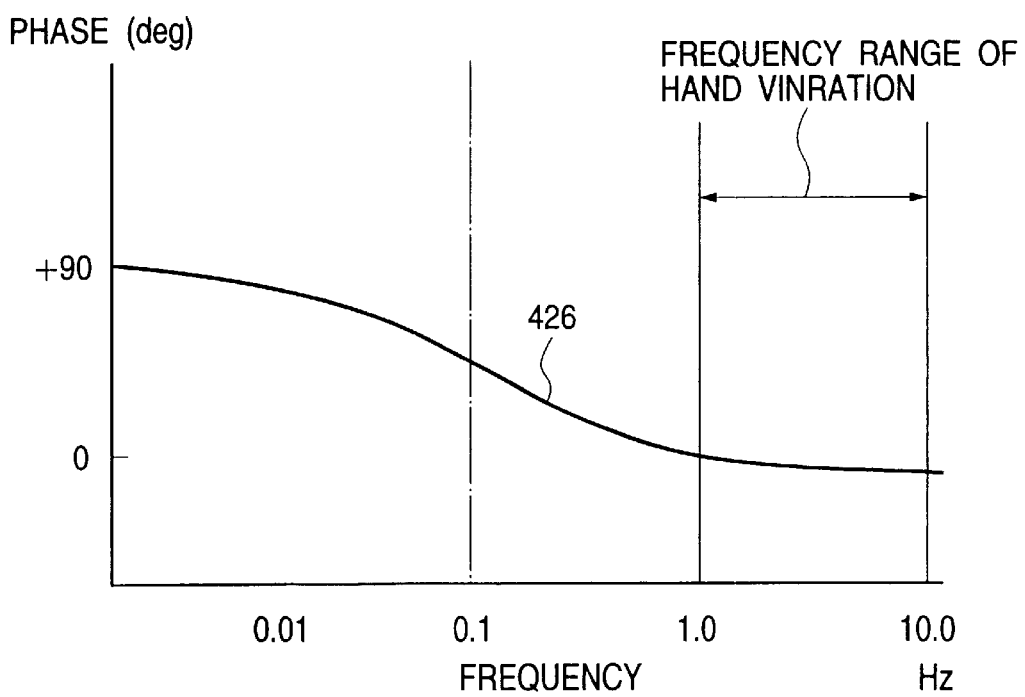

For carrying out the offset removal operation again with such a large offset as to induce the saturation of the signal as described above, the clock signals are such that the higher clock frequency is set first to effect the rough offset removal and the lower clock frequency is set next to effect the stable offset removal operation, as in the case illustrated in FIG. 2B. When the offset removal is executed in this structure, that eliminates the need for use of the analog circuit as illustrated in FIG. 36 and thus the whole control circuit can be made compact.

Further, the offset removal in this structure is free of the degradation (phase shift) of the frequency characteristics due to the operation thereof and thus has the advantage of capability of carrying out the accurate blur correction. On the other hand, the accuracy of the offset removal itself by the high pass filter method illustrated in FIG. 36 is superior to that by the above method. Therefore, there are cases in which the blur correction by the conventional method is better, for example, in execution of the blur correction over a long period than that by the above-described method.

A blur prevention system with high accuracy can thus be realized by giving a higher priority to the blur prevention accuracy over the compactification, also including the conventional high pass filter method, and selectively using either one of the two offset removing methods.

The vibration detection unit 116 of FIG. 1 is arranged to be able to also output the vibration signal (angular velocity output) from the vibration detection device 19 consisting of the vibration detection mechanism 19a and the vibration detection circuit 19b, which is the signal not subjected to the offset removal yet.

This is the part related to the feature of the present invention, which permits this vibration detection unit 116 to be used without any change in the blur prevention systems having been used heretofore (using the conventional signal without offset removal), which also permits the new blur prevention system to use the signal after the offset removal from the amplifier•low pass filter 116b, and which thus permits either one of the signal outputs to be used, thereby realizing the vibration detection unit with high general versatility.

The use in FIG. 1 involves an attempt to enhance the blur prevention accuracy by making use of the two signals, and the output from the vibration detection circuit 19b is supplied via the high pass filter 119 to the A/D converter 120 to be subjected to A/D conversion therein and a digital signal obtained is entered into the camera microcomputer 11. The high pass filter 119 is composed of the DC cut filter 48p (the circuit illustrated in FIG. 36) and the low pass filter 49, which were described referring to FIG. 32, and the camera microcomputer 11 supplies the signal for controlling the switch 424p illustrated in FIG. 36, to the high pass filter 119.

As described above, the camera microcomputer 11 accepts the signal through the amplifier•low pass filter 116b (hereinafter referred to as a first signal) and the signal through the high pass filter 119 (hereinafter referred to as a second signal) from the vibration detection unit 116. The former realizes the lower offset removal accuracy but the good frequency characteristics (small phase shift), whereas the latter realizes the higher offset removal accuracy but the slightly inferior frequency characteristics.

In the above structure, the correction means 110 is controlled by selectively using either one of the two outputs in the following manner in order to facilitate handling of the blur prevention system and in order to enhance the blur prevention accuracy.

The high pass filter 119 of FIG. 1 necessitates the predetermined time (for example, one second) because of its characteristics before the offset is removed sufficiently. The correction means 110 is thus forced to be controlled with the first signal during the period of the predetermined time after the start of the operation of the vibration detection unit 116 and the high pass filter 119. After a lapse of the predetermined time, either one of the first signal and the second signal is selected according to the condition of optical equipment in which the blur prevention system is mounted.

Long-seconds photography is often carried out when either the night view mode or the slow-synchro mode is selected by manipulation of the photographing mode input member 112 of FIG. 1.

The blur prevention system of the present embodiment integrates the angular velocity to obtain the angle information and controls the correction means 110, based thereon, as described referring to FIG. 32. During execution of the blur correction over long seconds as in such cases, unless the offset component superimposed on the vibration signal is removed sufficiently, the offset component is integrated with continuation of the blur correction, so as to cause deviation of the blur correction position.

Therefore, the correction means 110 is controlled using the second signal in the modes of long-seconds photography as in the night view mode. In the other modes where the photographing time is not so long, the first signal is selected to effect the blur correction in the state of good frequency characteristics.

In the normal photographing mode, if the exposure time is long, the second signal will be selected to control the correction means. When the shutter speed is ⅛ second, the camera microcomputer 11 selects the second signal.

In the normal photographing mode, when the photographing time is longer, for example, than 1/60 sec, the photographing time is fixed thereto and the strobe is lit up.

Therefore, there are no chances of the long-seconds photography. However, for example, in the case of cameras capable of automatically performing the long-seconds photography with off of the strobe, some measures are necessary for the long-seconds photography even in the normal photographing mode. In such cameras either one of the first signal and the second signal is selected depending upon the photographing time, to control the correction means.

Similarly, a factor to lengthen the photographing time is the speed of film; for example, a longer photographing time is necessary for the film of ISO100 than for the film of ISO400. When a film of low speed is loaded, the second signal is selected to control the correction means 110.

In such cameras as to permit the photographer to view the object through the taking lens as in the case of the single-lens reflex cameras, the blur correction is also carried out during preparation for photography (or during the half-stroke depression of the release member 113), thereby stabilizing the image on the finder to facilitate framing and enhance the distance measurement accuracy. In such cameras, the time of blur correction is longer in the period before photography than upon photography. Since the offset removal accuracy has to be higher during the long period of time of blur correction as described above, the second signal is selected to control the correction means.

However, the first signal having the good frequency characteristics is selected upon photography (after the full-stroke depression of the release member 113) to control the correction means 110, which enhances the blur prevention accuracy. It is a matter of course that the second signal is also selected to control the correction means 110 upon photography when the photography takes long seconds.

Figure 4:
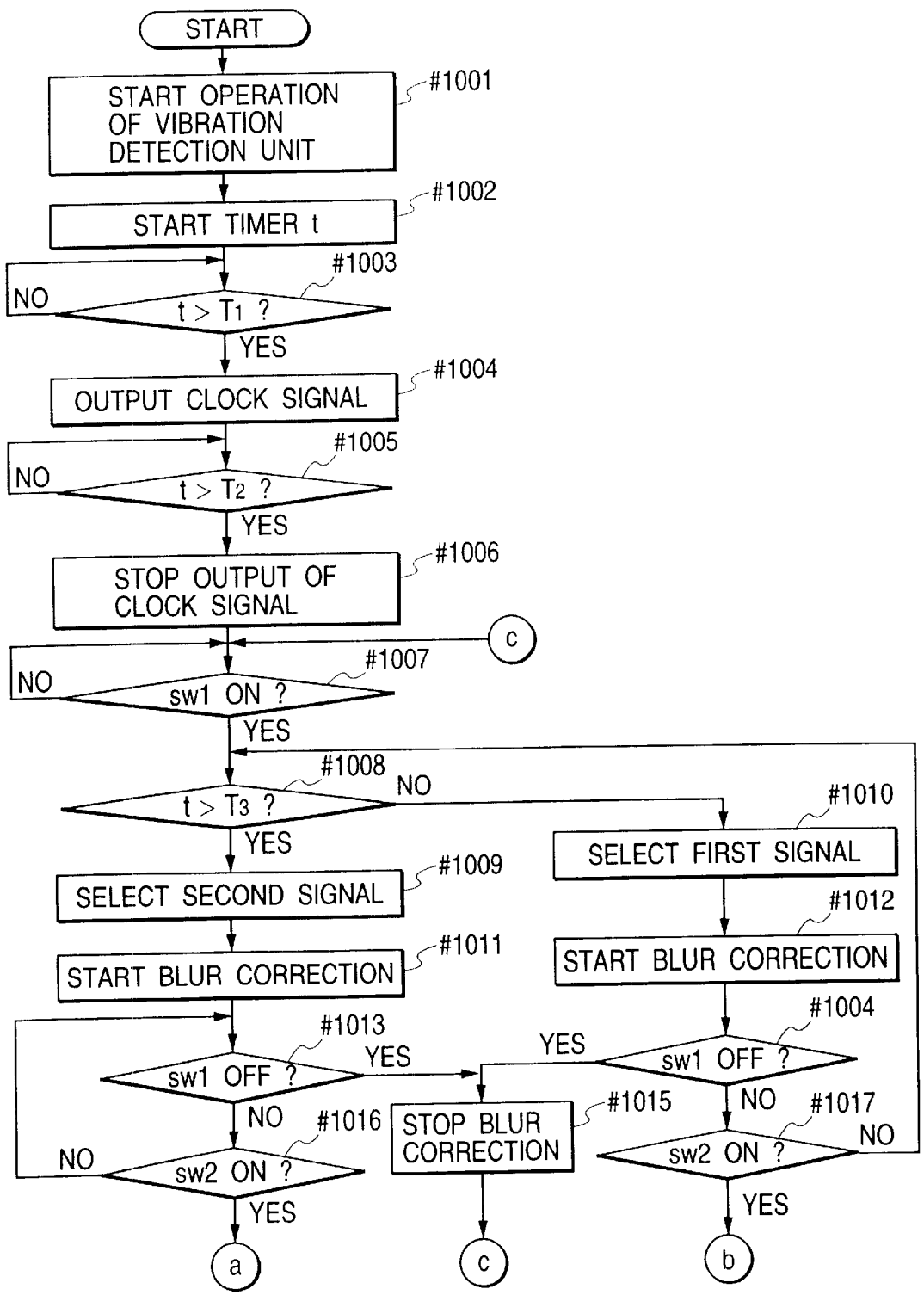
FIG. 4 is a flowchart to show part of the operation of the main part of the camera according to the first embodiment of the present invention.
Figure 5:
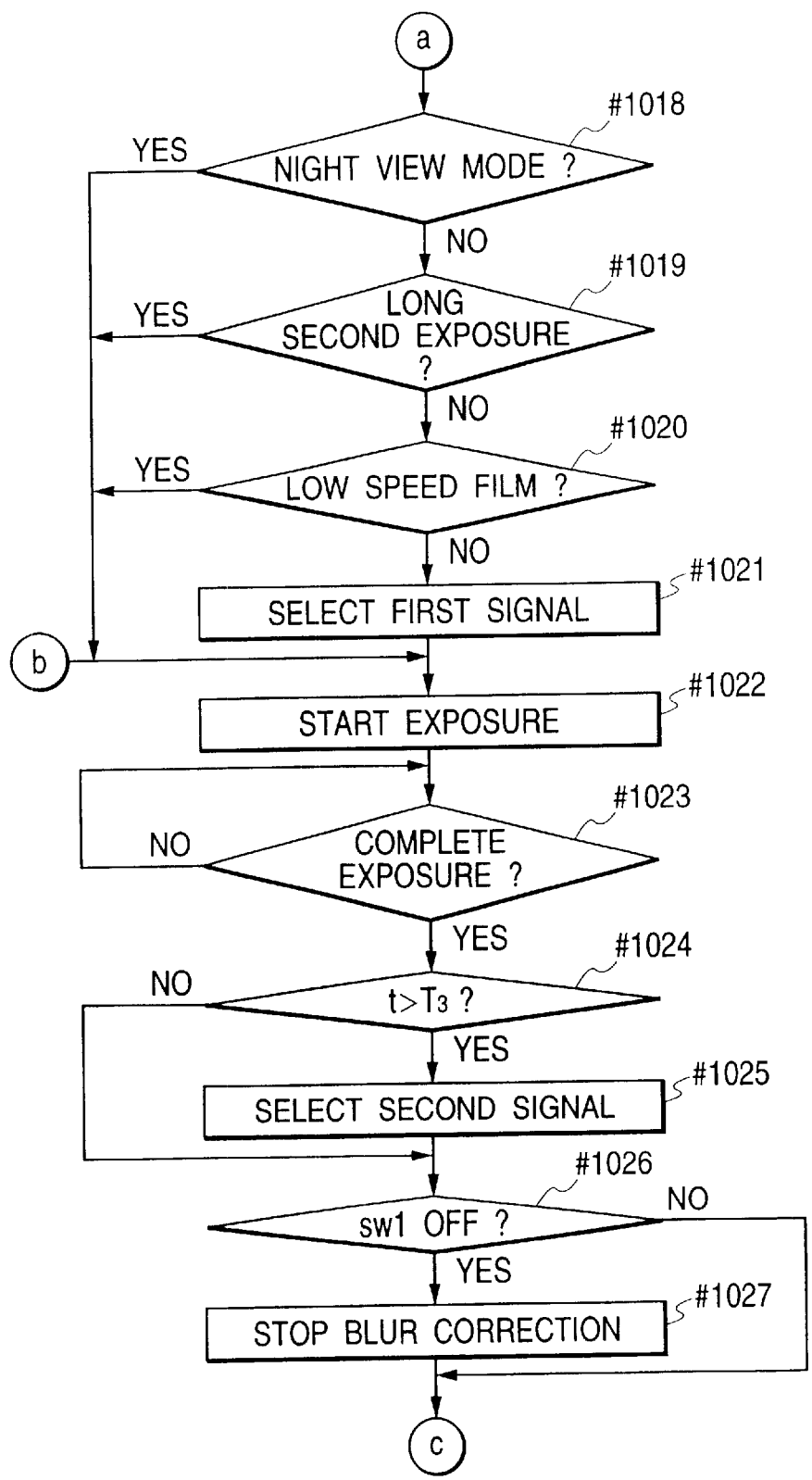
FIG. 5 is a flowchart to show the operation after the operation of FIG. 4.

FIGS. 4 and 5 show the flowchart for explaining the operation in the camera microcomputer 11 described above, and this flow is started with on of the main switch 114 of the camera. (This flow also becomes active during off of the blur prevention switch 18, because the vibration detection device 19 and the analog processing circuit 116 are driven in a standby state.)

In first step #1001, the power is applied to the vibration detection unit 116 to start the operation to make the vibration detection device 19 (the vibration detection mechanism 19a and the vibration detection circuit 19b) detect the angular velocity of hand vibration. In next step #1002, an internal timer t is started and in subsequent step #1003 the microcomputer waits until the time $T_1$ (for example, 0.1 second) has been counted by the above timer t. After the above time $T_1$ has been counted, then the microcomputer goes to step #1004. This is for the purpose of avoiding an extraction error of the offset component, because there is the great variation of the offset component in the initial stage of driving of the vibration detection device 19 as described referring to FIG. 2B.

In step #1004, the camera microcomputer 11 starts outputting the clock signals to the clock gate 116e. At the same time as it, the camera microcomputer 11 changes the time constant of the high pass filter 119. Namely, it opens the switch 424p of FIG. 36 to set the time constant of the high pass filter to the large value. It is a matter of course that such a high pass filter is provided for each of the pair of vibration detection units for detection of the different axes and the change of the time constant is thus carried out for each of their high pass filters.

In next step #1005, the camera microcomputer waits until the timer t activated with on of the main switch 114 has counted the time $T_2$ (for example, 0.3 second). After a lapse of the time, the camera microcomputer proceeds to step #1006. In this step #1006, the camera microcomputer terminates the output of clock. This completes the removal of the offset component superimposed on the first signal from the amplifier•low pass filter 116b (see FIG. 2A).

In step #1007, the camera microcomputer waits for half depression of the release member 113 (on of sw1). When the release member 113 is depressed half, the camera microcomputer moves to step #1008 to determine whether the above timer t has counted the time $T_3$ (for example, 0.7 second). If the time $T_3$ has been counted, the camera microcomputer goes to step #1009; otherwise to step #1010.

When moving to step #1009, the camera microcomputer selects the second signal as a drive target value of the correction means 110. This is because the second signal is stable after the time $T_3$ has elapsed. On the other hand, when the camera microcomputer goes to the step #1010, it selects the first signal as a drive target value of the correction means 110. This is because the second signal is not stable yet before the time $T_3$ passes. In next step #1011 or #1012, the correction means 110 is actuated to start the blur correction. In subsequent step #1013 or #1014, it is determined whether the half depression of the release member 113 is canceled (i.e., whether sw1 is off). When the half depression of the release member 113 is cancelled, the microcomputer goes from either step to step #1015 to stop the blur correction, and then returns to step #1007 to await half depression of the release member 113.

When it is determined in above step #1013 or #1014 that the half depression of the release member 113 is not cancelled, the microcomputer goes to step #1016 or #1017 to determine whether full depression of the release member 113 (on of sw2) is made. When the release member 113 is depressed fully, the camera microcomputer goes to step #1018 or #1022 of FIG. 5 and repeats the like operation hereinafter.

When the full-stroke depression of the release member 113 is not carried out in above step #1017, the camera microcomputer returns to step #1008 instead of returning to step #1004. The reason is as follows. If the time $T_3$ has elapsed during the manipulation to the full-stroke depression of the release member 113, the camera microcomputer goes to step #1009 to perform the blur correction with the second signal. In the case of the blur correction over a long period as in the case of aiming at the object, it is preferable to use the second signal as a drive target value of the correction means 110.

In step #1018 of FIG. 5, whether the photographing mode is the night view mode is determined. If the photographing mode is the night view mode, the camera microcomputer moves to step 1022; otherwise to step #1019. In step #1019 it is determined whether the exposure is long-seconds exposure or not. If the exposure is the long-seconds exposure, the camera microcomputer goes to step #1022; otherwise to step #1020. In step #1020, the film speed is detected. If a low-speed film is used, the camera microcomputer goes to step #1022; otherwise to step #1021. The flow goes to this step #1021 when there is no possibility of execution of long-seconds exposure, and thus the drive target value of the correction means 110 is switched to the first signal with giving a higher priority to the frequency characteristics. Then the flow goes to step #1022.

When the release member 113 is fully depressed in above step 1017, the flow also goes to step #1022 as described previously.

In step #1022 the exposure operation is carried out. During this exposure the blur correction with the first signal is performed in either of the following cases.

1) From above step #1018 via step #1020, there is no possibility that the long-seconds exposure is carried out and it is desirable to raise the blur prevention accuracy with giving the higher priority to the frequency characteristics.
2) From step #1010 via step #1017, the release member 113 is depressed fully immediately after on of the main switch 114 (without a lapse of the time $T_3$) and thus the second signal is not stable yet.

In next step #1023, the camera microcomputer waits for the end of exposure and then moves to step #1024. In this step #1024, it is determined whether the time $T_3$ has elapsed since on of the main switch 114. If the time $T_3$ has elapsed, the flow goes to step #1025; otherwise to step #1026.

Namely, the blur correction with the second signal is carried out even if the exposure was started before the lapse of the time $T_3$ and if the time $T_3$ has elapsed after the end of exposure.

In step #1026, it is determined whether the release member 113 is depressed half. When the release member 113 is depressed half, the flow goes to step #1027; otherwise back to step #1007 of FIG. 4. In step #1027, the driving of the correction means 110 is terminated and then the flow returns to step #1007 of FIG. 4.

According to the first embodiment described above, the vibration detection device 19 and the offset signal removing means (analog signal processing circuit 116), which removes the offset signal superimposed on the output signal, i.e., vibration signal from the vibration detection device 19, are constructed in the same unit, the unit has the two output terminals for output of the vibration signal before the removal of the offset signal and the first signal after the removal of the offset signal (terminal names of which are not specified in the illustration, one of which is a terminal for output of the vibration signal from the vibration detection circuit 19b to the high pass filter 119 and the other of which is a terminal for output of the signal from the amplifier•low pass filter 116b to the A/D converter 117), and the offset signal removing means has the clock gate 116e into which the vibration signal from the vibration detection device 19 or an amplified value of the vibration signal is entered, the D/A converter 116g, the up/down counter 116f for changing the output signal from the D/A converter 116g up or down, based on the signal from the clock gate 116e, and the differential circuit which generates the first signal by subtracting the output signal from the D/A converter 116g from the vibration signal, whereby the first embodiment realized the compact and lightweight vibration detection unit with high general versatility.

The apparatus of the first embodiment has the two offset signal removing means for removing the offset superimposed on the vibration signal from the vibration detection device 19, the second offset signal removing means is constructed of the high pass filter 119 for attenuating the low-frequency component in the vibration signal, the first offset signal removing means is the analog signal processing circuit 116 for carrying out the offset removal by storing the offset component superimposed on the vibration signal and subtracting it from the vibration signal; before the predetermined time has elapsed since the start of the operation of the second offset signal removing means, the correction means 110 is controlled by selecting the first offset signal removing means, or the control means 110 is controlled by selecting either the first offset signal removing means or the second offset signal removing means, depending upon the condition of the camera.

As a specific example, the second offset signal removing means is selected in the photographing mode of the camera; more specifically, in the photographing mode in which long-seconds photography is assumed. Further, either the first offset signal removing means or the second offset signal removing means is selected depending upon the exposure time; more specifically, the second offset signal removing means is selected when the exposure time is long. Further, either the first offset signal removing means or the second offset signal removing means is selected depending upon the type of film used in the camera; more specifically, the second offset signal removing means is selected when the film speed is low. Further, either the first offset signal removing means or the second offset signal removing means is selected depending on camera operation timing; more specifically, the second offset signal removing means is selected in a photography preparation state (upon on of only sw1) and the first offset signal removing means is selected in a photographing operation state (upon on of sw2). This can facilitate handling of the blur prevention system and enhance the blur prevention accuracy.

(Second Embodiment)

Figure 6:
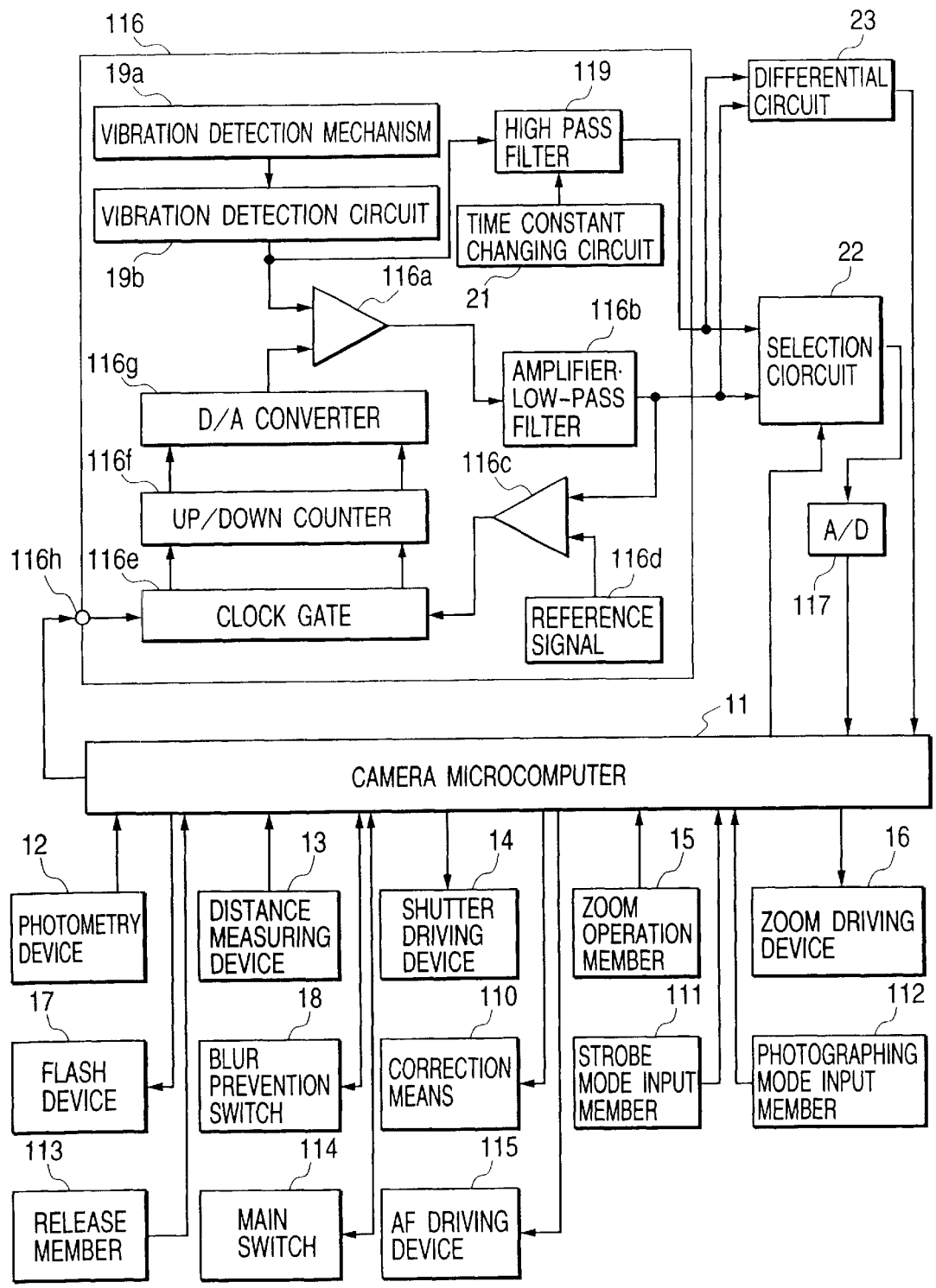
FIG. 6 is a block diagram to show the circuit structure of the main part of the camera according to the second embodiment of the present invention.

FIG. 6 is a block diagram to show the circuit structure of the main part of the camera according to the second embodiment of the present invention, in which like parts as those in FIG. 1 are denoted by the same reference symbols, and the description thereof will be omitted.

The second embodiment is similar to the above first embodiment in that the apparatus has two different offset signal removing means for facilitating handling of the blur prevention system and enhancing the accuracy thereof, but the second embodiment is different from the first embodiment in that they are placed in the vibration detection unit 116 as a single unit.

In FIG. 6, the high pass filter 119 is mounted in the vibration detection unit 116 and the high pass filter 119 has the structure illustrated in FIG. 36 as described previously. Further, a time constant changing circuit 21 outputs a time constant changing signal to the high pass filter 119 after a lapse of a predetermined time (0.1 second) from the start of the operation of the vibration detection unit 116, to open the switch 424p illustrated in FIG. 36, thereby increasing the time constant of the high pass filter.

As illustrated in FIG. 6, the analog signal processing circuit 116 (the first offset signal removing means), which is composed of the comparator 116c, the clock gate 116e, the up/down counter 116f, and the D/A converter 116g, and the circuit (the second offset signal removing means), which is composed of the high pass filter 119 and the time constant changing circuit 21, are placed in the single unit, to permit free selection of either signal, thus realizing the vibration detection unit with high general versatility.

In FIG. 6, the first signal output through the first offset signal removing means, outputted from the amplifier•low pass filter 116b, and the second signal through the second offset signal removing means, outputted from the high pass filter 119, are entered into a differential circuit 23, which gains a difference between the two signals.

When the offset is removed well from the first signal and the second signal, the output of this differential circuit 23 is almost zero. However, the offset is not removed well from the first signal, for example, when great vibration is entered during the operation of the first offset signal removing means. In such cases the output of the differential circuit 23 becomes large.

The output from the differential circuit 23 (hereinafter also referred to as a differential output) is supplied to the camera microcomputer 11. When the signal becomes large, the camera microcomputer 11 outputs a selection change signal to a selection circuit 22. This selection means 22 accepts the first signal and the second signal. With selection of either one, the A/D converter 117 converts the analog signal to a digital signal and the digital signal is supplied to the camera microcomputer 11.

The blur correction is carried out using the first signal up to the end of the predetermined time after activation of the vibration detection unit 116 as in the first embodiment, but the second embodiment is arranged to carry out the blur correction with the second signal when the differential output is large on this occasion.

The first embodiment was arranged to carry out the blur correction with the second signal in the cases of the long-seconds exposure etc., but the present embodiment is arranged to also carry out the blur correction with the first signal in such cases when the differential output is small, because the offset is removed well from the first signal at that time. This permits the blur correction with accuracy to be carried out using the signal with the good frequency characteristics.

Figure 7:
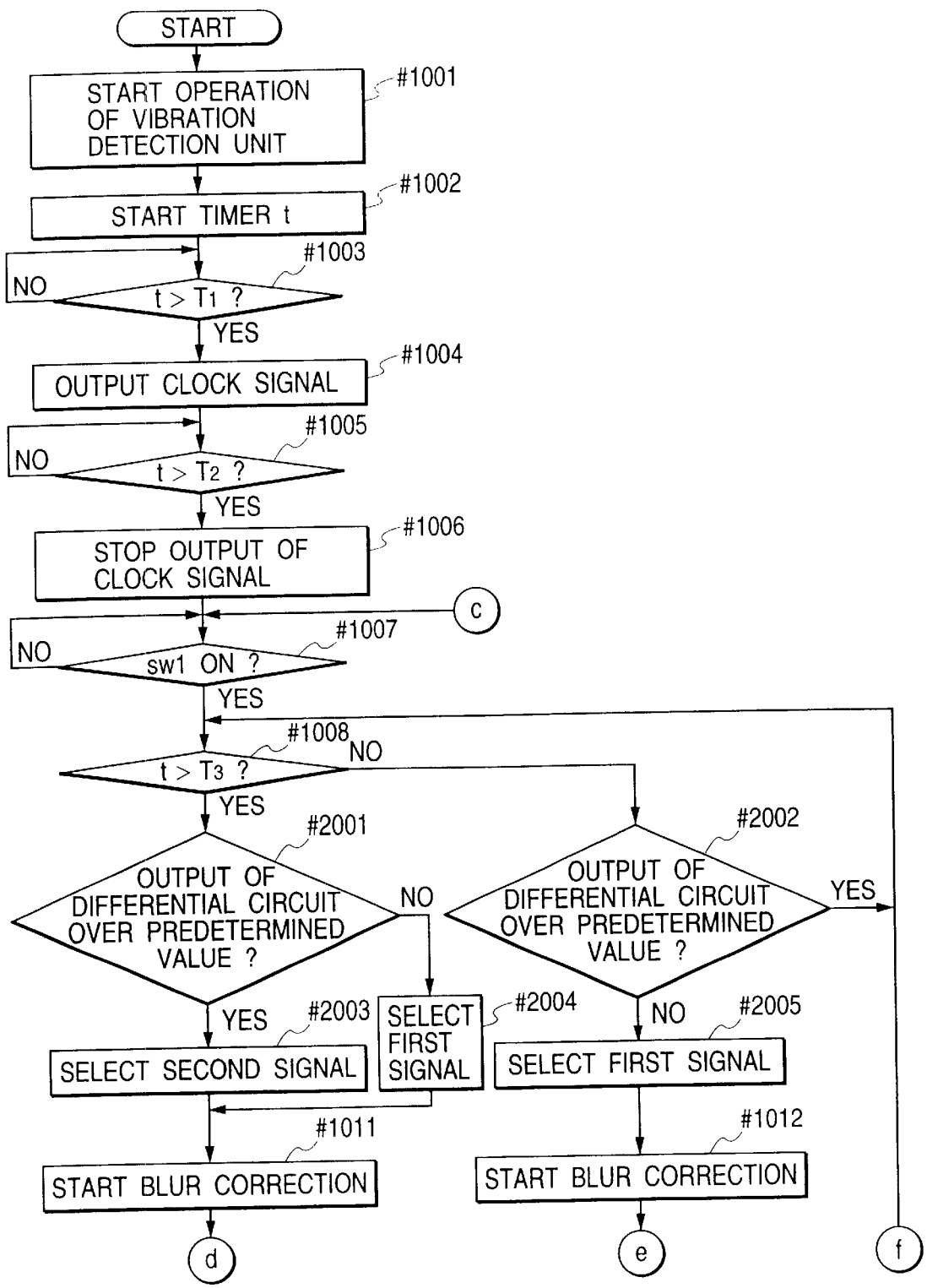
FIG. 7 is a flowchart to show part of the operation of the main part of the camera according to the second embodiment of the present invention.
Figure 8:
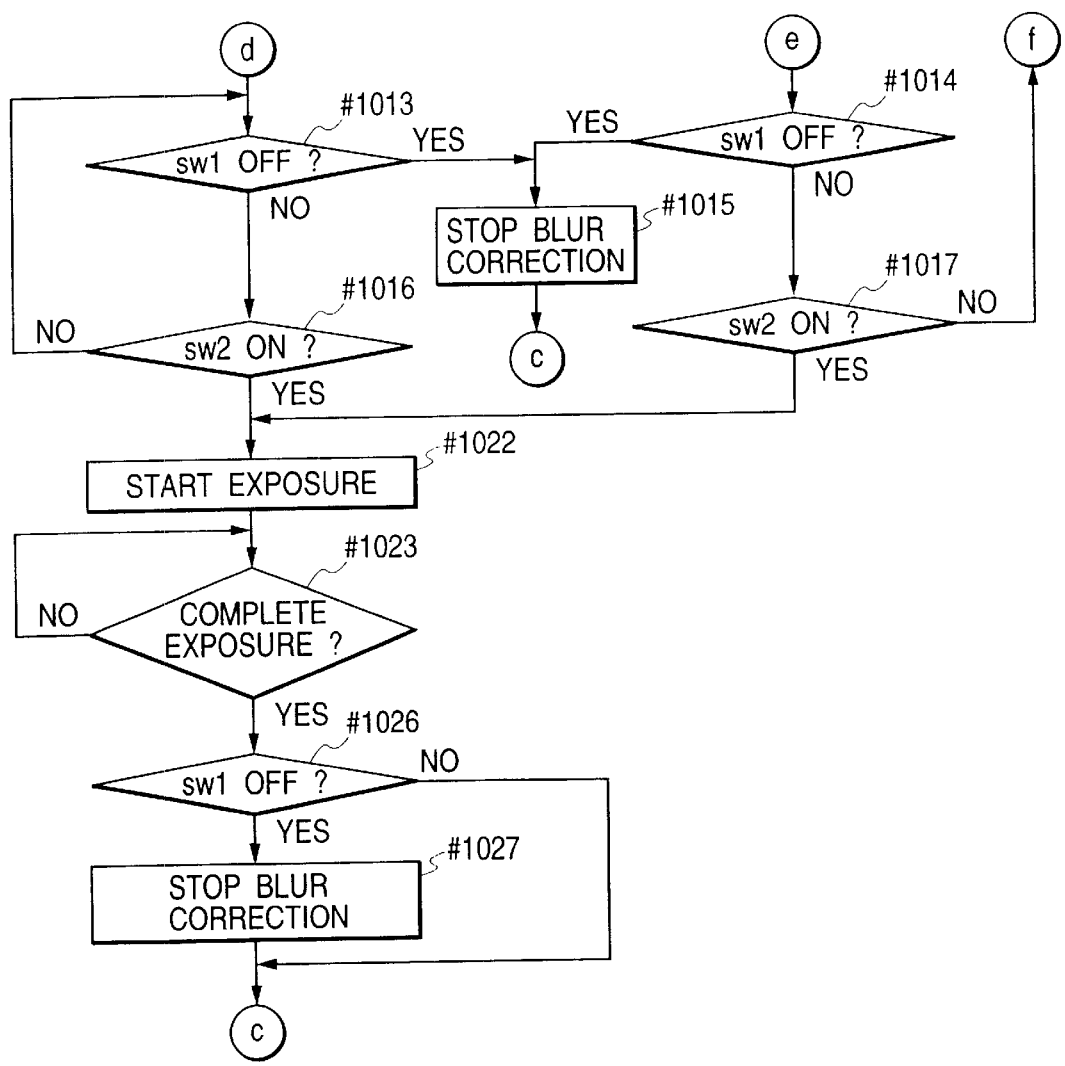
FIG. 8 is a flowchart to show the operation after the operation of FIG. 7.

FIGS. 7 and 8 show the flowchart of the above operation, which is basically similar to the above flowchart of FIGS. 4 and 5, and only differences will be described herein.

In FIG. 7, steps #2001, #2002 are steps of judging the output of the differential circuit 23. If the output is not less than a predetermined value in step #2001, the flow goes to step #2003; otherwise to step #2004.

When this output is large, the offset is not removed well from the first signal and thus the flow goes to step #2003 to select the second signal by the selection circuit 22 and carry out the blur correction with the signal including the low offset component. When the output of the differential circuit 23 is below the predetermined value, the removal of the offset from the first signal is in a permissible range and thus the flow goes to step #2004 to select the first signal by the selection circuit 22 and carry out the blur correction using the signal with the good frequency characteristics.

If the release member 113 is depressed half before a lapse of the time $T_3$ from on of the main switch 114 of the camera, the flow moves to step #2002 to determine whether the output of the differential circuit 23 is not less than the predetermined value, similarly. If the output is not less than the predetermined value the flow returns to step #1008. The reason why the flow returns to step #1008 in this way is that the second signal is still instable before the lapse of the time $T_3$ and the good blur correction cannot be expected.

When the output of the differential circuit 23 is below the predetermined value, the offset removal from the first signal is within the permissible range and thus the flow proceeds from step #2002 to step #2005 to select the first signal by the selection circuit 22 and carry out the blur correction therewith. When it is determined that the offset removal of the first signal is within the permissible range, the blur correction is also carried out with the first signal during the exposure even if the photographing condition is one of long exposure time, thereby effecting the blur correction with the good frequency characteristics.

The selection of the first signal and the second signal is carried out using the output of the differential circuit 23 as described above, and without having to be limited to the application of such signal selection, the apparatus may also be arranged, for example, so that when the output of the differential circuit 23 is off a predetermined range, it is determined that the offset is not removed well from the first signal and the offset removing operation of the first signal is carried out again. Namely, when the output of the differential circuit 23 is off the predetermined range, the camera microcomputer 11 outputs clock signals to the clock gate 116e for a predetermined time, to perform the offset removing operation again.

The check of the offset removing status by the differential circuit 23 may be carried out after a lapse of a predetermined time (for example, the time $T_3$) from on of the main switch 114, the check may also be carried on at intervals thereafter, and the check may also be carried out before the start of exposure and/or after the end of exposure.

According to the second embodiment described above, the apparatus has the first and second offset signal removing means for removing the offset superimposed on the vibration signal from the vibration detection device 19, the first offset signal removing means is constructed of the high pass filter 119 for attenuating the low-frequency component in the vibration signal, the second offset signal removing means is the analog signal processing circuit 116 for carrying out the offset removal by storing the offset component superimposed on the vibration signal and subtracting it from the vibration signal, the apparatus further has the differential circuit 23 for comparing the output from the first offset signal removing means with the output from the second offset signal removing means, and the correction means 110 is controlled by selecting either the first offset signal removing means or the second offset signal removing means, based on the result of comparison by the differential circuit 23.

Further, the above first and second offset signal removing means are constructed in the same unit.

This structure can realize the vibration detection unit with high general versatility and enhance the blur prevention accuracy.

(Third Embodiment)

Figure 9:
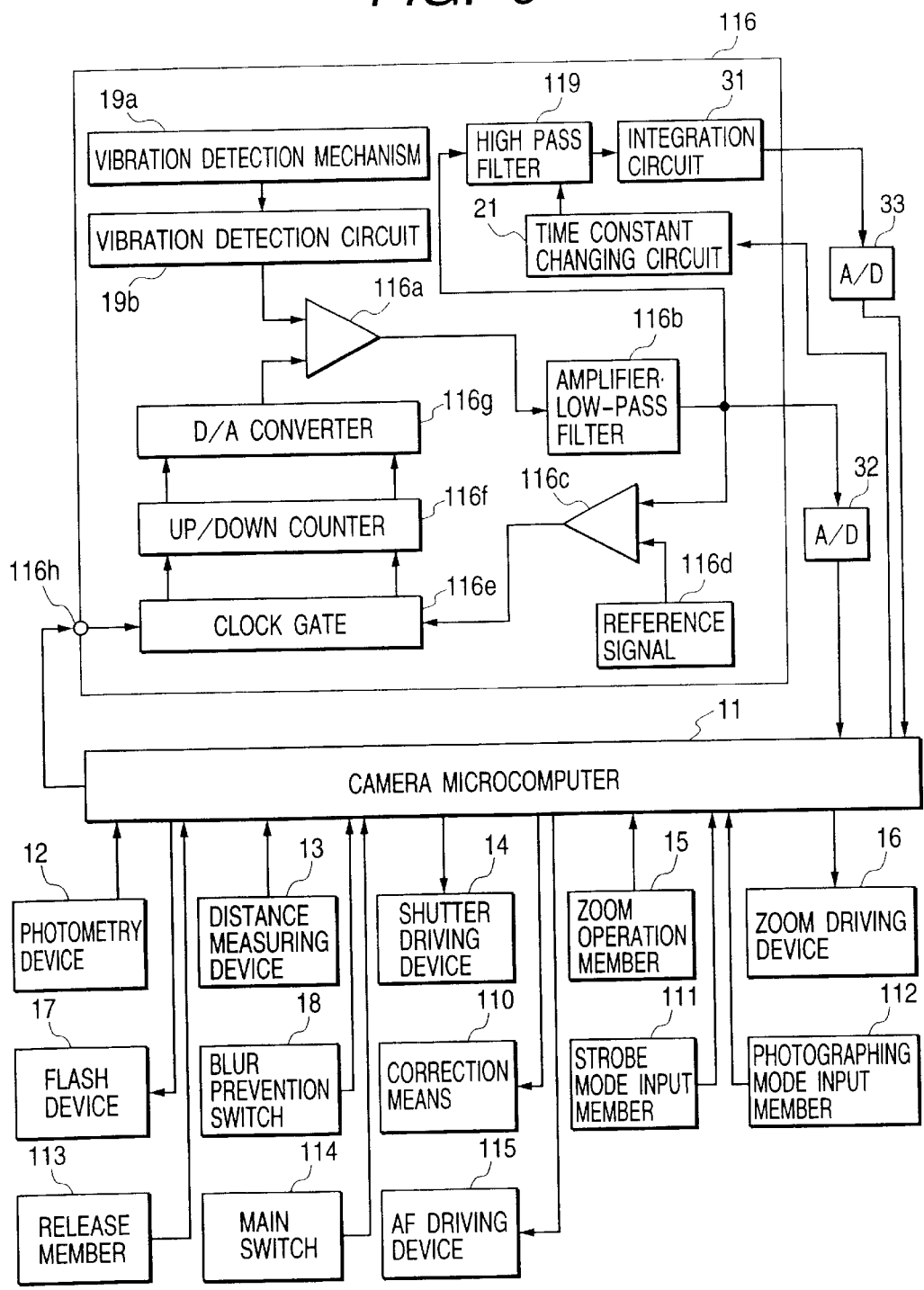
FIG. 9 is a block diagram to show the circuit structure of the main part of the camera according to the third embodiment of the present invention.

FIG. 9 is a block diagram to show the circuit structure of the main part of the camera according to the third embodiment of the present invention, in which like parts as those in FIG. 1 are denoted by the same reference symbols, and the description thereof will be omitted herein.

In the third embodiment, an integration circuit 31, together with the high pass filter, is also built in the vibration detection unit 116.

The signal from the amplifier•low pass filter 116b is supplied via the A/D converter 32 to the camera microcomputer 11 and also to the high pass filter 119. The high pass filter 119 may be the analog processing circuit illustrated in FIG. 36 or a well-known switching capacitor.

The time constant changing circuit 21 opens the switch 424p of FIG. 36 in response to a command from the camera microcomputer 11. The timing of this opening is, for example, 0.1 second after the camera microcomputer 11 terminates the clock signal output to the clock gate 116e and the offset component is removed from the output of the amplifier•low pass filter 116b. For that reason, the offset is already removed to some extent from the signal entered into the high pass filter 119 and the high pass filter 119 becomes stable soon, because the change of the time constant of the high pass filter is carried out thereafter.

The signal from the above high pass filter 119 is supplied to the integration circuit 31 to be integrated into an angle signal where the output of the vibration detection device 19 is the angular velocity of hand vibration. The output of this integration circuit 31 is subjected to A/D conversion in an A/D converter 33 and a digital signal after the conversion is supplied to the camera microcomputer 11.

Since the angle signal of hand vibration after the integration is supplied to the camera microcomputer 11, the integration load is not imparted on the inside of the camera microcomputer and thus a microcomputer with not so high performance can be selected in this structure, which permits reduction of cost and compactification of the apparatus.

The blur prevention system can be constructed using this vibration detection unit 116 even in the case of an optical instrument without a microcomputer, as long as the timing signal can be given to the clock gate 116b and to the time constant changing circuit 21. Therefore, the present embodiment can realize the vibration detection unit with extremely high general versatility.

According to the third embodiment described above, the vibration detection device 19 and the integration means, which integrates the vibration signal from the vibration detection device 19 to generate a first signal, are constructed in the same unit, the unit has the output terminal of the first signal (which is not illustrated and which is a terminal for output of the output signal from the integration circuit 31 to the A/D converter 33) and the output terminal of a second signal (which is not illustrated and which is a terminal for output of the output signal from the amplifier•low pass filter 116b to the A/D converter 32), thereby realizing the vibration detection unit with high general versatility.

(Fourth Embodiment)

Figure 10:
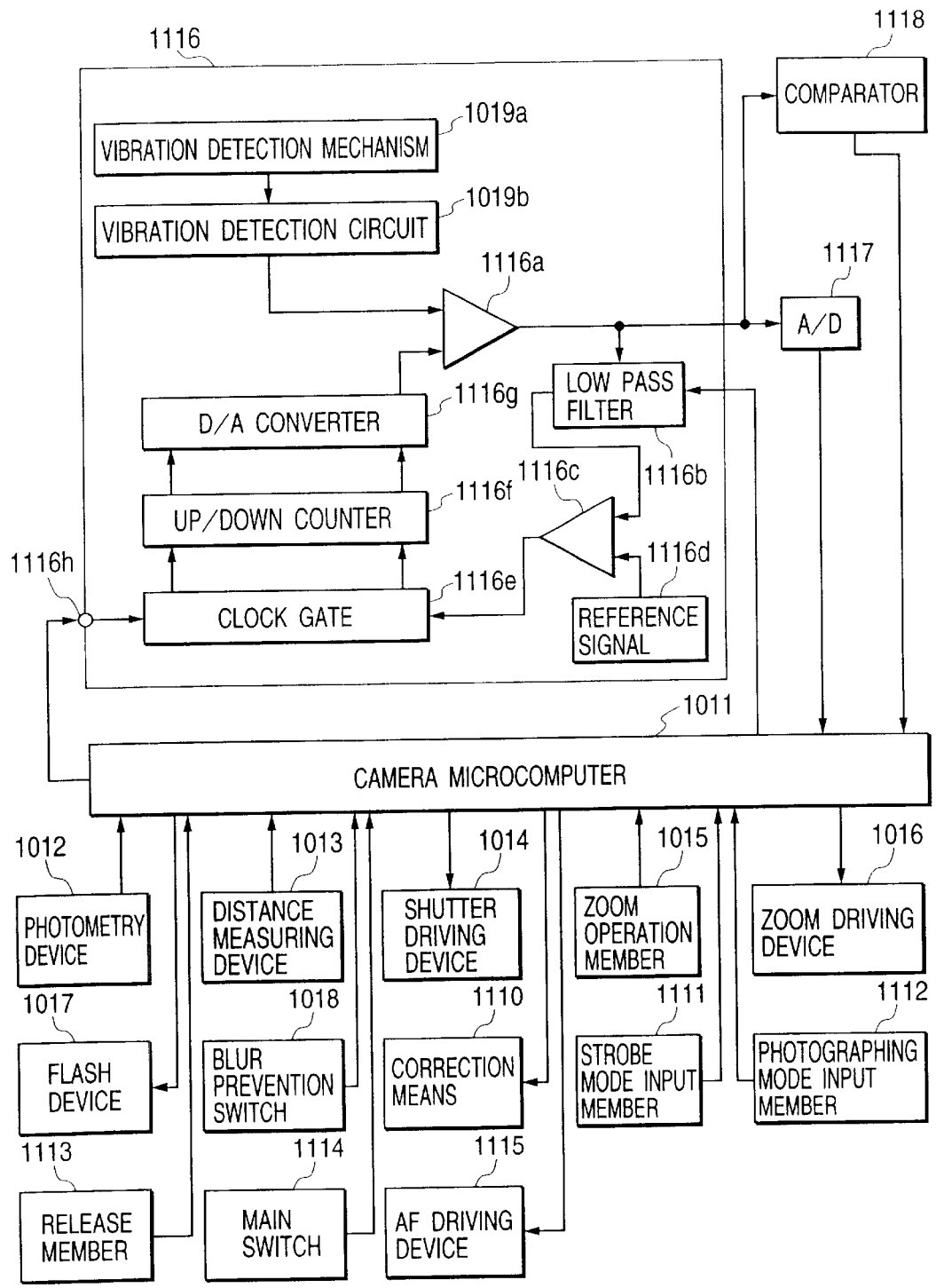
FIG. 10 is a block diagram to show the structure of the main part of the camera according to the fourth embodiment of the present invention.

FIG. 10 is a block diagram to show the circuit structure of the camera according to the fourth embodiment of the present invention, in which only the parts related to the present embodiment are illustrated and the other components of the camera are omitted for simplification of the description.

In FIG. 10, when the camera microcomputer 1011 (having the same structure as the microcomputer 411 of FIG. 32) accepts an on signal of the main switch 1114, it feeds the photographing lens barrel out from the collapsed state to the photographable state of the optical system and also opens the lens barrier at the same time. On this occasion, the microcomputer also activates the vibration detection device 1019 consisting of the vibration detection mechanism 1019a and the vibration detection circuit 1019b.

A photographing mode selected by the photographer is supplied from the photographing mode input member 1112 into the camera microcomputer 1011. The photographing mode is selected, for example, from the sports mode suitable for photography of an object moving around, the portrait mode suitable for photography of a person or people in a close-up state, the macro mode suitable for photography of an object in close proximity, and the night view mode suitable for photography of night views.

A strobe mode is entered from the strobe mode input member 1111 into the camera microcomputer 1011. The strobe mode is selected from the strobe-off mode for photography without use of the strobe, the strobe-on mode for photography with forced flashing of the strobe, and the strobe-auto mode in which whether the strobe should be on or off is controlled depending upon the luminance of the object, the direction of rays, or the like, and it is also possible to determine whether the red-eye relieving function is to be made active upon flashing of the strobe.

The photographer determines whether the blur correction should be effected during photography and enters information about it through the blur prevention switch 1018 into the camera microcomputer 1011. A zoom signal in response to manipulation of the photographer is entered through the zoom operation member 1015 into the camera microcomputer 1011 and the camera microcomputer 1011 controls the zoom driving device 1016 to vary the photographing focal length.

Once the above photographing focal length is determined, the photographer depresses the member 1113 as a shutter release button by a half stroke (to turn sw1 on). At the timing of this half-stroke depression the distance measuring device 1013 measures the distance to the object and outputs the information (measured distance information) to the camera microcomputer 1011. The camera microcomputer 1011 controls the AF driving device 1115, based on the measured distance information, to drive part or the whole of the photographing lens barrel, thereby adjusting the focus of the photographing optical system.

At this time, the vibration information from the vibration detection device 1019 is also supplied through an A/D converter 1117 to the camera microcomputer 1011, and the camera microcomputer 1011 determines from the vibration state whether the camera is held by hands or fixed on the tripod or on the ground.

The photometry device 1012 supplies the luminance of the object to the camera microcomputer 1011. Then the camera microcomputer 1011 calculates an exposure time and also determines whether the flash device 1017 is to be used, based on the photographic information determined heretofore, including the luminance information, the speed and type of film, the use condition of the blur prevention system, the photographing focal length and brightness of the lens at that time, the photographing mode, selection of blur correction, the information of the distance to the object, the vibration information, and so on.

With the full-stroke depression of the release member 1113 (on of sw2), the camera microcomputer 1011 controls the correction means 1110, based on the signal from the vibration detection device 1019, to start the blur correction. Thereafter, the camera microcomputer controls the shutter driving device 1014 to execute exposure on the film and lights up the flash device 1017 according to circumstances.

Numeral 1116 designates the vibration detection unit composed of the vibration detection device 1019 and the analog signal processing circuit (consisting of elements 1116a to 1116g described hereinafter) for removing the offset signal by processing the signal from the vibration detection device, the vibration detection unit 1116 cutting the offset and noise components superimposed on the output from the vibration detection device 1019 to output the result to the A/D converter 1117. The A/D converter 1117 samples the signal from the vibration detection unit 1116 and sends the sampled signal to the camera microcomputer 1011.

The method of removing the offset signal from the signal of the vibration detection device 1019 in the vibration detection unit 1116 herein is one not utilizing the filter having the frequency characteristics as described referring to FIG. 32 but making use of the following structure.

The signal detected by the vibration detection mechanism 1019a is processed by the vibration detection circuit 1019b to yield the angular velocity signal and the differential circuit 1116a subtracts the offset extract component described hereinafter from the angular velocity signal. The signal from this differential circuit 1116a is subjected to the A/D conversion and is also supplied to a low pass filter 1116b. A signal from the low pass filter 1116b is supplied to the comparator 1116c. The comparator 1116c compares the input signal from the low pass filter 1116b with the reference signal 1116d. The reference signal 1116d is approximately half of the power-supply voltage supplied to the vibration detection circuit 1019b, which is a central value of the signal output range of the vibration detection device 1019. Further, this reference signal is also used as a reference in the subsequent operations of DC removal by the digital filter and integration in the camera microcomputer 1011.

The comparator 1116c outputs a signal of "H" to the clock gate 1116e when the signal from the low pass filter 1116b is greater than the reference signal (or when a positive offset voltage is present). When the signal from the low pass filter 1116b is smaller than the reference signal 1116d (or when a negative offset voltage is present), the comparator 1116c outputs a signal of "L" to the clock gate 1116e. While clock signals are entered via the reset terminal 1116h, the clock gate 1116e sends the signal from the comparator 1116c to the up/down counter 1116f.

When the signal from the clock gate 1116e is "H", the up/down counter 1116f counts one bit up every clock. When the signal from the clock gate 1116e is "L", the up/down counter 1116f counts one bit down every clock. The D/A converter 1116g outputs an analog signal according to the output of the up/down counter 1116f; for example, with increment of one bit, the converter outputs +2 mV to the differential circuit 1116a.

The above vibration detection circuit 1019b, the differential circuit 1116a, the low pass filter 1116b, the comparator 1116c, the reference signal 1116d, the clock gate 1116e, the up/down counter 1116f, and the D/A converter 1116g are integrated into one circuit as an IC unit, and the vibration detection mechanism 1019a is placed in the vicinity thereof, thus composing the compact unit.

In the above structure, when the main switch 1114 of the camera is turned on first, the vibration detection unit 1116 is activated to start the detection of angular velocity of vibration by associated action of the vibration detection mechanism 1019a and the vibration detection circuit 1019b.

Let us suppose here for explanation's sake that the vibration including the hand vibration and the like is little. In this case, the output of the vibration detection device 1019 varies as indicated by a waveform 1121 of FIG. 11A from the start of operation and becomes an offset $V_1$ finally. Here the signal varies greatly during the period from immediately after the start of the operation to the time To. When the vibration detection device 1019 is, for example, a well-known vibration gyro, it is the variation of the signal before stabilization of the vibration. When the vibration detection device 1019 is an angular acceleration sensor, it is the variation of the signal before stabilization of the circuit. For this reason, accurate DC removal would not be able to be made even if the DC offset removing operation were carried out during this period.

Therefore, during the period from the time $T_1$ (for example, 0.1 second) up to the time $T_2$ after the start of the operation of the vibration detection mechanism 1019a and the vibration detection circuit 1019b, the camera microcomputer 1011 keeps outputting the clock signals via the reset terminal 1116h to the clock gate 1116e.

Since the output of the differential circuit 1116a is first the signal offset $V_1$ at the time $T_1$, the comparator 1116c outputs the signal "H", so that the signal of the D/A converter 1116g entered into the differential circuit 1116a is increased every input of one clock into the clock gate 1116e. Therefore, the offset component of the signal of the differential circuit 1116a decreases with increase of clocks (as indicated by a waveform 1122) and in the final stage the signal of the differential circuit 1116a varies alternately according to clocks in the range of the minimum resolving power (for example, 2 mV) of the D/A converter 1116g (as indicated by an arrow 1123).

Figure 11A:
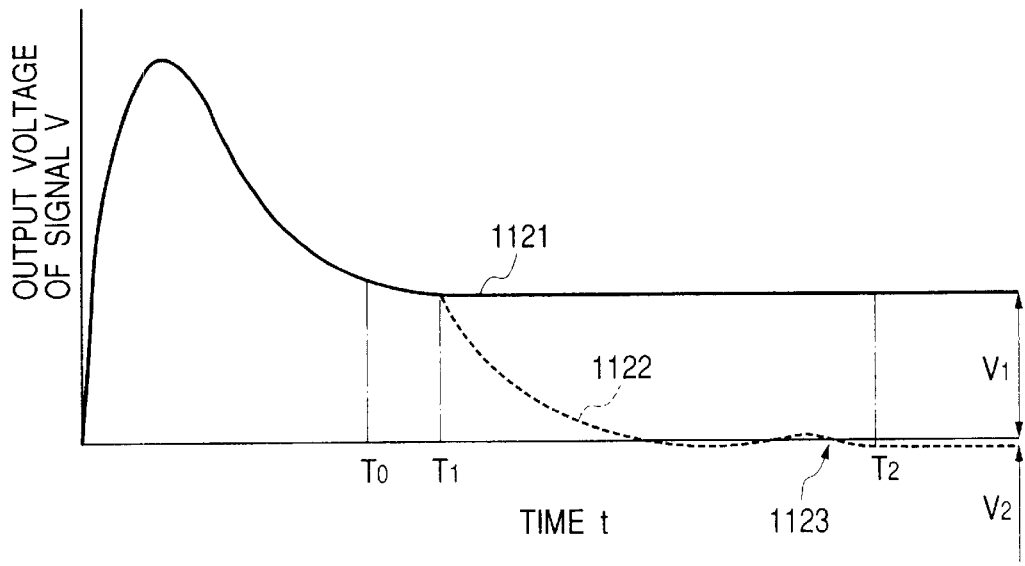
FIGS. 11A and 11B are timing charts from the start of vibration detection to the removal of offset component in the fourth embodiment of the present invention.
Figure 11B:
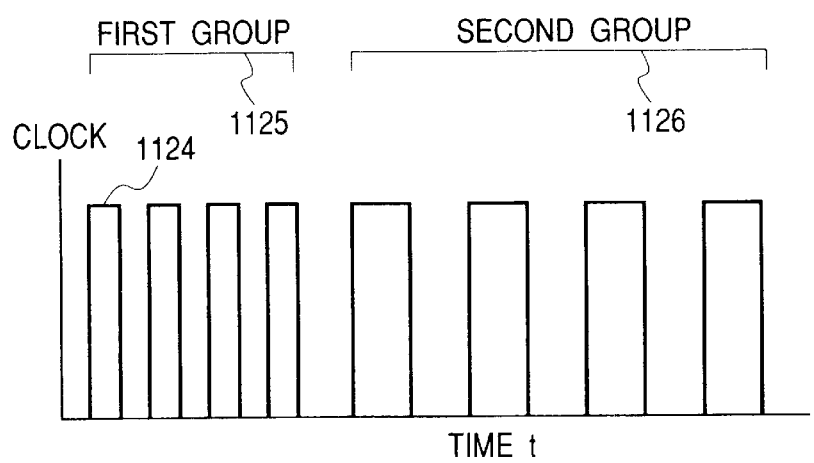

The frequency of clocks is set, as illustrated in FIG. 11B, so that the frequency of clocks 1124 is first high (first group 1125) and the frequency is lowered thereafter (second group 1126). Setting of the higher clock frequency permits the rough offset removal to be executed first and setting of the lower clock frequency thereafter permits the stable offset removal to be executed, thereby reducing the time necessary for the offset removal.

Since the camera microcomputer 1011 stops the output of clock signal at the time $T_2$, the signal outputted from the D/A converter 1116g to the differential circuit 1116a is fixed to the signal at the end of the output of clock signal. This terminates the variation of the signal of the arrow 1123 illustrated in FIG. 11A and the offset component decreases to $V_2$.

In the case of the conventional DC cut filter 48p described with FIG. 32, the final offset component can be made zero; whereas in the system of the present embodiment there are possibly cases in which the small offset ($V_2$) remains. However, the offset signal will be removed by the digital operation of the DC cut filter 414p in the camera microcomputer 1011, and thus there will arise no problem in terms of the blur prevention performance.

Described below is why the offset removal also has to be carried out in the vibration detection unit 1116, though the offset removal is finally effected in the camera microcomputer 1011.

Let us suppose that the offset removal were not carried out in the vibration detection unit 1116. The output of the vibration detection device 1019 is amplified with a considerably high gain before the A/D conversion and entry into the camera microcomputer 1011. This is because the output of the hand vibration component detected by the vibration detection device 1019 is very small. For that reason, the signal of the amplifier can become saturated because of the offset component superimposed on the signal. For preventing this saturation, the offset of the signal of the vibration detection device 1019 needs to be decreased to a certain level before the amplification.

In the structure of FIG. 10, the offset component $V_1$ is decreased to $V_2$ as illustrated in FIG. 11A, whereby the signal of the low pass filter 1116b can be prevented from becoming saturated.

Figure 12:
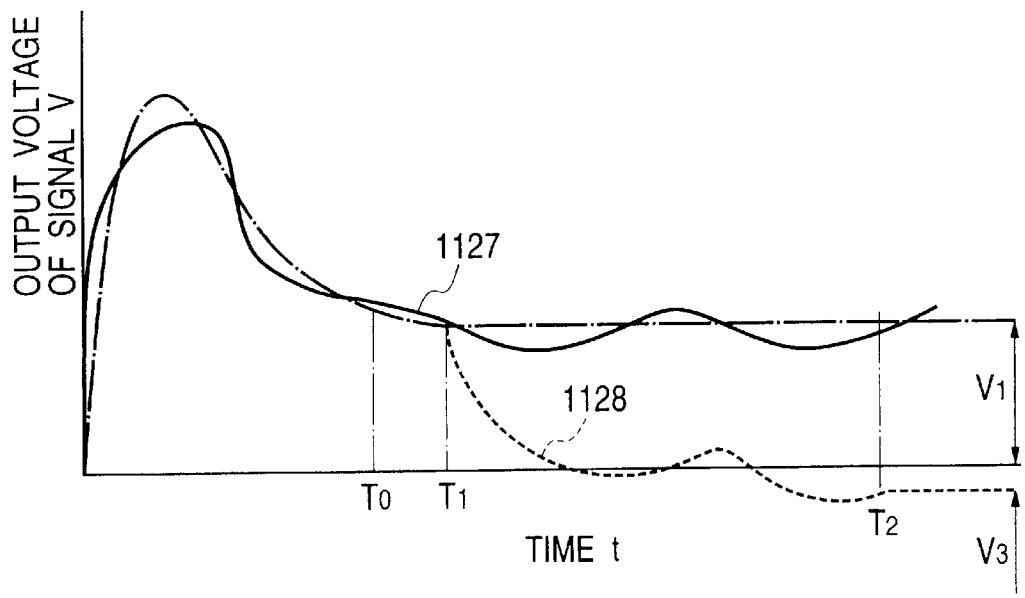
FIG. 12 is a timing chart to show actual vibration outputs of the output waveforms of FIG. 11A.

The actual output of the vibration detection device 1019 is not so smooth as the waveform 1121 of FIG. 11A, but it also includes the signal due to the hand vibration as indicated by a waveform 1127 of FIG. 12. Therefore, the offset signal $V_3$ remains at a level of the hand vibration output at the time $T_2$ when the camera microcomputer 1011 stops the output of clock (as indicated by a waveform 1128). However, this offset is sufficiently smaller than the initial offset component $V_1$ and this can prevent the saturation of the signal on the low pass filter 1116b.

When the offset component is removed by the method as described above, it can obviate the need for the large-capacitance capacitor as was used in the conventional DC cut filter illustrated in FIG. 36 and thus the circuit can be compactified considerably. Further, the structure of the present embodiment does not include the time constant circuit composed of the capacitor and resistors, and thus has the advantage that there is no possibility of the degradation of blur prevention accuracy due to the phase shift in the hand vibration frequency band.

In FIG. 10, the output from the vibration detection unit 1116 is also supplied to a comparator 1118. The structure of the vibration detection unit 1116 as described above can normally prevent the saturation of the differential circuit 1116a. It is, however, conceivable that the output of the differential circuit 1116a becomes saturated or close to it in cases wherein correct offset removal is not effected because of superposition of noise on the output of the vibration detection circuit 1019b upon extraction of the DC component or in cases wherein correct offset removal is not effected because of great vibration (for example, due to panning) exerted on the camera upon extraction of the DC component. The comparator 1118 is given as countermeasures against such cases.

When the signal of the differential circuit 1116a is off a predetermined range or when the signal is off the predetermined range continuously for a fixed period (for example, when the signal is off the range of 1 V to 3 V for 0.5 second), the comparator 1118 outputs a signal to the camera microcomputer 1011. Then the camera microcomputer 1011 receives the output from the comparator 1118 and again outputs clock signals to the reset terminal 1116h of the vibration detection unit 1116 for a fixed time. By employing this structure, the offset removal operation can be executed again even when the differential circuit 1116a becomes close to saturation; therefore, the saturation can be avoided.

FIG. 10 shows the structure in which the comparator 1118 is set outside the camera microcomputer 1011, but, without having to be limited to it, any other configuration may also be adopted; for example, the comparator 1118 can be omitted by employing such structure that clock signals are generated again when the signal subjected to A/D conversion by the A/D converter 1117 and read out by the camera microcomputer 1011 is off a fixed range over a fixed time.

For carrying out the offset removal operation again with such a large offset as to induce the saturation of the signal as described above, the clock signals are such that the higher clock frequency is set first to effect the rough offset removal and the lower clock frequency is set next to effect the stable offset removal operation, as in the case illustrated in FIG. 11B.

The execution of the offset removal in the above manner eliminates the need for use of the analog circuit as illustrated in FIG. 36, and thus the whole control circuit can be made compact.

Now the role of the low pass filter 1116b will be described below.

FIG. 12 shows the state of the hand vibration by the waveform 1127, which further includes high-frequency components. These originate in the high-frequency components in the hand vibration and the noise overlaid on the vibration detection device 1019. The offset removal accuracy varies depending upon these high-frequency components.

Figure 13:
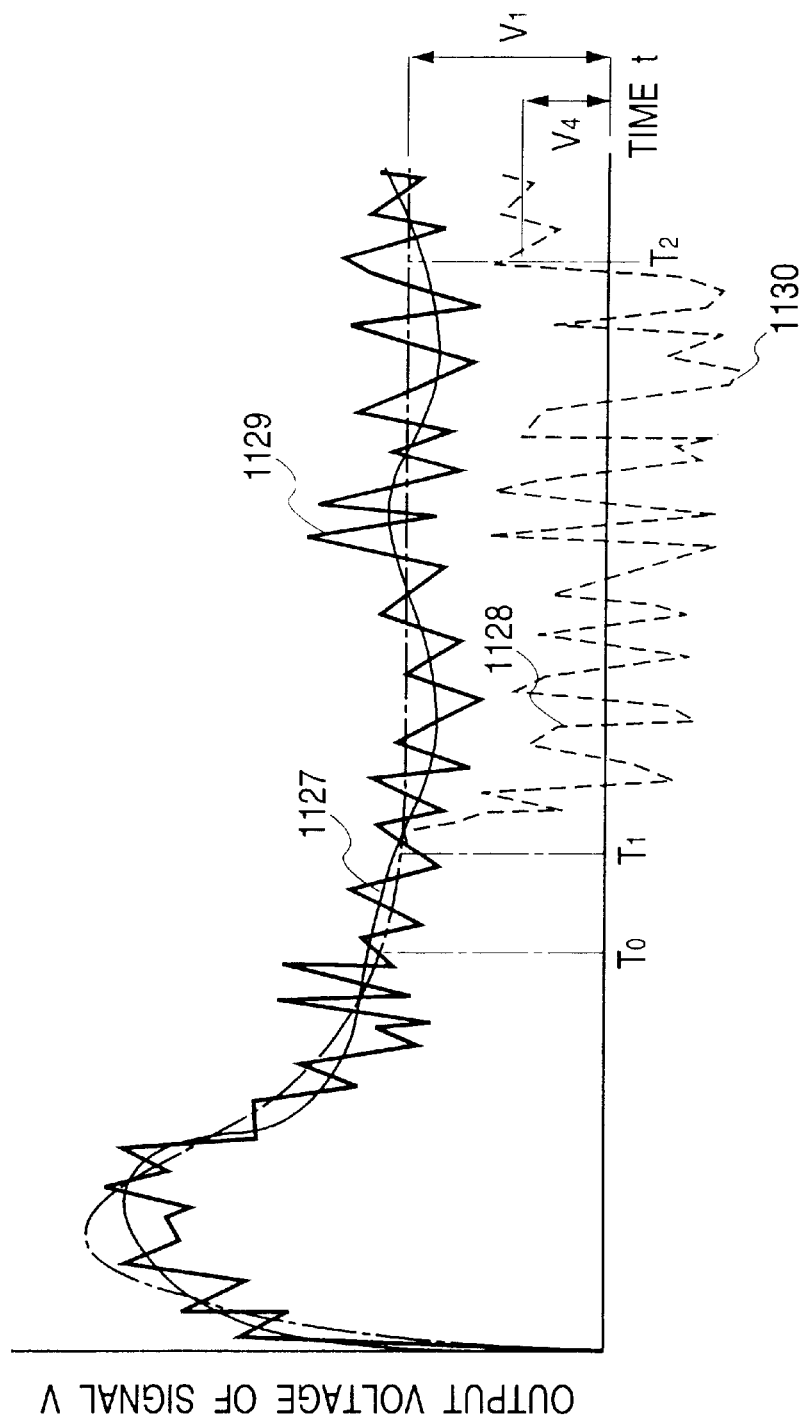
FIG. 13 is a diagram for explaining high-frequency components superimposed on the vibration output of FIG. 12.

FIG. 13 is a diagram for explaining it, in which a waveform 1129 indicates the high-frequency components superimposed on the waveform 1127.

After at the time $T_1$ the camera microcomputer 1011 starts supplying clock signals to the clock gate 1116e, values of the D/A converter 1116g entered into the differential circuit 1116a vary every input of clock signal. This is because a new subtrahend is stored every input of clock. As long as this subtrahend is equal to the value of the offset component overlaid on the vibration detection device 1019, the offset component can be removed completely. However, because the high-frequency signal is superimposed as indicated by the waveform 1129 in practice, if a clock signal happens to coincide with the timing of a top or a bottom of the high-frequency signal the subtrahend will differ from the actual offset signal.

For that reason, the signal from the differential circuit 1116a will vary greatly every input of clock signal as indicated by the waveform 1128 and the offset removal accuracy will degrade heavily when the supply of clock signal is terminated finally at the time $T_2$.

The low pass filter 1116b has such a characteristic as to attenuate the signal components at the high frequencies of not less than 1 Hz, for example. The reason is that the hand vibration has the frequency distribution in the band of approximately 1 Hz to 10 Hz and the offset signal of low-frequency components is extracted by removing the hand vibration components. Therefore, the signal through the low pass filter 1116b is free of the high-frequency components of hand vibration and the noise, so that the comparator 1116c can compare the correct offset signal value with the reference signal 1116d. Thanks to it, the subtrahend entered into the differential circuit 1116a becomes the accurate offset component, and the offset signal can be removed with accuracy after the lapse of the time $T_1$.

Figure 14:
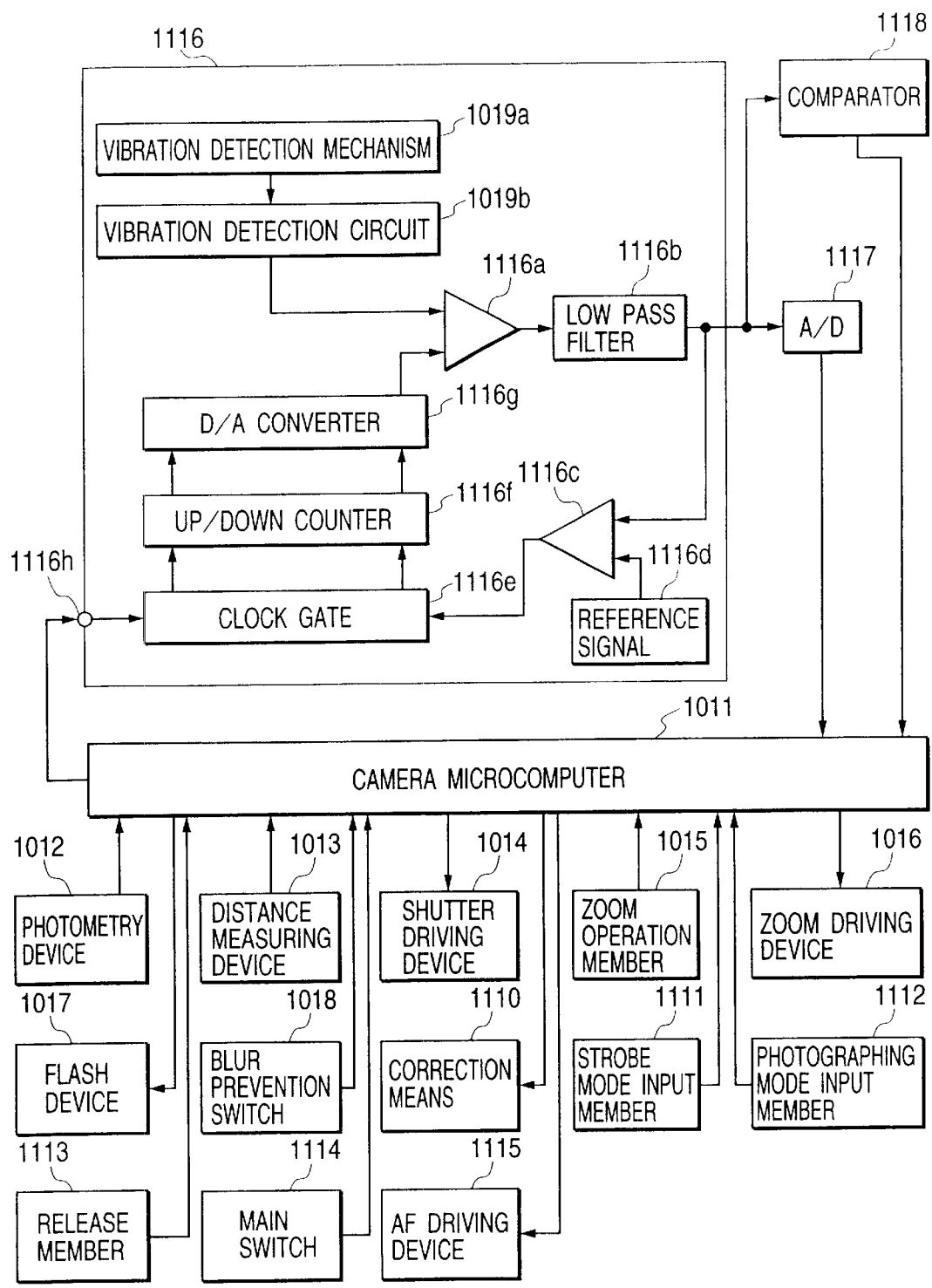
FIG. 14 is a block diagram to show an example in which the placement of the low pass filter is not appropriate, as compared with the circuit structure of FIG. 10.

It is also conceivable to employ the structure as illustrated in FIG. 14 in order to remove the high-frequency components of the vibration detection device 1019.

In FIG. 14, the low pass filter 1116b is placed between the differential circuit 1116a and the A/D converter 1117. This structure can also remove the high-frequency components of the vibration detection device 1019. It is, however, noted that the hand vibration signal is also removed by the low pass filter 1116b in order to extract the offset component and thus the signal entered into the A/D converter 1117 does not represent the correct hand vibration signal.

Therefore, a blur prevention system cannot be constructed in the layout of FIG. 14. For constructing a blur prevention system with high accuracy, the low pass filter 1116b has to be set outside the main signal flow (the vibration detection device 1019→the differential circuit 1116a→the A/D converter 1117→the camera microcomputer 1011) as illustrated in FIG. 10. (In FIG. 10 the low pass filter 1116b is placed in the negative feedback loop.)

The low pass filter with such a large time constant as the characteristic to attenuate the high frequencies of 1 Hz and higher involves a problem that some time is necessary from activation to stabilization thereof.

As described referring to FIG. 11A, the camera microcomputer 1011 waits to output the clock signals up to the time $T_1$. The reason is that the output signal from the vibration detection device 1019 is not stable yet before the time $T_1$, as described previously. Further taking the time for stabilization of the low pass filter 1116b into consideration, the output of clock signal has to be delayed more after the time $T_1$, which is not preferable.

In FIG. 10, the camera microcomputer 1011 supplies a time constant changing signal to the low pass filter 1116b to change the time constant of the low pass filter upon activation of the low pass filter 1116b, whereby the low pass filter becomes stable in the early stage.

Figure 15:
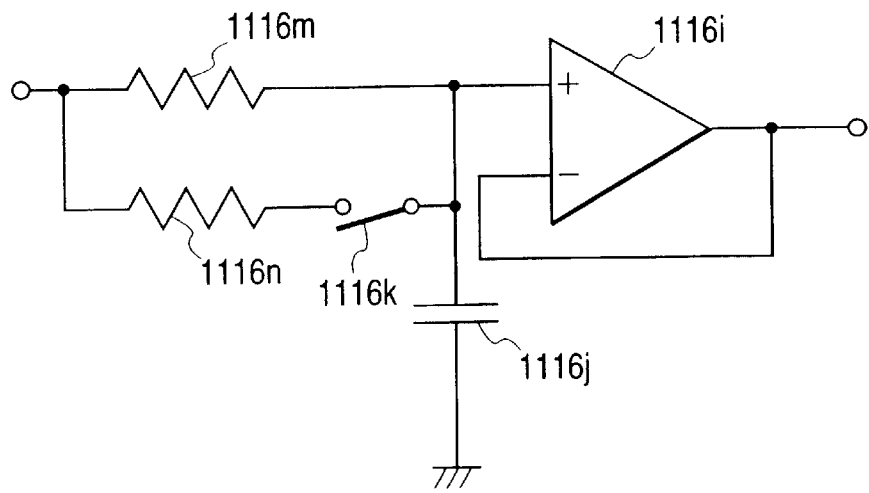
FIG. 15 is a circuit diagram to show the structure of the low pass filter 116b as illustrated in FIG. 10 etc.

FIG. 15 is an example of a circuit configuration of the above low pass filter 1116b, in which the low pass filter 1116b is composed of an operational amplifier 1116i, resistors 1116m, 1116n, a capacitor 1116j, and a switch 1116k.

While the switch 1116k is closed, the resistors 1116m and 1116n are parallel resistors and the resistance thereof is low. For that reason, the time constant of the low pass filter 1116b, which is determined by the resistors and capacitor 1116j, becomes small, so that the time before the stabilization of the output of the low pass filter 1116b is short. The low pass filter with such a small time constant, however, becomes inferior in the high-frequency attenuating performance, though the time before the stabilization is short. Thus the high-frequency components among the hand vibration are left without being removed.

While the above switch 1116k is opened, the time constant is determined only by the resistor 1116m and the capacitor 1116j and thus is large. In this case the effect of the low pass filter 1116b is enhanced, though the time before the stabilization of the low pass filter 1116b becomes longer.

Therefore, the switch 1116k is closed during the start-up period of the low pass filter 1116b to stabilize the low pass filter in the early stage, and the switch 1116k is opened thereafter to enhance the effect of the low pass filter 1116b.

The signal supplied from the camera microcomputer 1011 to the low pass filter 1116b controls on/off of the switch 1116k, so as to achieve both the early stabilization of the low pass filter 1116b and the effect of the low pass filter.

Once the main switch 1114 of the camera is turned on, the power is supplied to the vibration detection device 1019 to start the detection of angular velocity. At this time, the switch 1116k of the low pass filter 1116b is closed to achieve the early stabilization. After that, the above switch 1116k is opened at the time when the output of the vibration detection device 1019 becomes stable to some extent, to enhance the effect of the low pass filter. Then the camera microcomputer 1011 starts outputting the clock signals to the clock gate 1116e to start the removal of offset component.

The time constant of the low pass filter 1116b is changed before the start of the removal of offset component in this way, thereby making the low pass filter 1116b stable.

Now, let us discuss the offset removal accuracy and the blur prevention accuracy.

The lower the offset removal accuracy, the worse the blur prevention accuracy. However, influence on the image plane is little in the case of short exposure time even if the blur prevention accuracy is low to a certain extent. There is thus little influence on the image plane even if the switch 1116k of the low pass filter 1116b is kept closed in the case of short exposure time. By keeping the switch 1116k closed, the frequency can be increased of the clock signals outputted from the camera microcomputer 1011 to the clock gate 1116e on the other hand, which decreases the time before the offset removal and in turn makes the camera more adaptive to shutter chances.

While the switch 1116k is closed, the time constant of the low pass filter 1116b is small as described above and the closed loop of "differential circuit 1116a→low pass filter 1116b→clock gate 1116e→up/down counter 1116f→D/A converter 1116g→differential circuit 1116a" becomes more stable during this period. Thus the clock frequency can be increased. While the switch 1116k is opened on the other hand, the block with the large time constant is put into this loop and increase of the clock frequency will result in oscillation. Therefore, the clock frequency cannot be increased too high.

As described above, the increase of the time constant of the low pass filter 1116b enhances the offset removal accuracy but necessitates the longer time before the offset removal, whereas the decrease of the time constant can shorten the time before the offset removal but degrades the offset removal accuracy.

When the offset removal accuracy needs not be set so high, for example, as in the case of short exposure time, the time constant of the low pass filter 1116b is set to the small value, so as to shorten the time before the offset removal. In addition to the case of actual exposure time, the small time constant may also be employed in the photographing modes requiring no long exposure time (for example, in the sports mode).

Figure 16:
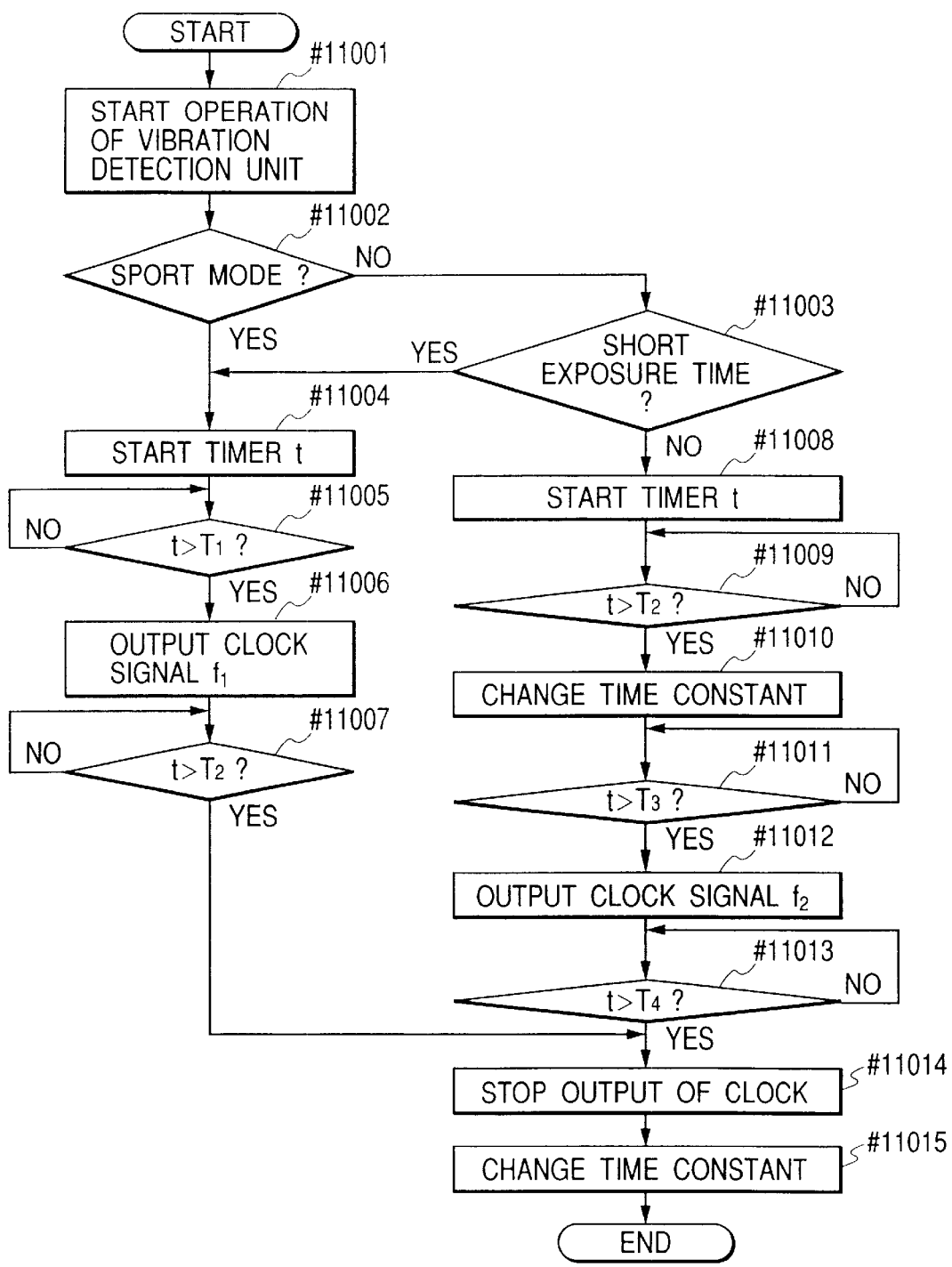
FIG. 16 is a flowchart to show part of the operation of the camera according to the fourth embodiment of the present invention.

FIG. 16 is the flowchart for explaining of the operation of the camera microcomputer 1011 described above, and this flow is started after the release member 1113 of the camera is depressed half and the luminance of the object is measured. The switch 1116k of the low pass filter 1116b is in the closed state.

In first step #11001, the power is supplied to the vibration detection unit 1116 to initiate the operation, whereupon the vibration detection mechanism 1019a and the vibration detection circuit 1019b start detecting the angular velocity of hand vibration. In next step #11002, the camera microcomputer determines whether the photographing mode is the sports mode. If it is the sports mode the camera microcomputer goes to step #11004; otherwise to step #11003. This is for shortening the time for the offset removal, because a higher priority is given to a shutter chance in the sports mode.

When going to step #11003, the camera microcomputer determines whether the photographing exposure time determined from the luminance of the object is shorter than, for example, 1/30 sec. If it is longer the camera microcomputer moves to step #11008; otherwise to step #11004. This determination may also be made taking account of the photographing focal length, in addition to the exposure time. For example, the determination may also be made as follows; the microcomputer proceeds to step #11008 if the exposure time is longer than 1/60 sec at the photographing focal length of 200 mm, but the microcomputer proceeds to step #11008 if the exposure time is longer than 1/8 sec at the photographing focal length of 30 mm.

As described above, since the strict offset removal accuracy is not required in the case of short exposure time, the sequence runs into the flow of fast offset removal speed starting from step #11004; whereas, since the high offset removal is required in the case of long exposure time, the sequence runs into the flow of high offset removal accuracy starting from step #11008.

In step #11004, the timer t is started. In next step #11005, the microcomputer waits up to the time $T_1$ (for example, 0.1 second) and then goes to step #11006. This is for avoiding an extraction error of the offset component, because the offset component varies greatly in the initial stage of driving of the vibration detection device 1019, as explained referring to FIG. 11A.

In next step #11006, the camera microcomputer 1011 starts outputting clock signals $f_1$ to the clock gate 1116e. The clock signals $f_1$ include a first group of clocks of high frequency (first group) to remove the offset roughly and a subsequent group of clocks of low frequency (second group) to remove the remaining offset, as illustrated in FIG. 11B.

In step #11007, the microcomputer waits before the timer activated in above step #11004 reaches the time $T_2$ (for example, 0.2 second), and thereafter goes to step #11014. In step #11014, the camera microcomputer 1011 stops the output of clock. In step #11015, since the switch 1116k of FIG. 15 is closed, the flow is ended as it is.

In step #11008, the timer t is started. In next step #11009, the microcomputer waits up to the time $T_2$ (for example, 0.8 second) and then goes to step #11010. In this step #11010 the microcomputer opens the switch 1116k of FIG. 15 to increase the time constant of the low pass filter 1116b. In subsequent step #11011, the microcomputer waits up to the time $T_3$ (for example, 0.2 second) and then proceeds to step #11012. This can enhance the high-frequency attention performance of the low pass filter 1116b in the early stage.

In step #11012, the camera microcomputer 1011 starts outputting clock signals $f_2$ to the clock gate 1116e. The clock signals $f_2$ include only clocks of low frequency to be outputted from the beginning, different from the those including the first output of clocks of high frequency (first group) and the subsequent output of clocks of low frequency (second group) as illustrated in FIG. 11B. The reason is as follows.

Since the low pass filter with the large time constant is put in the offset removing loop, the loop will oscillate with input of clocks of the high frequency, as described previously.

In next step #11013, the microcomputer waits before the timer t activated in above step #11008 reaches $T_4$ (for example, 0.4 second), and thereafter goes to step #11014. In step #11014 the microcomputer 1011 stops the output of clock. This completes the removal of the offset component superimposed on the first signal from the low pass filter 1116b.

As described above, the offset removal time by the flow starting from step #11008 is longer than that by the flow starting from step #11004, but the offset removal accuracy can be higher by that degree, which is effective in cases wherein the exposure time is long and the high blur prevention accuracy is required.

In next step #11015, the switch 1116k of FIG. 15 is closed to change the time constant of the low pass filter 1116k to the original value as described previously, thereby ending the flow.

In the structure of FIG. 10, the clock gate 1116e, up/down counter 1116f, and D/A converter 1116g were used as a memory means for offset removal, but the memory means does not have to be limited to this example; for example, the memory means can also be a known sample and hold circuit.

Figure 17:
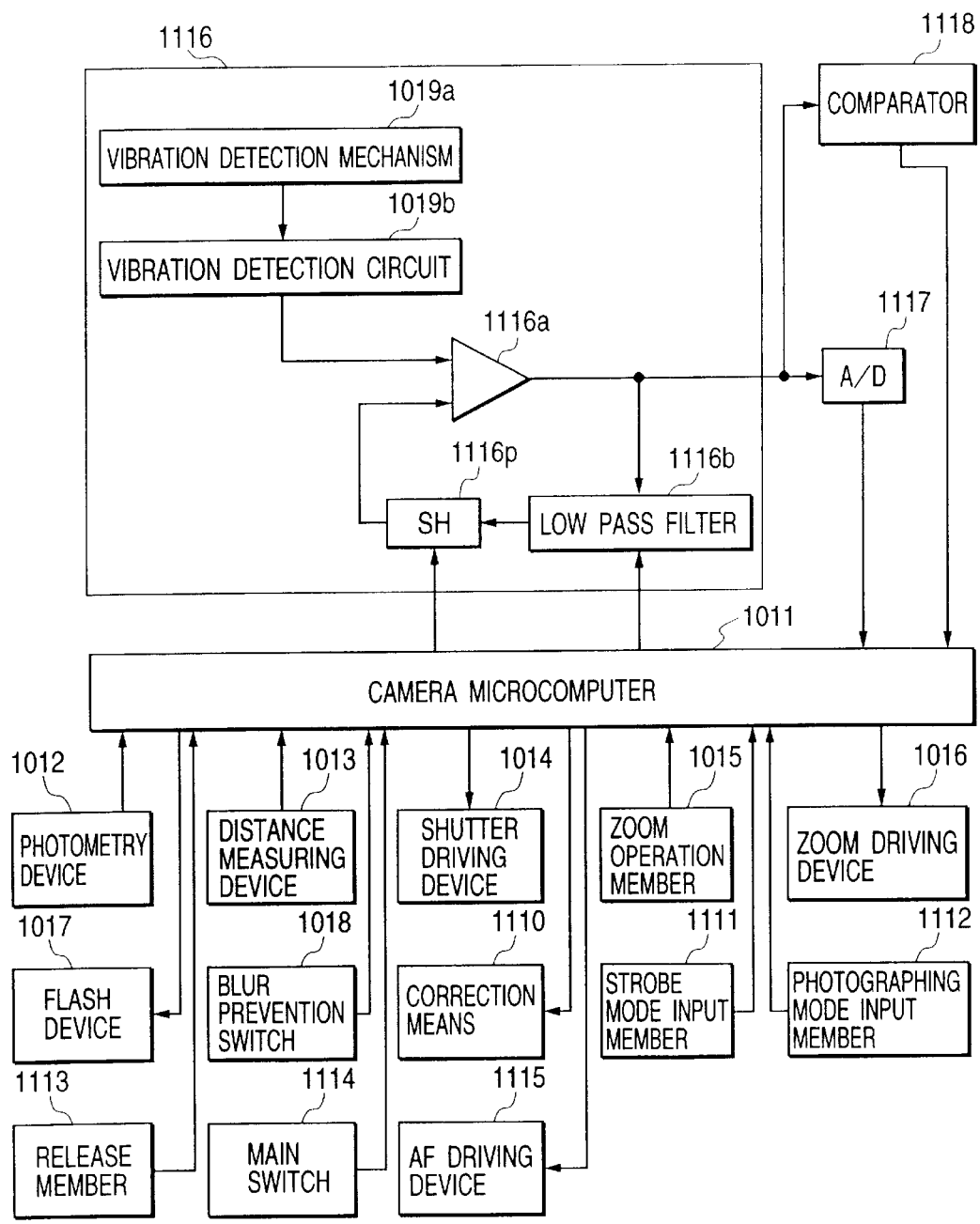
FIG. 17 is a block diagram to show a modification example obtained by modifying part of the circuit structure of FIG. 10.

FIG. 17 is a block diagram to show an example thereof, in which the output of the low pass filter 1116b is entered into a sample and hold (SH) circuit 1116p and an output thereof is entered into the differential circuit 1116a.

When the camera microcomputer 1011 outputs a hold signal to the sample and hold circuit 1116p, the sample and hold circuit 1116p holds the signal of the low pass filter 1116b.

Upon activation of the vibration detection unit 1116 the camera microcomputer 1011 outputs a sampling signal to the sample and hold circuit 1116p to make it keep sampling the signal of the low pass filter 1116b and then changes the time constant of the low pass filter 1116b to the larger value. Then the camera microcomputer 1011 outputs the hold signal to the sample and hold circuit 1116p to make the sample and hold circuit 1116p store the signal of the low pass filter 1116b. This causes the offset component overlaid on the vibration detection device 1019 to be entered into the differential circuit 1116a, whereby the offset component can be removed from the output thereof.

Figure 18:
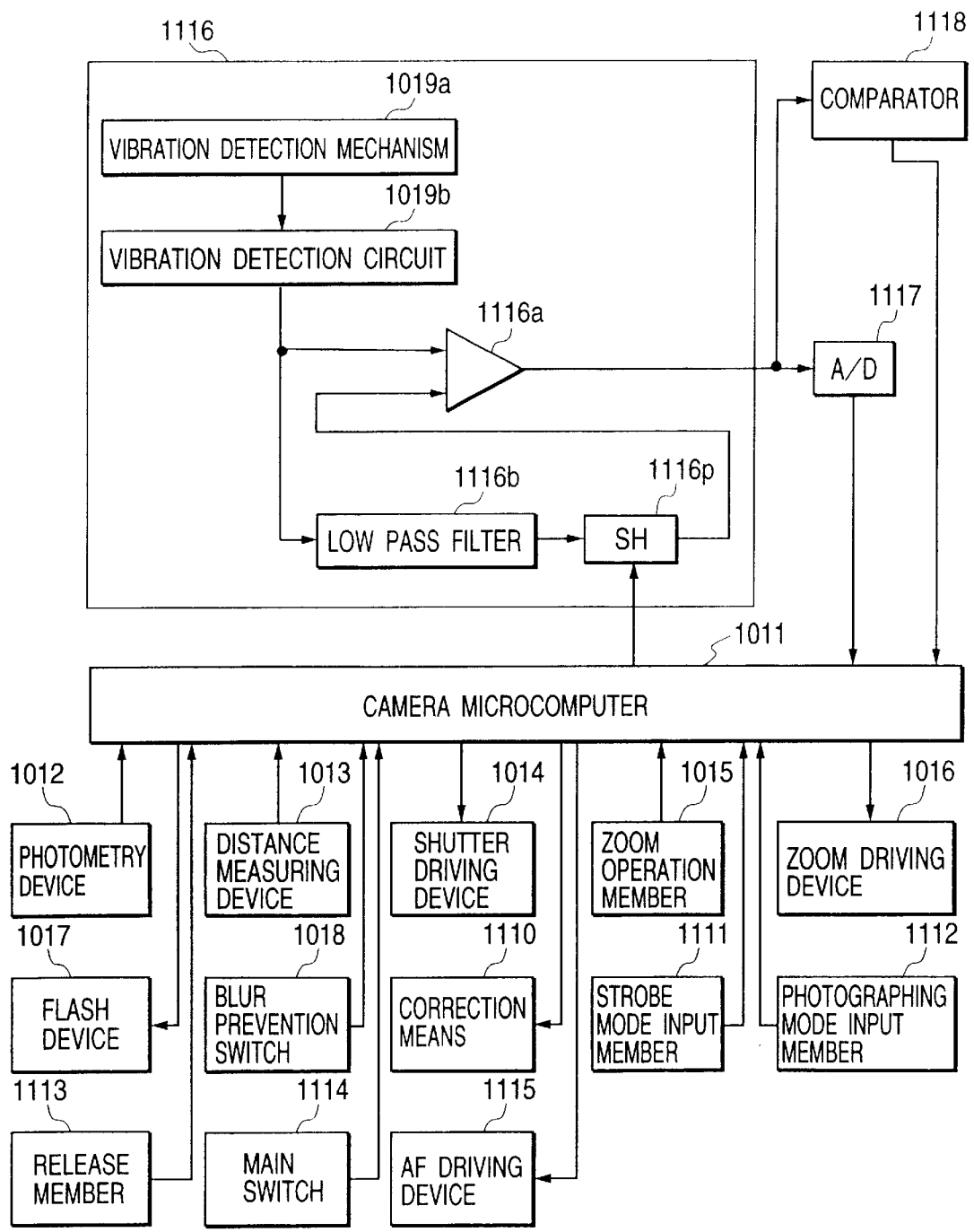
FIG. 18 is a block diagram to show another modification example obtained by modifying part of the circuit structure of FIG. 10.

Another circuit configuration may be arranged as illustrated in FIG. 18.

In FIG. 18, the output of the vibration detection device 1019 is entered directly into the low pass filter 1116b and the output thereof is stored in the sample and hold circuit 1116p. Then the differential circuit 1116a subtracts the offset component thus stored from the output of the vibration detection device 1019, thereby effecting the offset removal.

In this case, the camera microcomputer 1011 also first makes the sample and hold circuit 1116p keep sampling the signal of the low pass filter 1116b, then changes the time constant of the low pass filter 1116b, and thereafter makes the sample and hold circuit 1116p hold the signal of the low pass filter 1116b.

According to the fourth embodiment described above, the apparatus (vibration signal output apparatus) has the vibration detection device 1019 for detecting vibration, the memory means comprised of the clock gate 1116e, the up/down counter 1116f, and the D/A converter 1116g, the differential circuit 1116a for gaining the difference between the signal from the vibration detection device 1019 (also referred to as a first signal) and the signal from the memory means (also referred to as a second signal) and outputting a third signal, and the low pass filter 1116b for attenuating the high-frequency components from the third signal and outputting a fourth signal (see FIG. 10), and is arranged to make the memory means store the fourth signal and obtain the third signal by removing the offset component superimposed on the first signal;

or the apparatus (FIG. 17) is constructed to have the low pass filter 1116b for attenuating the high-frequency components from the first signal and outputting the fourth signal, the memory means for storing the fourth signal and outputting the second signal, which is comprised of the sample and hold circuit 1116p, and the differential circuit 1116a for obtaining the difference between the second signal and the first signal and outputting the third signal by removing the offset component superimposed on the first signal.

The high-frequency attenuation start frequency of the low pass filter 1116b is set in the range of 0.1 to 1 Hz from the relation with the hand vibration frequency band. Further, the time constant of the low pass filter 1116b is set variably and the time constant of the low pass filter 1116b is changed from the small value to the large value before the memory means stores the fourth signal. Further, the time constant of the low pass filter 1116b is changed depending upon the photographing mode of the camera or depending upon the exposure time. More specifically, when the exposure time is short or when the photographing mode is a mode with a limit to the exposure time, the time constant of the low pass filter 1116b is set to the small value.

These permit the circuit for the offset removal to be constructed without increasing the size, different from the conventional circuits, and also permit the low pass filter to cut the high-frequency components superimposed on the signal before storage, thus realizing the offset removal with accuracy.

(Fifth Embodiment)

Figure 19:
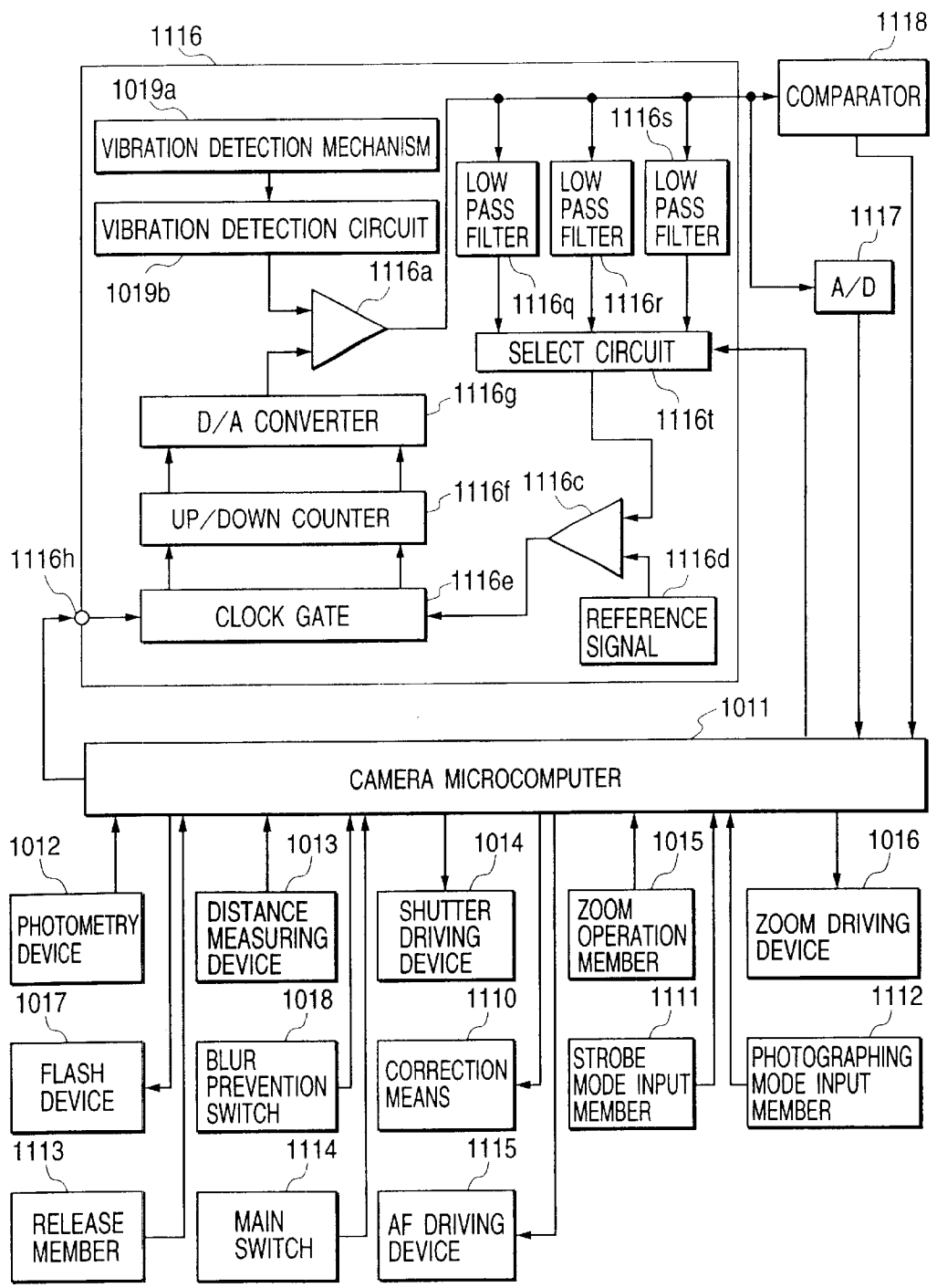
FIG. 19 is a block diagram to show the structure of the main part of the camera according to the fifth embodiment of the present invention.

FIG. 19 is a block diagram to show the structure of the main part of the camera according to the fifth embodiment of the present invention, in which like components as those in FIG. 10 are denoted by the same reference symbols.

A difference from FIG. 10 is provision of three low pass filters 1116q, 1116r, 1116s of different time constants.

The signal from the differential circuit 1116a is entered into each of the low pass filters 1116q, 1116r, 1116s to attenuate the high-frequency components. The low pass filter 1116q has such a characteristic as to attenuate the frequencies not less than 0.5 Hz, for example; thus the extraction accuracy of offset component is high but the start-up stability of the low pass filter is slow. The low pass filter 1116r has such a characteristic as to attenuate the frequencies not less than 2 Hz, for example; thus the extraction accuracy of offset component is adequate and the start-up stability of the low pass filter is also adequate. The low pass filter 1116s has such a characteristic as to attenuate the frequencies not less than 10 Hz, for example; thus the start-up stability of the low pass filter is quick but the offset component extraction accuracy is low.

An output of each low pass filter 1116q, 1116r, or 1116s is entered into a selection circuit 1116t, and the selection circuit 1116t selects one of the three low pass filters according to the photographing circumstances such as the exposure time, the photographing mode, etc. in response to a command from the camera microcomputer 1011 to connect it to the comparator 1116c.

For example, the low pass filter 1116q is selected when the exposure time is extremely long, because the high offset removal accuracy is required. The low pass filter 1116r is normally selected. The low pass filter 1116s is selected with a higher priority to a shutter chance when the exposure time is short.

Figure 20:
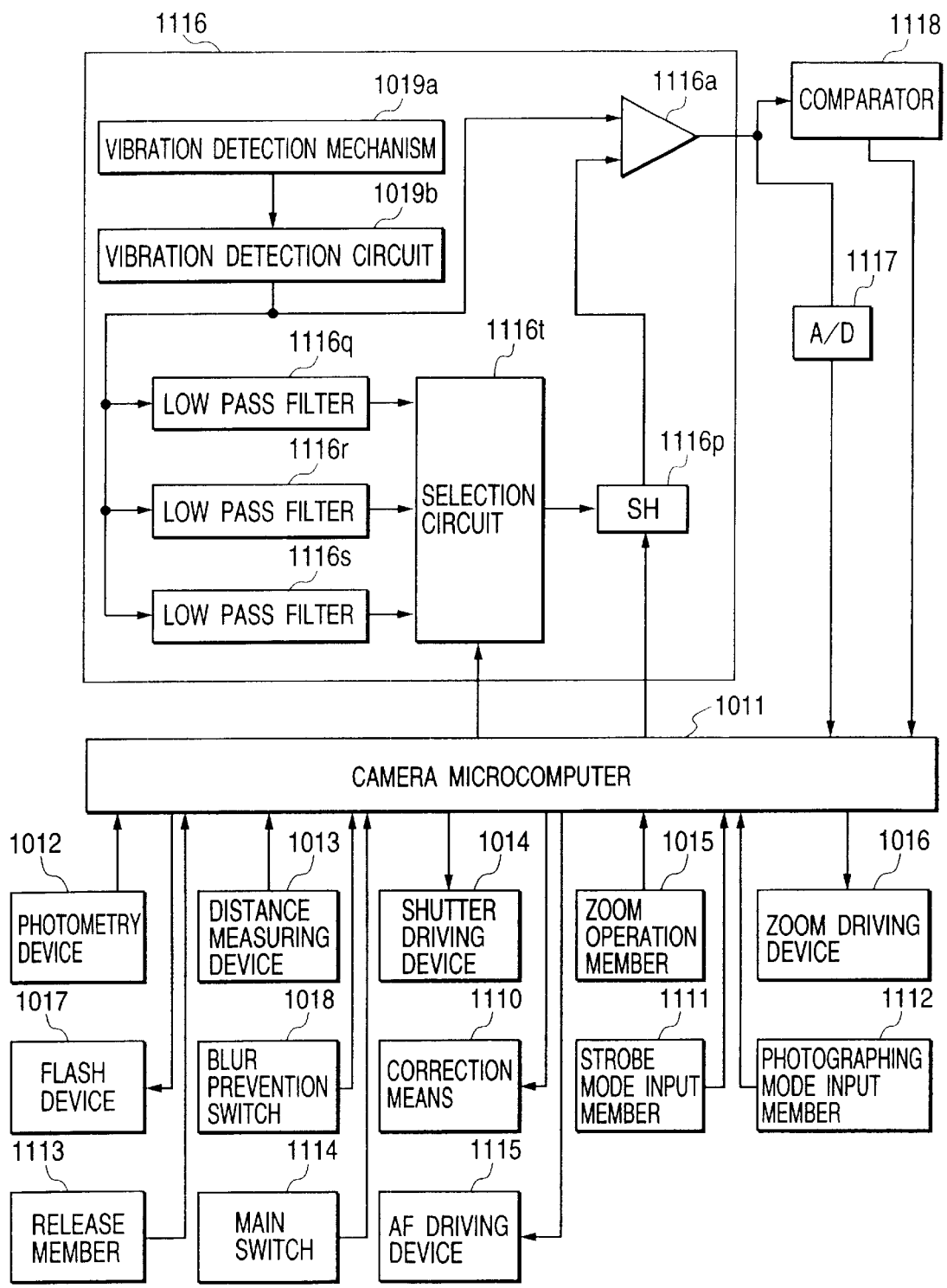
FIG. 20 is a block diagram to show a modification example obtained by modifying part of the circuit structure of FIG. 19.

The structure with the plurality of low pass filters as described above can also be applied to the case using the sample and hold circuit 1116*p* as illustrated in FIG. 20.

In FIG. 20, the output signal from the vibration detection circuit 1019*b* is entered into each of the low pass filters 1116*q*, 1116*r*, 1116*s*. The characteristics of the respective low pass filters are the same as in the case of FIG. 19. The signals from the respective low pass filters are entered into the selection circuit 1116*t* and the camera microcomputer 1011 selects one of the low pass filters 1116*q*, 1116*r*, 1116*s* according to the exposure time of the camera to output the signal thereof to the sample and hold circuit 1116*p*. The sample and hold circuit 1116*p* holds (or stores) the signal from the low pass filter selected at the same time as completion of preparation for photography, and the differential circuit 1116*a* outputs a signal resulting from the removal of the offset component.

According to the fifth embodiment described above, the apparatus (vibration signal output apparatus) has the vibration detection device 1019 for outputting a first signal, the plurality of low pass filters 1116*q*, 1116*r*, 1116*s* for attenuating the high-frequency components, the selection circuit 1116*t* for selecting either one of outputs from these low pass filters and outputting a fourth signal, and the differential circuit 1116*a* for obtaining a difference between the first signal and the fourth signal and outputting a third signal, and is constructed to supply the third signal to each of the low pass filters, thereby removing the offset component superimposed on the first signal to obtain the third signal (see FIG. 19); or the apparatus is constructed to have the vibration detection device 1019, the plurality of low pass filters 1116*q*, 1116*r*, 1116*s* for attenuating the high-frequency components from the first signal from the vibration detection device 1019, the selection circuit 1116*t* for selecting either one of outputs from these low pass filters and outputting it as a fourth signal, and the differential circuit 1116*a* for obtaining the difference between the first signal and the fourth signal and outputting the third signal by removing the offset component superimposed on the first signal (see FIG. 19).

The apparatus further has the memory means (the clock gate 1116*e*, the up/down counter 1116*f*, and the D/A converter 1116*g*, or the sample and hold circuit 1116*p*) which stores as the fourth signal either one selected from the signals of the low pass filters according to the state of the camera by the selection circuit 1116*t* and which outputs the stored value to the differential circuit 1116*a*.

This does not present only the effect described in the above fourth embodiment, but also presents the following effect; because the plurality of low pass filters of the different time constants are actuated simultaneously, a proper output can be obtained immediately even after another low pass filter is selected according to circumstances.

(Sixth Embodiment)

Figure 21:
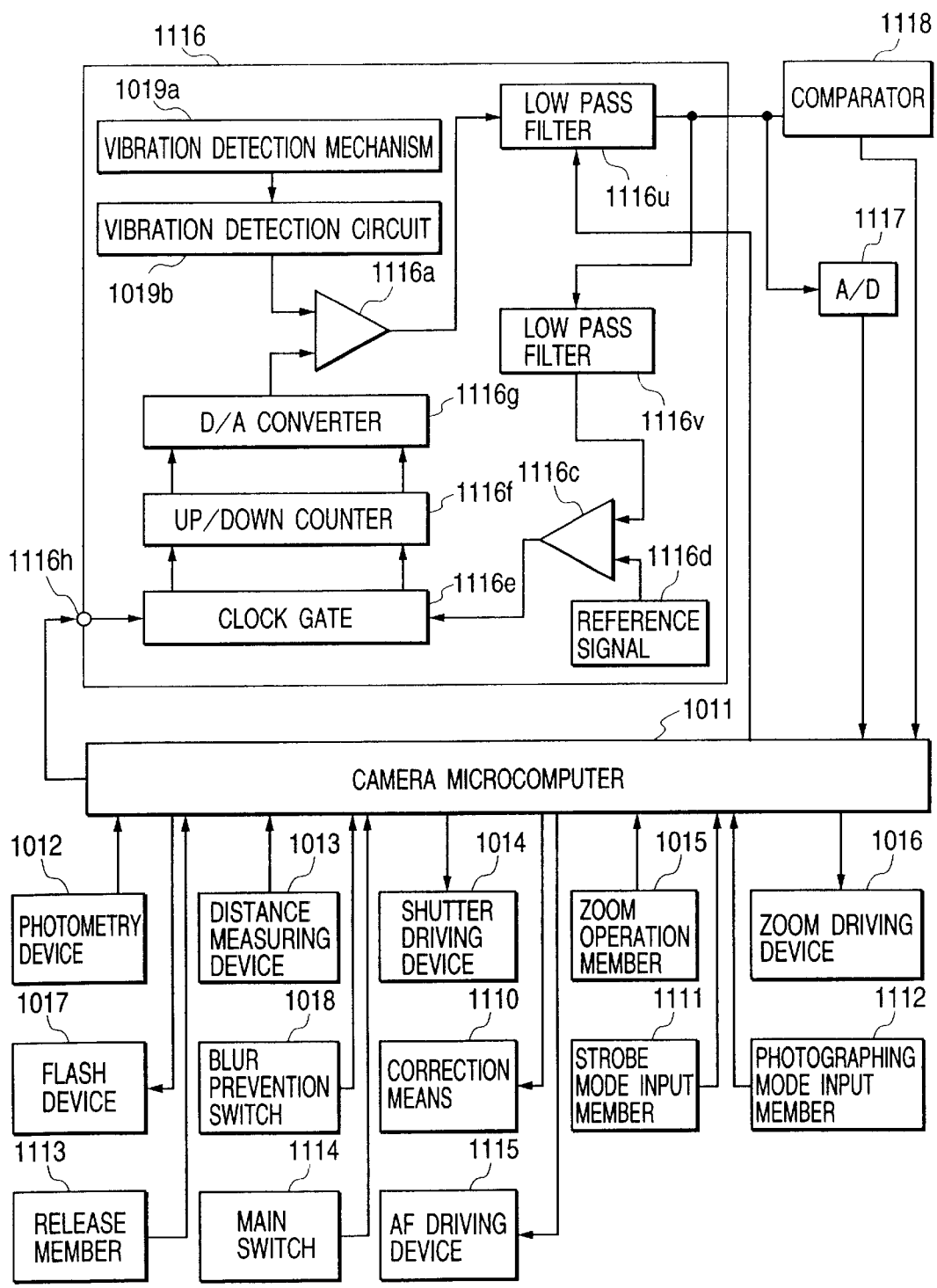
FIG. 21 is a block diagram to show the structure of the main part of the camera according to the sixth embodiment of the present invention.

FIG. 21 is a block diagram to show the circuit structure of the camera according to the sixth embodiment of the present invention, in which like components as those in FIG. 10 are denoted by the same reference symbols.

The signal from the vibration detection circuit 1019*b* is entered into the differential circuit 1116*a* and the signal therefrom is supplied to a low pass filter 1116*u* of variable time constant controlled by the camera microcomputer 1011. The output from the low pass filter 1116*u* is supplied to the comparator 1118, to the A/D converter 1117, and to a low pass filter 1116*v*. A signal from the low pass filter 1116*v* is supplied to the comparator 1116*c* and then is subjected to the offset removal by the clock gate 1116*e*, the up/down counter 1116*f*, the D/A converter 1116*g*, and the differential circuit 1116*a*.

The present embodiment is different from the fourth embodiment of FIG. 10 in that the low pass filter 1116*u* is placed between the differential amplifier 1116*a* and, the comparator 1118 or the A/D converter 1117 and in that the time constant of the low pass filter 1116*u* can be changed.

The output from the low pass filter 1116*u* is converted into a digital signal by the A/D converter 1117 and the digital signal is read out by the camera microcomputer 1011. If the signal of the low pass filter 1116*u* includes a lot of noise there will arise conversion errors in the digitization (coding) of signal. It is thus necessary to sufficiently remove the noise before the A/D conversion. The low pass filter 1116*u* plays the role for that purpose to remove the noise out of the signal from the differential circuit 1116*a*.

The low pass filter 1116*u* preferably has a large time constant for the offset removal as described previously, but for the control of blur prevention the large time constant of the low pass filter 1116*u* is not preferable, because the actual hand vibration signal is also attenuated. Therefore, the camera microcomputer 1011 sets the large time constant of the low pass filter 1116*u* during the period of the offset removal operation executed by the clock gate 1116*e*, up/down counter 1116*f*, D/A converter 1116*g*, and differential circuit 1116*a* and then sets the small time constant after completion of the offset removal.

More precisely, during a predetermined time (for example, 0.1 second) after the start of driving of the vibration detection device 1019 the time constant of the low pass filter 1116*u* is maintained small (for example, in such a characteristic as to remove the high-frequency components of 200 Hz and higher) to achieve the early stabilization of the low pass filter 1116*u*, and thereafter the time constant of the low pass filter 1116*u* is set to a large value (for example, in such a characteristic as to remove the high-frequency components of 5 Hz and higher).

Waiting a predetermined time thereafter (for example, 0.1 second after the change of the time constant), the camera microcomputer 1011 starts outputting the clock signals to the clock gate 1116*e* to start the offset removal. After a lapse of a further predetermined time (for example, 0.2 second after the output of clock signal), the microcomputer stops the output of clock signal to terminate the offset removal operation. Then the microcomputer changes the time constant of the low pass filter 1116*u* again to the small value, whereby the accurate vibration signal can be sent to the A/D converter 1117.

During the period of the offset removal the high-frequency components of hand vibration are attenuated and are not entered into the A/D converter 1117. This provides the following advantages.

Specifically, before completion of the offset removal the offset signal is entered into the camera microcomputer 1011 and superposition of the high-frequency components of hand vibration will raise the possibility that the calculation signal in the camera microcomputer 1011 becomes saturated (or overflows) because of an offset amount plus a high-frequency vibration amount. Once it overflows, a considerable time is necessary for recovery therefrom. Therefore, some countermeasures are necessary in order to prevent the signal from overflowing. The present embodiment provides the simple countermeasures by the structure in which the high-frequency hand vibration is not entered into the A/D converter 1117 during the offset removal (by attenuating it by the low pass filter 1116*u*).

The low pass filter 1116*v* enhances the extraction accuracy of offset component by further attenuating the high-frequency components in the signal from the low pass filter 1116u. It is a matter of course that when the time constant of the low pass filter 1116u is set further greater, this filter is enough to enhance the extraction accuracy of offset component. In this case the low pass filter 1116v may be omitted.

It can also be contemplated that without change of time constant the time constant of the low pass filter 1116u is fixed in such a high-frequency attenuation characteristic as not to degrade the hand vibration, the time constant of the low pass filter 1116v is set to a larger value on the other hand, and the extraction accuracy of offset component is enhanced by cooperation of the low pass filter 1116u with the low pass filter 1116v. This configuration obviates the need for the time constant changing instruction signal from the camera microcomputer 1011.

According to the sixth embodiment described above, the apparatus (vibration signal output apparatus) is constructed to have the vibration detection device 1019 for detecting the vibration and outputting a first signal, the first low pass filter 1116v for attenuating the high-frequency components and outputting a fourth signal, the differential circuit 1116a for obtaining a difference between the first signal and the fourth signal and outputting a third signal, and the second low pass filter 1116u with the variable time constant for attenuating the high-frequency components of the third signal and outputting a fifth signal, and is arranged to supply the fifth signal to the first low pass filter 1116u to remove the offset component superimposed on the first signal to obtain the third signal.

The apparatus also has the memory means for storing the fourth signal and outputting the stored value to the differential circuit 1116a and is arranged to change the time constant of the second low pass filter 1116u according to the state of the camera.

This permits the circuit for the offset removal to be constructed without increasing the size, different from the conventional circuits, and also permits the low pass filter to cut the high-frequency components superimposed on the signal before storage, thus realizing the offset removal with accuracy.

(Seventh Embodiment)

Figure 22:
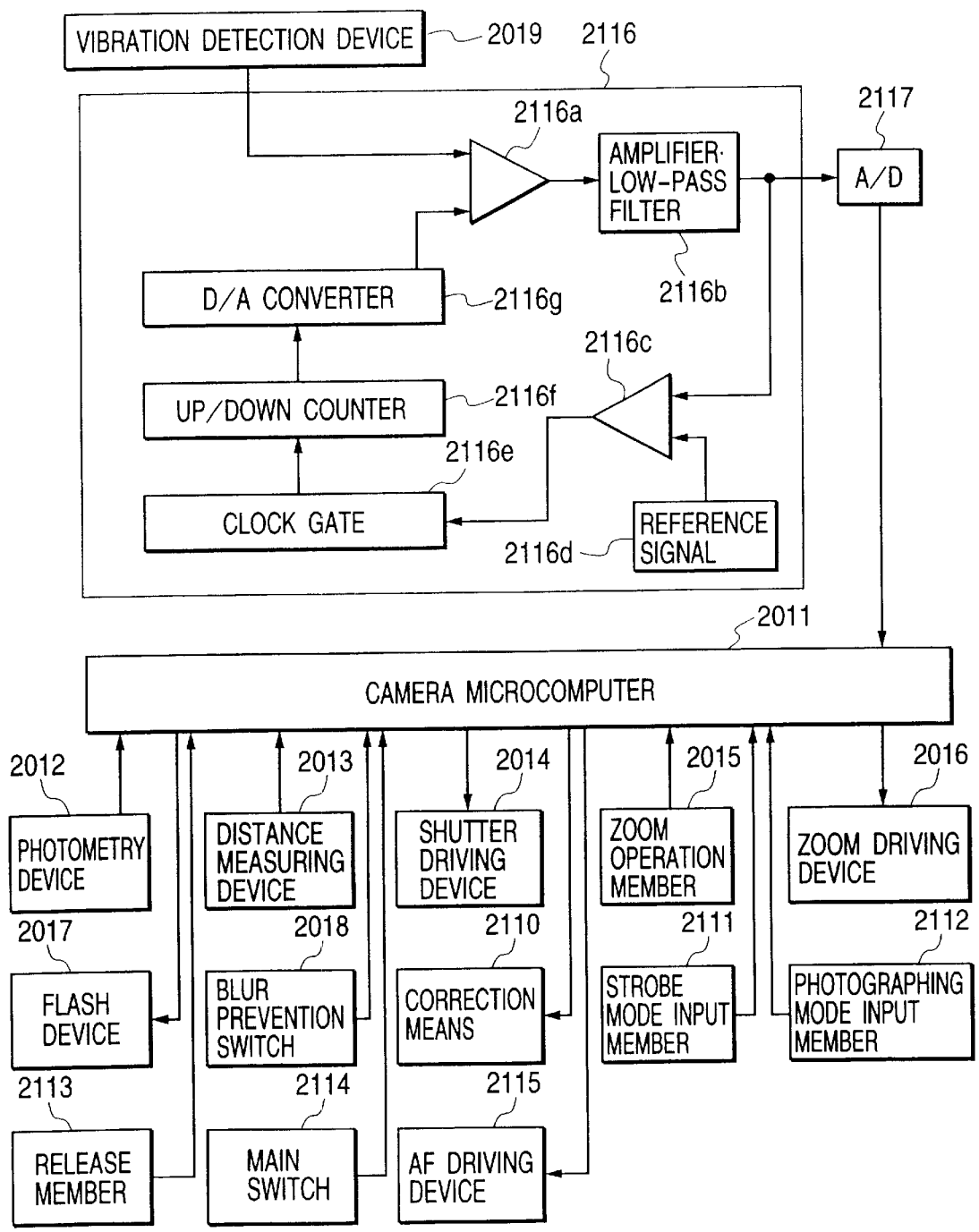
FIG. 22 is a block diagram to show the structure of the main part of the camera as a premise of the seventh embodiment of the present invention.

FIG. 22 is a block diagram to show the circuit structure of the camera as a premise of the seventh embodiment of the present invention, in which only the parts related to the present embodiment are illustrated and the other components of the camera are omitted for simplification of the description.

In FIG. 22, when the camera microcomputer 2011 (having the same structure as the microcomputer 411 of FIG. 32) accepts an on signal of the main switch 2114, it feeds the photographing lens barrel out from the collapsed state to the photographable state of the optical system and also opens the lens barrier at the same time. On this occasion, the microcomputer also activates the vibration detection device 2019 consisting of the vibration detection mechanism 2019a and the vibration detection circuit 2019b.

A photographing mode selected by the photographer is supplied from the photographing mode input member 2112 into the camera microcomputer 2011. The photographing mode is selected, for example, from the sports mode suitable for photography of an object moving around, the portrait mode suitable for photography of a person or people in a close-up state, the macro mode suitable for photography of an object in close proximity, and the night view mode suitable for photography of night views.

A strobe mode is entered from the strobe mode input member 2111 into the camera microcomputer 2011. The strobe mode is selected from the strobe-off mode for photography without use of the strobe, the strobe-on mode for photography with forced flashing of the strobe, and the strobe-auto mode in which whether the strobe should be on or off is controlled depending upon the luminance of the object, the direction of rays, or the like, and it is also possible to determine whether the red-eye relieving function is to be made active upon flashing of the strobe.

The photographer determines whether the blur correction should be effected during photography and enters the information about it through the blur prevention switch 2018 into the camera microcomputer 2011. A zoom signal in response to manipulation of the photographer is entered through the zoom operation member 2015 into the camera microcomputer 2011 and the camera microcomputer 2011 controls the zoom driving device 2016 to vary the photographing focal length.

Once the above photographing focal length is determined, the photographer depresses the release member 2113 as a shutter release button by a half stroke (to turn sw1 on). At the timing of this half-stroke depression the distance measuring device 2013 measures the distance to the object and outputs the information (measured distance information) to the camera microcomputer 2011. The camera microcomputer 2011 controls the AF driving device 2115, based on the measured distance information, to drive part or the whole of the photographing lens barrel, thereby adjusting the focus of the photographing optical system.

At this time, the vibration information from the vibration detection device 2019 is also supplied through the A/D converter 2117 to the camera microcomputer 2011, and the camera microcomputer 2011 determines from the vibration state whether the camera is held by hands or fixed on the tripod or on the ground.

The photometry device 2012 supplies the luminance of the object to the camera microcomputer 2011. Then the camera microcomputer 2011 calculates the exposure time and also determines whether the flash device 2017 is to be used, based on the photographic information determined heretofore, including the luminance information, the speed and type of film, the use condition of the blur prevention system, the photographing focal length and brightness of the lens at that time, the photographing mode, selection of blur correction, the information of the distance to the object, the vibration information, and so on.

With the full-stroke depression of the release member 2113 (on of sw2), the camera microcomputer 2011 controls the correction means 2110, based on the signal from the vibration detection device 2019, to start the blur correction. Thereafter, the camera microcomputer controls the shutter driving device 2014 to execute exposure on the film and lights up the flash device 2017 according to circumstances.

Reference numeral 2116 designates an analog signal processing circuit composed of the DC cut filter 48p and low pass filter 49 explained referring to FIG. 32, which cuts the offset and noise components superimposed on the output from the vibration detection device 2019 and which outputs the resultant signal to the A/D converter 2117. The A/D converter 2117 samples the signal from the analog signal processing circuit 2116 and sends the sampled signal to the camera microcomputer 2011.

The method of cutting the offset signal of the vibration detection device 2019 in the analog signal processing circuit 2116 herein is one not utilizing the filter having the frequency characteristics as described referring to FIG. 32 but making use of the following structure.

The signal detected by the vibration detection device 2019 is supplied to the analog signal processing circuit 2116 and first the differential circuit 2116a subtracts the offset extract component described hereinafter from the signal. Then the amplifier•low pass filter 2116b cuts the noise superimposed on the signal component, as the low pass filter 49p of FIG. 32 did, and amplifies the signal. The output signal from the amplifier•low pass filter 2116b is supplied to the A/D converter 2117 and also to the comparator 2116c. The comparator 2116c compares the input signal from the amplifier•low pass filter 2116b with the reference signal 2116d. The reference signal 2116d is approximately half of the power-supply voltage supplied to the vibration detection circuit 2019b, and thus is a central value of the signal output range of the vibration detection device 2019. Further, this reference signal is also used as a reference in the subsequent operations of DC removal by the digital filter and integration in the camera microcomputer 2011.

The comparator 2116c outputs a signal of "H" to the clock gate 2116e when the signal from the amplifier•low pass filter 2116b is greater than the reference signal (or when a positive offset voltage is present). When the signal from the amplifier•low pass filter 2116b is smaller than the reference signal 2011d (or when a negative offset voltage is present), the comparator 2116c outputs a signal of "L" to the clock gate 2116e. While the clock signals are entered via the reset terminal 2116h, the clock gate 2116e sends the signal from the comparator 2116c to the up/down counter 2116f.

When the signal from the clock gate 2116e is "H", the up/down counter 2116f counts one bit up every clock. When the signal from the clock gate 2116e is "L", the up/down counter 2116f counts one bit down every clock. The D/A converter 2116g outputs an analog signal according to the output of the up/down counter 2116f; for example, with increment of one bit, the converter outputs +2 mV to the differential circuit 2116a.

The camera microcomputer 2011 outputs the clock signals for 0.1 second to the clock gate 2116e, for example, from 0.1 second after the activation of the analog signal processing circuit 2116 (i.e., after input of power to the analog signal processing circuit 2116).

In the structure as described above, when the main switch 2114 of the camera is turned on first, the vibration detection device 2019 and analog signal processing circuit 2116 become active.

Let us suppose here for explanation's sake that the vibration including the hand vibration and the like is little. In this case, the output of the vibration detection device 2019 varies as indicated by a waveform 2118 of FIG. 23A from the start of operation and becomes an offset $V_1$ finally. Here the signal varies greatly during the period from immediately after the start of the operation to the time To. When the vibration detection device 2019 is, for example, a well-known vibration gyro, it is the variation of the signal before stabilization of vibration thereof. When the vibration detection device 2019 is an angular acceleration sensor, it is the variation of the signal before stabilization of the circuit.

The camera microcomputer 2011 keeps outputting the clock signals to the clock gate 2116e from the time $T_1$ (for example, 0.1 second) after the activation thereof up to the time $T_2$. The reason why the clock signals are not outputted to the clock gate 2116e before the lapse of the time $T_1$ is that the offset component superimposed on the signal from the vibration detection device 2019 varies up to that time as described previously.

Since the output of the differential circuit 2116a is first the signal offset $V_1$ at the time $T_1$, the comparator 2116c outputs the signal "H", so that the signal of the D/A converter 2116g entered into the differential circuit 2116a is increased every input of one clock into the clock gate 2116e. Therefore, the offset component of the signal of the differential circuit 2116a decreases with increase of clocks (as indicated by a waveform 2119) and in the final stage the signal of the differential circuit 2116a varies alternately according to clocks in the range of the minimum resolving power (for example, 2 mV) of the D/A converter 2116g (as indicated by an arrow 2120).

Since the camera microcomputer 2011 stops the output of clock signal at the time $T_2$, the signal outputted from the D/A converter 2116g to the differential circuit 2116a is fixed to the signal at the end of the output of clock signal. This terminates the variation of the signal of the arrow 2120 illustrated in FIG. 23A and the offset component decreases to $V_2$.

In the case of the conventional DC cut filter 48p described with FIG. 32, the final offset component can be made zero; whereas in the system of the present embodiment there are possibly cases in which the small offset ($V_2$) remains.

The following describes the reason why the analog signal processing circuit 2116 has to carry out the offset removal, though the offset removal is also carried out in the subsequent process in the camera microcomputer 2011.

Let us suppose that the offset removal were not carried out by the analog signal processing circuit 2116. The output of the vibration detection device 2019 is amplified with a considerably high gain before the A/D conversion and entry into the camera microcomputer 2011. This is because the output of the hand vibration component detected by the vibration detection device 2019 is very small. For that reason, the signal of the amplifier can become saturated because of the offset component superimposed on the signal. For preventing this saturation, the offset of the signal of the vibration detection device 2019 needs to be decreased to a certain level before the amplification.

Figure 23A:
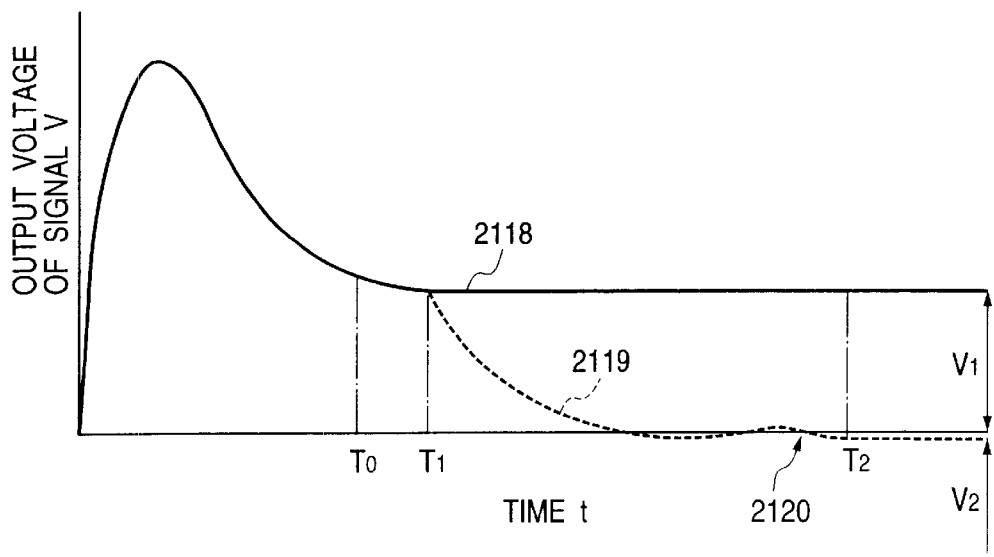
FIGS. 23A and 23B are timing charts from the start of vibration detection to the removal of offset component in the respective circuit structures of FIGS. 22 and 24.

In the structure of FIG. 22, the offset component $V_1$ is decreased to $V_2$ as illustrated in FIG. 23A, whereby the signal of the amplifier•low pass filter 2116b can be prevented from becoming saturated.

When the offset component is removed by the method as described above, it can obviate the need for the large-capacitance capacitor as in used the conventional DC cut filter and thus the circuit can be compactified considerably. Further, the structure of the present embodiment does not include the time constant circuit composed of the capacitor and resistors, and thus has the advantage that there is no possibility of the degradation of blur prevention accuracy due to the phase shift in the hand vibration frequency band. However, the small offset $V_2$ (2 mV) remains without being removed, different from the conventional offset removal, as described previously. Since this offset amount is the known value of 2 mV, it seems able to be removed by a subsequent process. However, the waveform 2119 actually vibrates alternately between 2 mV and −2 mV near the time $T_2$ as described above. The offset amount at the time $T_2$ becomes either 2 mV or −2 mV, depending upon a small variation in the original offset of the vibration detection device 2019, and it is thus difficult to predict the offset amount.

Figure 24:
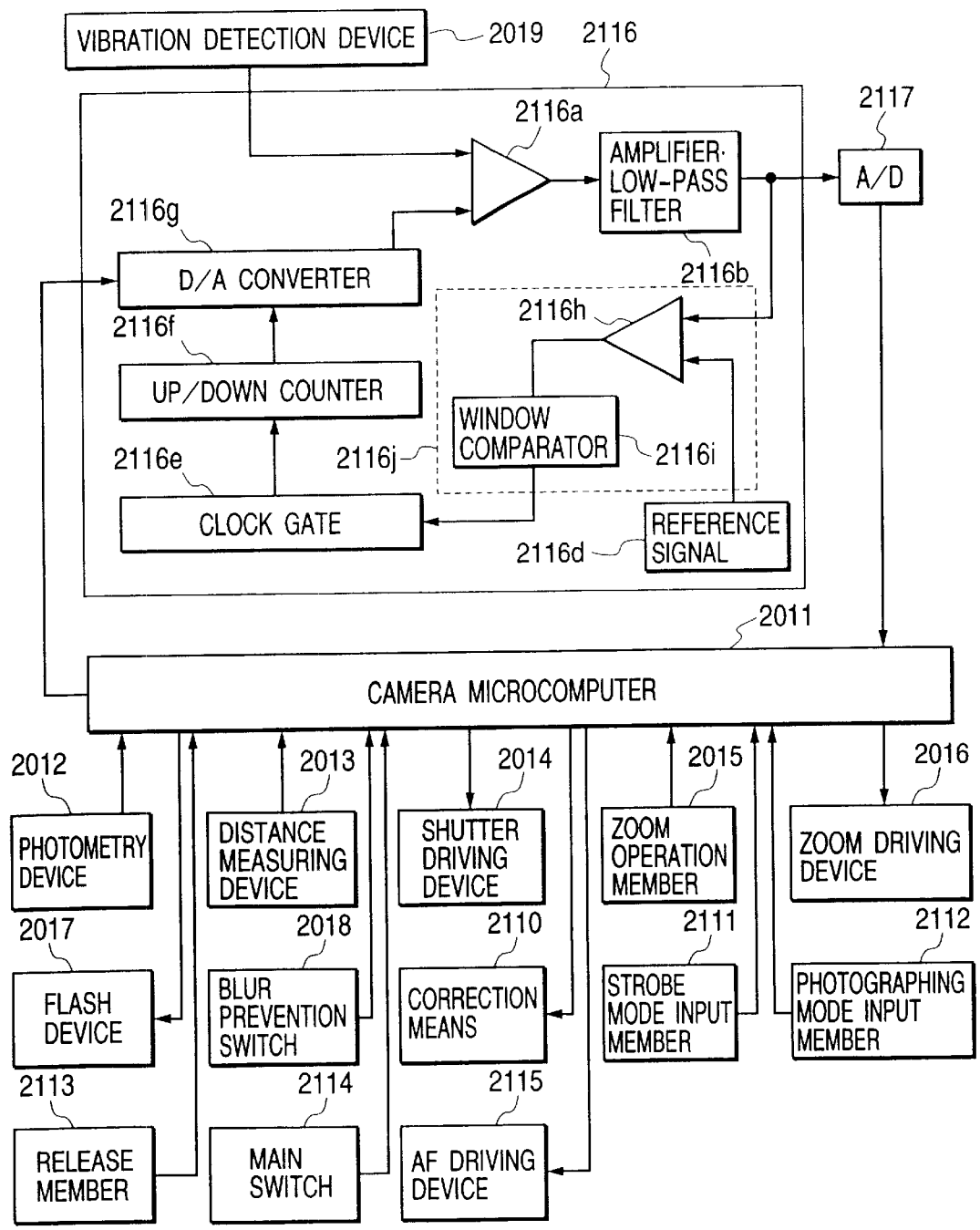
FIG. 24 is a block diagram to show a modification example obtained by modifying part of the circuit structure of FIG. 22.

Then the present embodiment makes it possible to predict the remaining offset amount by further modifying the apparatus in the structure as illustrated in FIG. 24.

In FIG. 24, different from FIG. 22, the comparator 2116c is replaced by a differential circuit 2116h and a window comparator 2116i which compose a comparator 2116j having a dead zone. The dead zone of the window comparator 2116j is set, for example, in the range of 2 to 4 mV. When the output of the differential circuit 2116h is off the range of this dead zone, the window comparator 2116*j* outputs a signal of "H" or "L" depending upon the polarity of the differential circuit 2116*h,* to the clock gate 2116*e*. As the offset in the signal of the differential circuit 2116*a* becomes gradually removed to decrease the difference from the reference signal 2116*d* (for example, to 3 mV or below), the window comparator 2116*j* stops outputting the signal and the offset removal operation is ended at this point.

Since the comparator has the dead zone as described above, the offset removal is not carried out inside the dead zone, so that the alternating change of the offset as indicated by the arrow 2120 in FIG. 23A does not occur.

The D/A converter 2116*g* varies its D/A conversion ratio in response to a signal from the camera microcomputer 2011. For example, when the camera microcomputer 2011 supplies no signal, the D/A converter outputs +2 mV with increment of one bit in the count of the up/down counter, whereas it outputs −2 mV with decrement of one bit. When the camera microcomputer 2011 supplies the signal, the D/A converter outputs +10 mV with increment of one bit in the count of the up/down counter, whereas it outputs 10 mV with decrement of one bit. The camera microcomputer 2011 outputs the signal to the D/A converter 2116*g* for a predetermined time (for example, 50 msec) after the time $T_1$ to increase the output of the D/A converter 2116*g* per bit of the up/down counter 2116*f*.

Figure 23B:
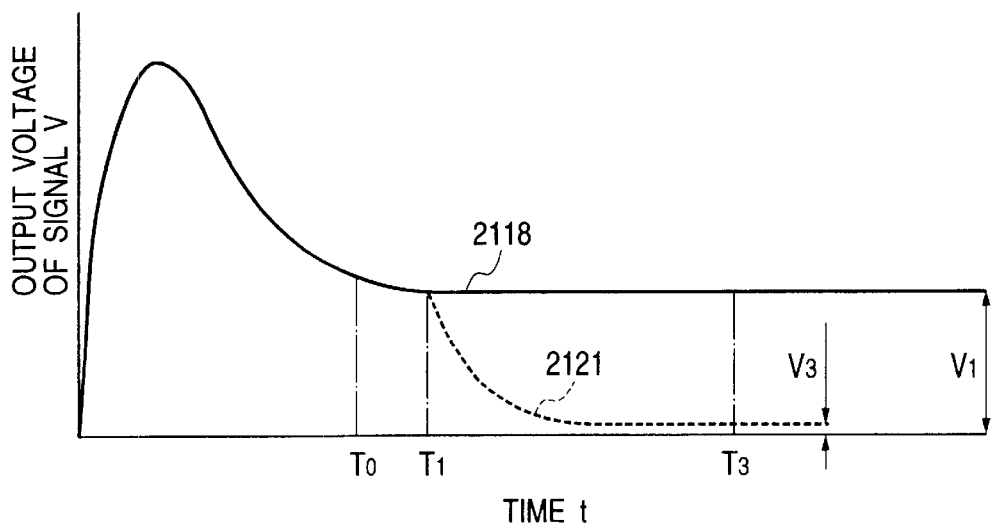

FIG. 23B shows the waveform of the offset removal operation in the circuit block of FIG. 24, in which the offset-removed waveform is as indicated by 2121 against the same offset signal 2118 as that illustrated in FIG. 23A.

It is apparent from comparison of the waveform 2121 with the waveform 2119 that their offset removing speeds after the time $T_1$ are different. This is due to the difference between outputs of the D/A converter 2116*f* per bit, and the offset removal can be achieved earlier by the circuit block of FIG. 24 which outputs 10 mV per bit. However, if this is continued the offset removal accuracy will be maintained low. Thus the camera microcomputer 2011 stops the output of signal to the D/A converter 2116*f* after a lapse of the predetermined time from the time $T_1$ to make the output per bit smaller. This permits the accurate offset removal to be effected after the removal of large offset in the early stage.

In FIG. 23B the alternating vibration of the offset as indicated by the arrow 2120 of FIG. 23A does not appear but the offset is constant. This is due to the dead zone of the window comparator 2116*i* as described previously. When the original signal has a positive offset relative to the reference value as in the case of the waveform 2118 of FIG. 23B, the offset becomes a constant value, for example, of +3 mV. When the original signal has a negative offset relative to the reference value, this offset is fixed finally to −3 mV. It is thus possible to know the offset component remaining after the offset removal, by checking the original signal. Thus the accurate offset removal can be achieved by subtracting this remaining offset component in the subsequent process (for example, during the calculation operation by quantization in the camera microcomputer 2011).

Figure 25:
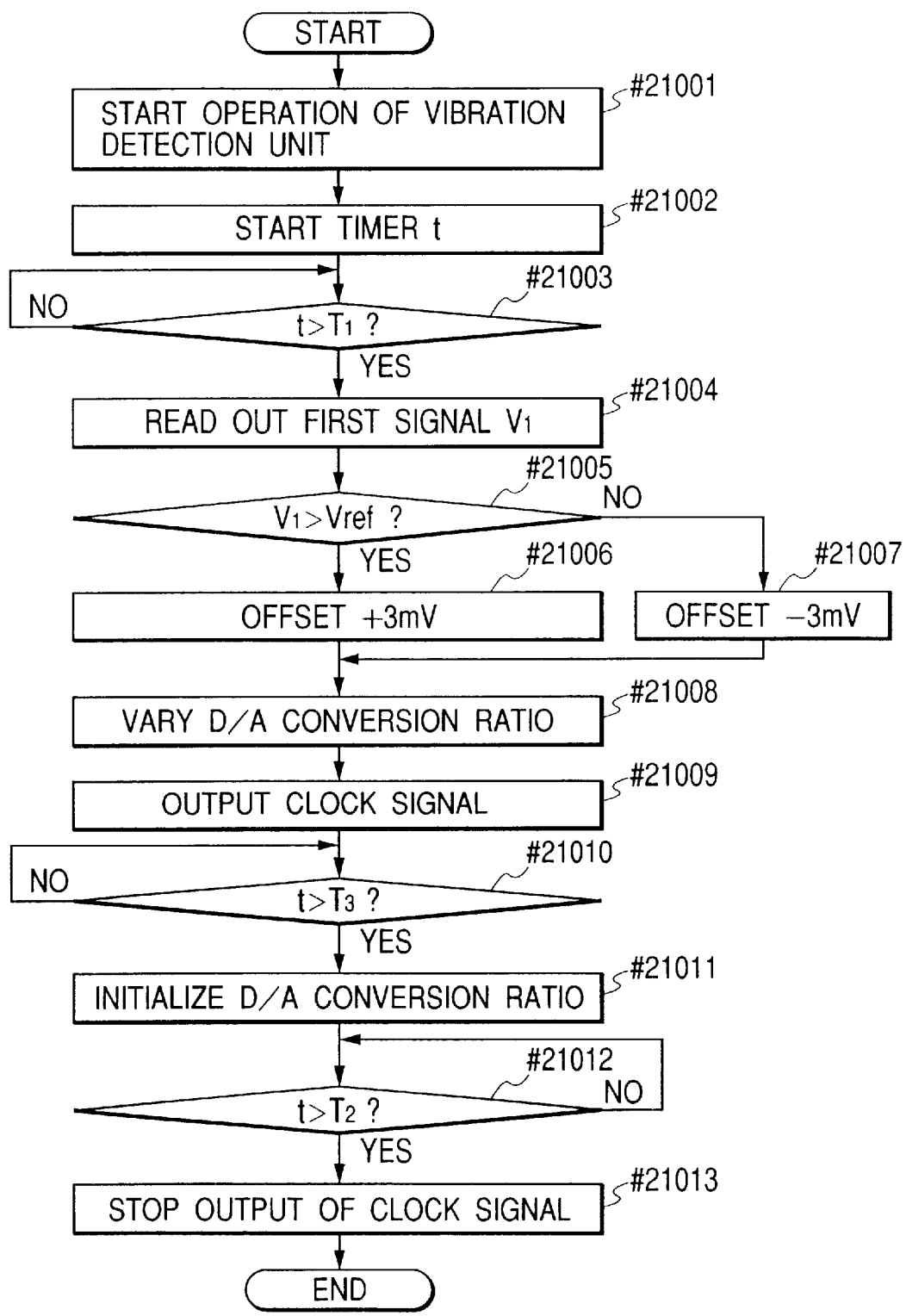
FIG. 25 is a flowchart to show the operation of the camera according to the seventh embodiment of the present invention.

FIG. 25 is a flowchart for explaining the operation of the above camera microcomputer 2011, and this flow is started with on of the main switch of the camera. (This flow also becomes active during off of the blur prevention switch 2018 because the vibration detection device 2019 and analog signal processing circuit 2116 are driven in the standby state.)

In first step #21001, the power is supplied to the vibration detection device 2019 and analog signal processing circuit 2116 to start the operation thereof. In next step #21002 the timer t is started and in subsequent step #21003 the microcomputer waits for the time $T_1$ (for example, 0.1 sec) and then goes to step #21004. This is for avoiding the extraction error of offset component, because there is the great variation of offset component in the initial stage of driving of the vibration detection device 2019, as described referring to FIG. 23A.

In next step #21004, the signal (first signal) $V_1$ entered into the camera microcomputer 2011 is read out of the A/D converter 2117. Since there is no output from the D/A converter 2116*g* yet at this time, the signal entered into the camera microcomputer 2011 includes the offset. If the offset is large the signal $V_1$ can be saturated in certain cases.

In step #21005, the signal $V_1$ is compared with the reference signal Vref. At this time, only the polarity of the signal $V_1$, even if saturated, is checked against the reference signal Vref. Thus whether the signal $V_1$ is saturated or not is not significant, because the requirement here is to find out whether it is saturated on the positive side or on the negative side. Then the sequence branches to step #21006 or to step #21007, depending upon the polarity of the signal $V_1$ against the reference signal Vref.

In the flow to step #21006, since the signal $V_1$ is greater than the reference signal Vref and thus the offset of +3 mV remains (the remaining offset) even after the offset removal, +3 mV is stored in order to subtract that offset in the camera microcomputer 2011. In the flow to step #21007, since the signal $V_1$ is smaller than the reference signal Vref and thus the offset of −3 mV remains (the remaining offset) even after the offset removal, −3 mV is stored in order to add that in the camera microcomputer 2011. After that, the flow goes to step #21008 from either step.

In step #21008, the D/A (conversion) ratio of the D/A converter 2116*g* is changed. This step is to change the output of the D/A converter 2116*g* per bit of the up/down counter 2116*f* from the reference of 2 mV to 10 mV. In next step #21009, the camera microcomputer 2011 outputs the clock signals to start the removal of the offset component superimposed on the output signal (first signal) of the vibration detection device 2019. Since the D/A conversion ratio of the D/A converter 2116*g* is large (10 mV) at this time, the offset removal speed is fast, because the offset is removed largely per output of clock from the camera microcomputer 2011.

In next step #21010, the microcomputer waits up to the time $T_2$ and then goes to step #21011. This step #21010 is to set the time for keeping the D/A conversion ratio of the D/A converter 2116*g* changed; for example, the time is set to 30 msec from the time $T_1$. In next step #21011, the D/A conversion ratio is initialized to that of 2 mV per bit in the up/down counter 2116*f*.

In step #21012, the microcomputer waits up to the time $T_2$ and then goes to step #21013. The time $T_2$ is set to 0.1 second after the time $T_1$, to control the end of the offset removal operation. In next step #21013, the camera microcomputer 2011 stops the output of clock signal to terminate the operation of the offset removal from the first signal, thus ending this flow.

In this flow the initialization of the D/A conversion ratio was controlled by the time, but the apparatus may also be modified so that the D/A conversion ratio is initialized when the magnitude of offset superimposed on the first signal is decreased to below a predetermined level.

Figure 26:
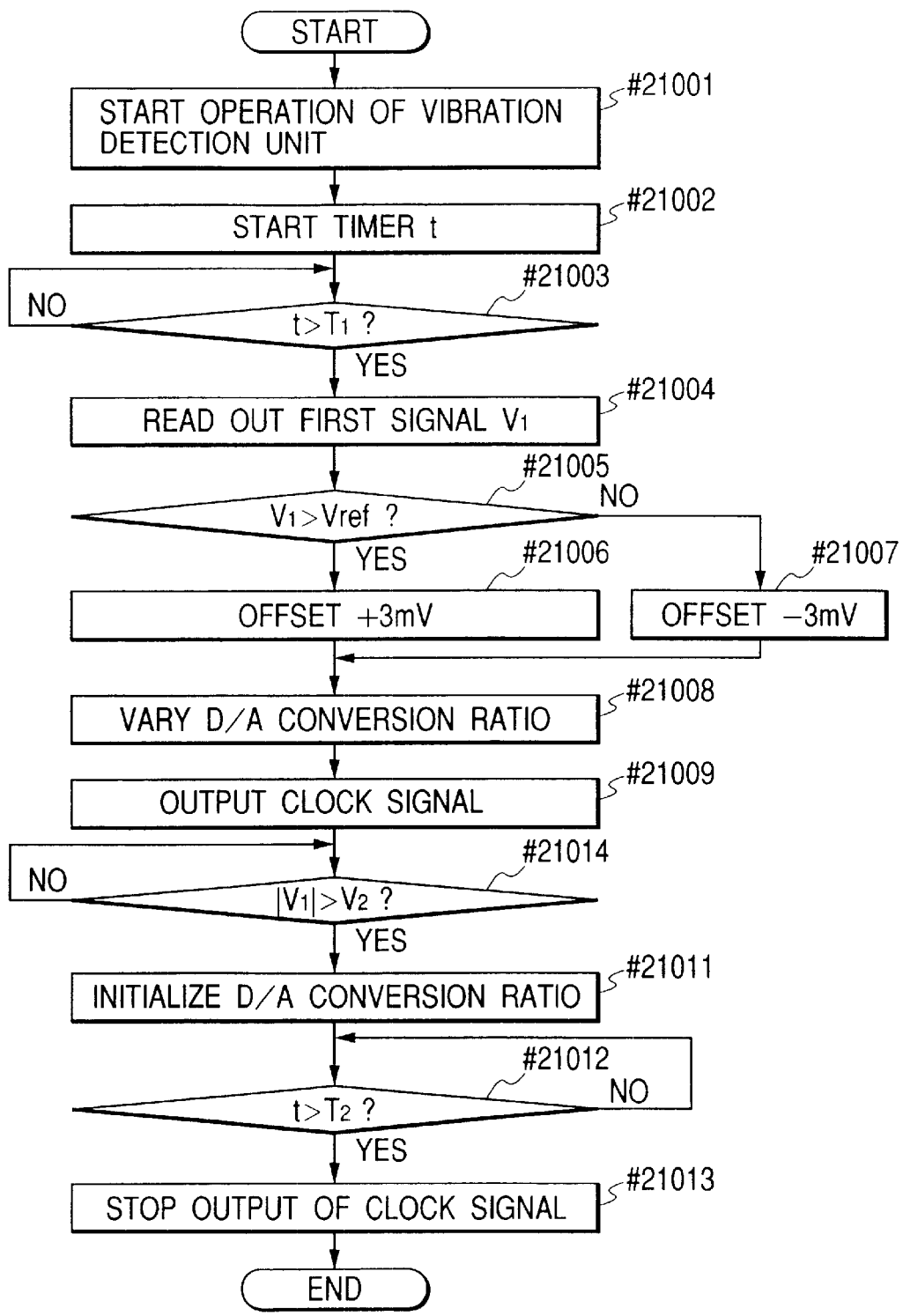
FIG. 26 is a flowchart to show a modification example obtained by modifying part of FIG. 25.

FIG. 26 is a flowchart in an example of such control, which is different from FIG. 25 only in that step #21010 is replaced by step #21014.

In step #21014, the microcomputer waits until the output $V_1$ of the first signal falls in a predetermined range $V_2$, and then goes to step #21011. This makes the timing of the initialization of the D/A conversion ratio certain, thus permitting increase of the offset removal speed.

According to the seventh embodiment described above, the apparatus for control of blur prevention is constructed of the offset attenuating means (the differential circuit 2116a, amplifier•low pass filter 2116b, clock gate 2116e, up/down counter 2116f, and D/A converter 2116g) for attenuating the offset signal superimposed on the first signal from the vibration detection device 2019 for detecting the vibration, and for outputting a second signal, the remaining offset amount fixing means (the comparator 2116j) for fixing the remaining offset amount in the second signal to the predetermined remaining offset value, and the remaining offset removing means (the camera microcomputer 2011) for removing the remaining offset amount, based on the first signal.

The apparatus for control of blur prevention is also constructed of the comparator 2116j having the predetermined dead zone, which compares the first signal from the vibration detection device 2019 or an amplified value of the first signal with the reference value, the clock gate 2116e into which the signal from the comparator 2116j is entered, the D/A converter 2116g, the up/down counter 2116f for changing the output signal from the D/A converter 2116g up or down, based on the signal from the clock gate 2116e, the differential circuit 2116a for subtracting the first signal from the signal from the D/A converter 2116g, and the camera microcomputer 2011 for subtracting the predetermined value from the signal from the differential circuit 2116a.

Noting the fact that the remaining offset amount can be predicted, the higher offset removal accuracy was able to be achieved by employing the above structure. The circuit configuration for the removal of offset signal was able to be made more compact than the conventional circuit configurations.

The apparatus for control of blur prevention is also constructed of the offset removing means for removing the offset signal superimposed on the first signal from the vibration detection device 2019 for detecting the vibration, and the offset removal amount changing means for changing the offset removal amount, and the offset removal amount changing means increases the offset removal amount from the start of the vibration detection to the predetermined time; or the offset removal amount changing means increases the offset removal amount while the first signal is greater than the predetermined value.

The apparatus for control of blur prevention is also constructed of the comparator 2116j for comparing the first signal from the vibration detection device 2019 or an amplified value of the signal with the reference value, the clock gate 2116e into which the signal is entered, the D/A converter 2116g, the up/down counter 2116f for changing the output signal from the D/A converter 2116g up or down, based on the signal from the clock gate 2116e, the camera microcomputer 2011 for changing the conversion ratio of the D/A converter 2116g depending upon the up/down counter 2116f, and the differential circuit 2116a for subtracting the signal from the D/A converter 2116g from the first signal.

Noting the fact that the offset removal speed can be made variable, the speed of offset removal was able to be increased while maintaining the accuracy thereof, by employing the above structure.

(Eighth Embodiment)

The output from the vibration detection device 2019 is subjected again to the offset removal operation in the camera microcomputer 2011 as described previously. The reason why the offset removal operation is also carried out before input of the signal into the camera computer 2011 is that the signal is prevented from becoming saturated in the amplifying process of the signal because of the offset before the A/D conversion. Therefore, the signal will not become saturated even with the offset if the signal amplification ratio is low. Then the offset removing function before the A/D conversion can be omitted.

However, quantization errors will be great in the A/D conversion, so as to degrade the blur prevention accuracy unless the signal is amplified to some extent before the A/D conversion (or unless the detection sensitivity of hand vibration is set high).

The offset component overlaid on the vibration detection device 2019 can be made sufficiently small on the occasion of production, but the offset variation due to temperature differs depending upon individuals and cannot be compensated for by simple temperature compensation. It is thus contemplated that the offset at ordinary temperature is made sufficiently small on the occasion of production and with intense temperature change the amplification factor is adjusted in such a range as not to make the signal saturated.

In this case, a large temperature change causes large quantization errors in the A/D conversion, so as to degrade the blur prevention accuracy. However, the degradation of blur prevention accuracy can be compensated for to some extent by flashing of the strobe and the shutter speed. Therefore, the apparatus can be constructed in smaller size by that degree of the exclusion of the offset removing function.

Figure 27:
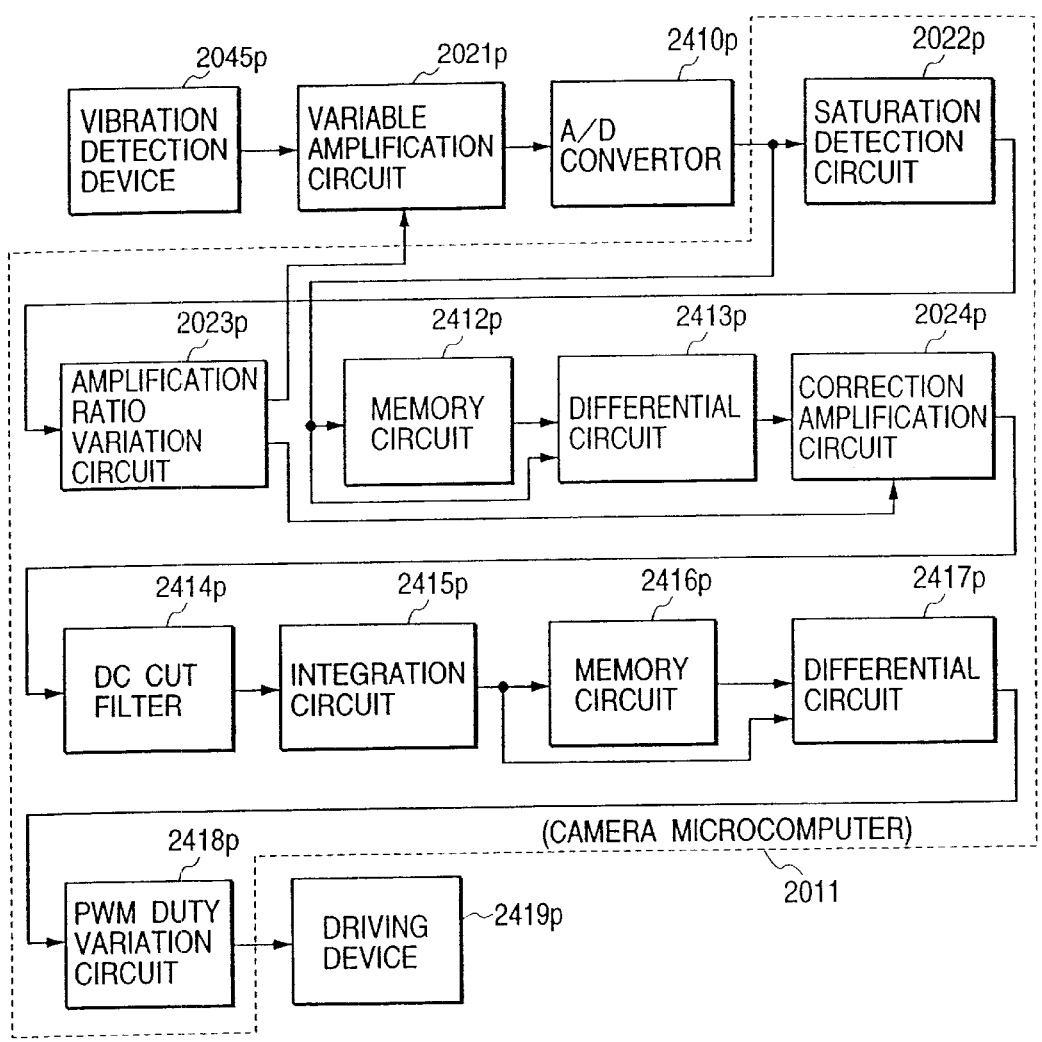
FIG. 27 is a block diagram to show the structure of the main part of the camera according to the eighth embodiment of the present invention.

FIG. 27 is a block diagram to show the circuit structure of the main part of the camera according to the eighth embodiment of the present invention, in which the components denoted by the same reference symbols as those in FIG. 32 have the same function.

FIG. 27 is different from FIG. 32 in that the DC cut filter 48p and low pass filter 49p are excluded but a variable amplification circuit 2021p is provided instead and in that the camera microcomputer 2011 incorporates a saturation detection circuit 2022p, an amplification ratio variation circuit 2023p, and a correction amplification circuit 2024p. Although these saturation detection circuit 2022p, amplification ratio variation circuit 2023p, and correction amplification circuit 2024p are illustrated as respective blocks for explanation's sake, they are actually numerical calculation portions in the camera microcomputer 2011.

The variable amplification means 2021p amplifies the signal from the vibration detection device 2045p and also carries out the noise cut operation before the A/D conversion, as the low pass filter 49p of FIG. 32 did. The saturation detection means 2022p detects the saturation of signal when the signal from the A/D converter 2410p is not less than a fixed value, and then sends the signal to the amplification ratio variation circuit 2023p. The amplification ratio variation means 2023p decreases the amplification ratio of the variable amplification circuit 2021p when accepting the signal. Repeating this operation, the signal of the vibration detection device 2045p is read out without saturation by the camera microcomputer 2011.

The amplification ratio variation circuit 2023p outputs a correction amplification signal to the correction amplification circuit 2024p. This is for keeping the blur prevention sensitivity constant by increasing the amplification ratio of the correction amplification circuit 2024p by the degree of the decrease in the amplification ratio of the variable amplification circuit 2021p.

Figure 28:
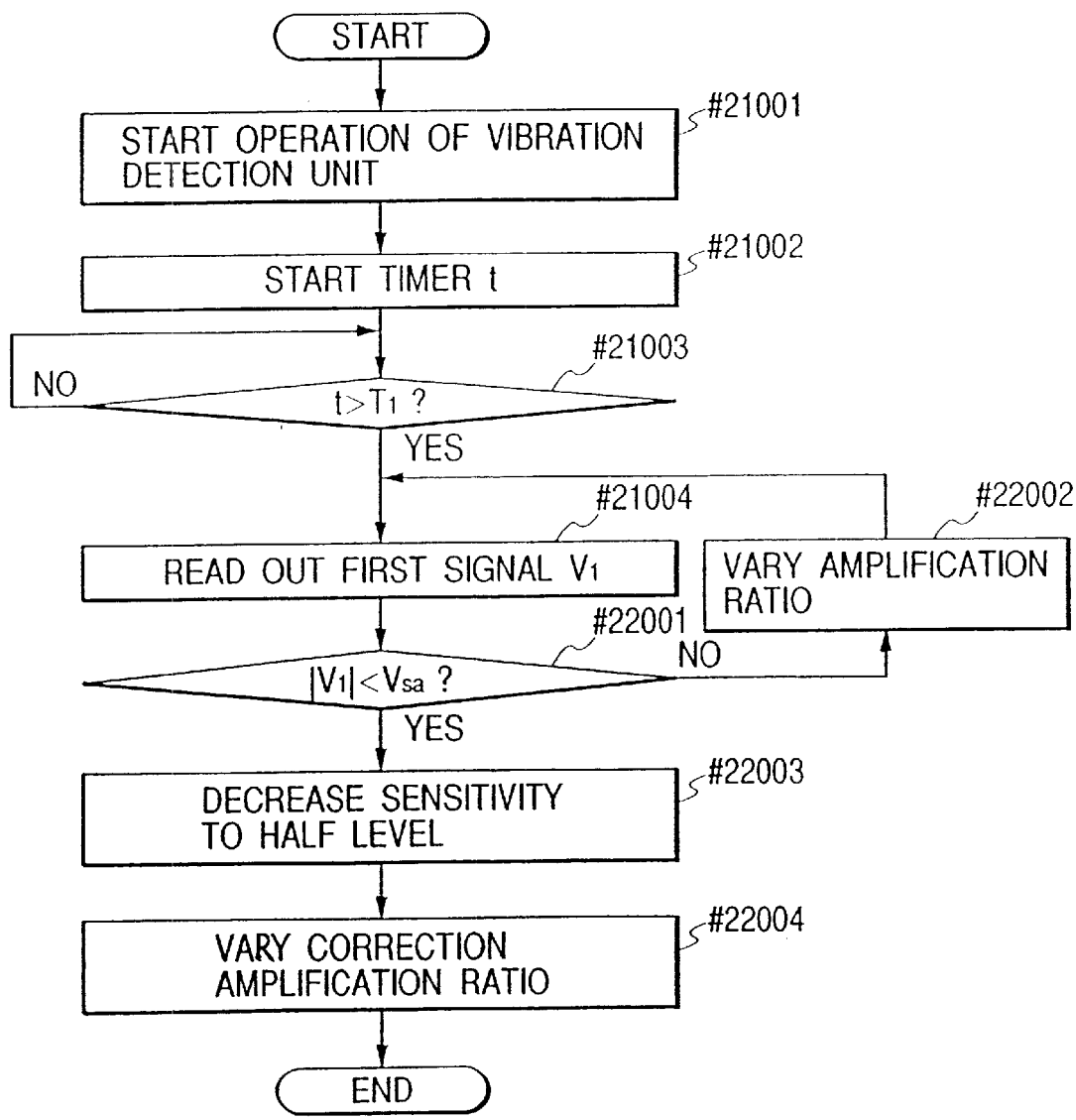
FIG. 28 is a flowchart to show the operation of the camera according to the eighth embodiment of the present invention.

FIG. 28 is a flowchart for explaining the above operation, and this flow is started with on of the main switch of the camera. Steps of carrying out the same operation as in FIG. 26 are denoted by the same step numbers.

In step #21001, the power is supplied to the vibration detection device 2045p to start the operation thereof. In next step #21002, the timer t is started. In next step #21003, the microcomputer waits for the time $T_1$ (for example, 0.1 sec) and then goes to step #21004. This is for avoiding the extraction error of offset component, because there is the large variation of offset component in the initial stage of driving of the vibration detection device 2045p, as described referring to FIG. 23A.

In next step #21004, the first signal $V_1$ from the vibration detection device 2045p is read out. In next step #22001, the microcomputer determines whether the signal $V_1$ is close to the saturation voltage Vsa and then proceeds to step #22002 if it is close to the saturation voltage;. otherwise to step #22003. In step #22002, the amplification ratio variation circuit 2023p decreases the amplification ratio of the variable amplification circuit 2021p.

By repeating the above steps #21004–#22001 #22002–#21004 . . . , the saturation of the first signal from the vibration detection device 2045p can be overcome and then the microcomputer can proceed from step #22001 to step #22003.

In next step #22003, the sensitivity of the variable amplification circuit 2021p is further decreased to a half level. This is for being ready for the following cases; the first signal from the vibration detection device 2045p also includes the actual hand vibration and the panning signal and the signal may become saturated again because of them; and the repetition of steps #21004, #22001, and #22002 can result in instantaneously canceling the saturation because of the influence of the hand vibration and then the flow goes to step #22003. In next step #22004, the amplification ratio variation circuit 2023p outputs the correction amplification signal to the correction amplification circuit 2024p to make the blur prevention sensitivity constant, and then this flow is ended.

According to the eighth embodiment described above, the apparatus for control of blur prevention is constructed of the signal amplification means (the variable amplification circuit 2021p) which amplifies the first signal from the vibration detection device 2045p for detecting the vibration, at the plurality of amplification ratios, and the amplification ratio variation means (the amplification ratio variation circuit 2023p) which varies the amplification ratio of the signal amplification means, based on the first signal or the signal from the signal amplification means.

This allows the offset removing means to be excluded, thereby accomplishing compactification of the apparatus.

(Ninth Embodiment)

Figure 29:
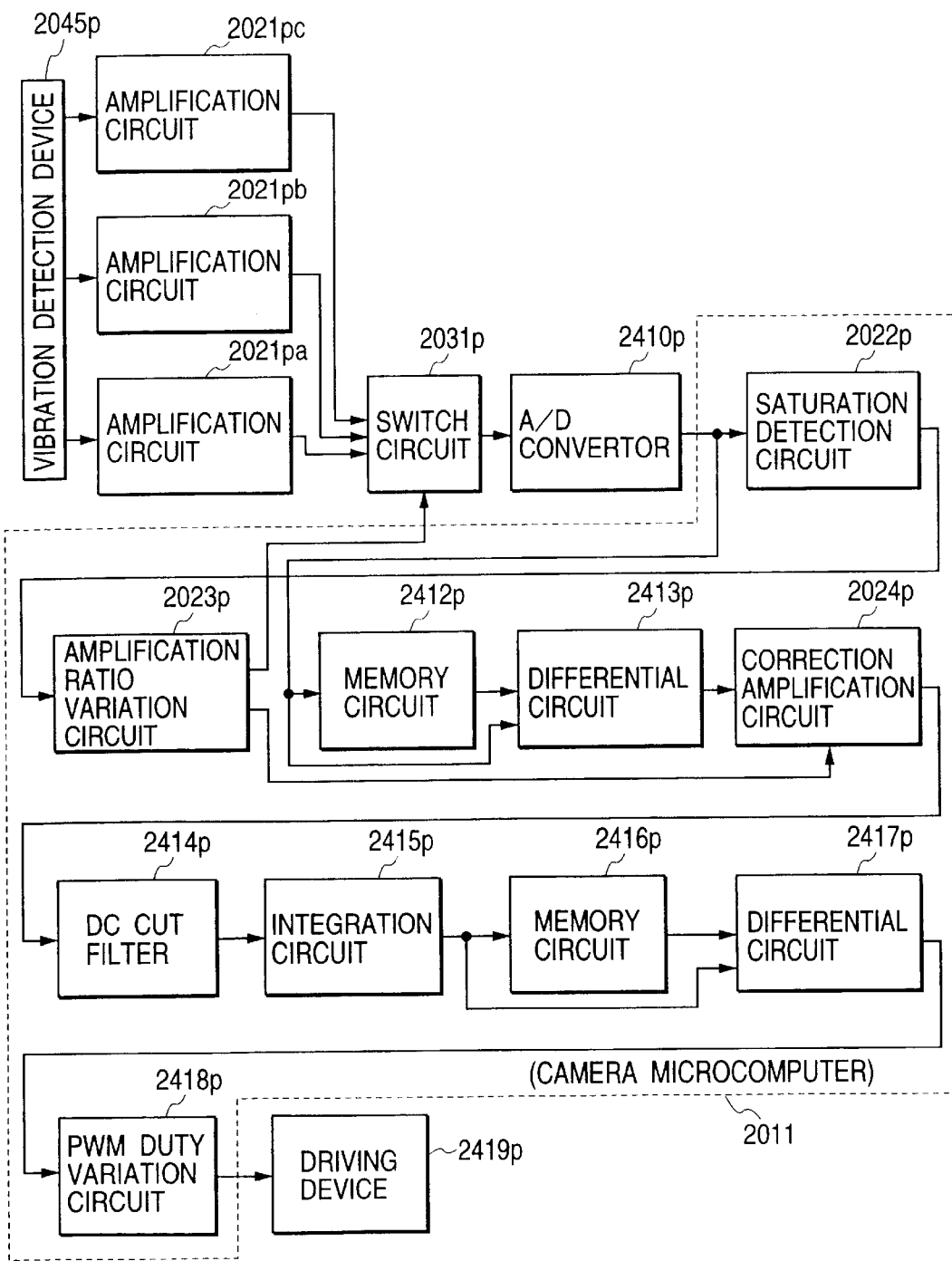
FIG. 29 is a block diagram to show the structure of the main part of the camera according to the ninth embodiment of the present invention.
Figure 30:
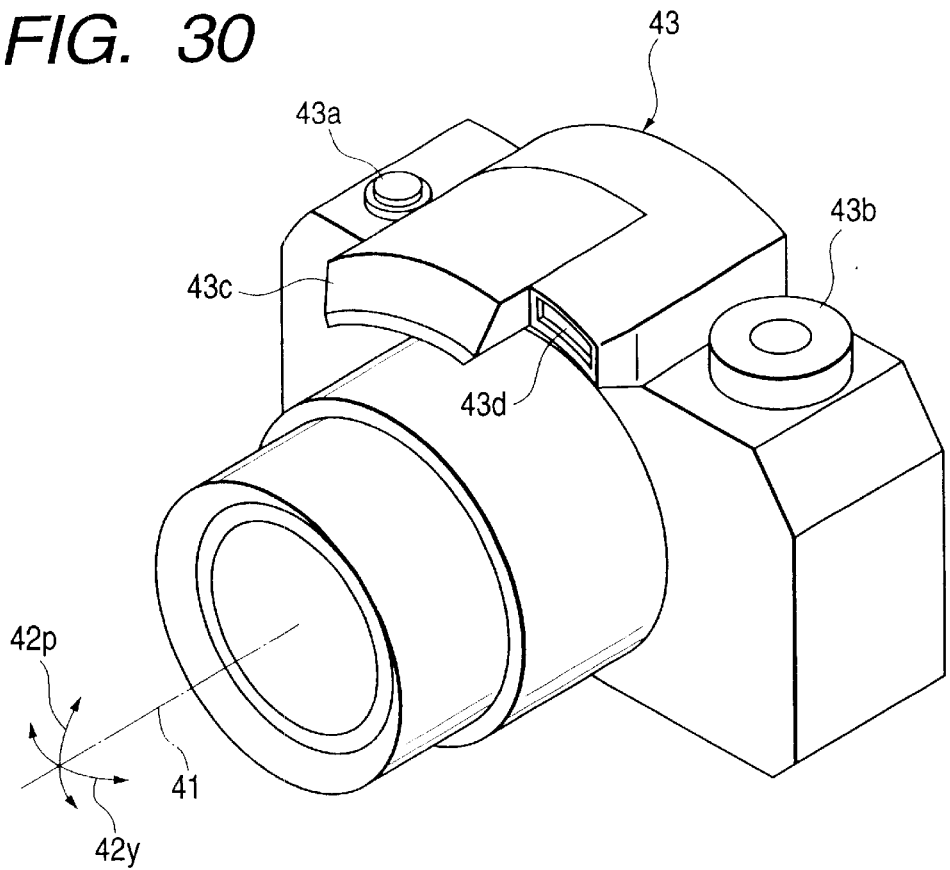
FIG. 30 is a perspective view of the camera to which the prior art and the present invention are applied.
Figure 31:
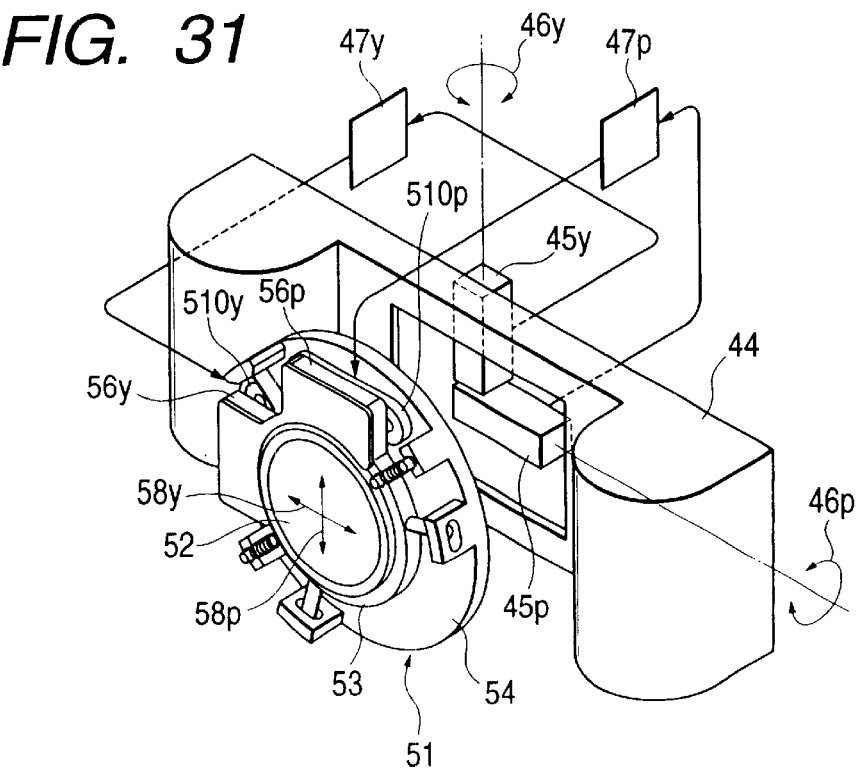
FIG. 31 is a perspective view to show the structure of the correction means installed in the camera of FIG. 30.

In above FIG. 27 the circuit configuration is slightly complex, because the amplification ratio of the variable amplification circuit 2021p can be set variably. FIG. 29 is a block diagram to show the ninth embodiment of the present invention, in which the variable amplification circuit 2021p of FIG. 27 is replaced by separate amplification circuits 2021pa, 2021pb, 2021pc fixed at three different amplification ratios. A signal from each amplification circuit is entered into a switch circuit 2031p.

The switch circuit 2031p selects one amplification circuit of an adequate amplification ratio out of the three amplification circuits 2021pa to 2021pc, based on the signal from the amplification ratio variation circuit 2023p, and then outputs the signal to the A/D converter 2410p. More specifically, the switch circuit 2031p first selects the amplification circuit 2021pa. When the saturation detection circuit 2022p detects the signal from the A/D converter 2410p over a predetermined range, the saturation detection circuit 2022p outputs the signal to the amplification ratio variation circuit 2023p, and the amplification ratio variation circuit 2023p makes the switch circuit 2031p select the amplification circuit 2021pb. If the signal from the A/D converter 2410p is within the predetermined range the control of blur prevention will be started using the amplification circuit 2021pa without variation.

When the amplification circuit 2021pb is selected, the saturation detection circuit 2022p is made again to detect the signal from the A/D converter 2410p. When the signal is over the predetermined range, the signal is outputted to the amplification ratio variation circuit 2023p and the amplification ratio variation circuit 2023p makes the switch circuit 2031p select the amplification circuit 2021pc. If the signal from the A/D converter 2410p is within the predetermined range the control of blur prevention will be started using the amplification circuit 2021pb without variation. Of course, the amplification ratio variation circuit 2023p varies the amplification ratio of the correction amplification means 2024p in conjunction with the selection of the amplification circuit 2021pa, 2021pb, or 2021pc, so as to effect such control that the overall sensitivity is kept constant.

By employing the above configuration in which there are the plurality of amplification circuits of fixed amplification ratios and either one of them is appropriately selected using the switch circuit 2031p, the circuit configuration becomes simpler than that of FIG. 27.

(Modifications)

The software and hardware configurations in each of the above embodiments can be replaced as occasion may demand.

The present invention may involve all arrangements and configurations in which all or part of the structure of each claim or each embodiment composes one device, is combined with another device, or is an element forming a device.

The structure of the invention as set forth in each claim or in each embodiment may constitute a device as a whole, may be combined with a separate or another device, or may be an element forming a device.

The present invention was described with the examples of application to the lens shutter cameras, but the present invention can also be applied to other cameras of various forms such as the single-lens reflex cameras, video cameras, etc., optical instruments and other devices than the cameras, devices applied to those cameras, optical instruments, and other devices, and elements forming them.

Further, the present invention can involve all configurations obtained by suitably combining the above embodiments or techniques thereof.

As described above, the present invention can provide the blur prevention control apparatus that is compact and lightweight and that has the higher offset signal removal accuracy.

The present invention also provides the blur prevention control apparatus that can increase the removal speed of offset signal while maintaining the accuracy of the offset signal removal.

The present invention also provides the blur prevention control apparatus that is constructed in compact size by employing the circuit configuration without saturation of the output signal from the vibration detection means in order to obviate the need for the means for offset removal.

What is claimed is:

1. A signal processing device which signal processes a vibration signal, comprising:

a vibration sensor which outputs the vibration signal;

a low pass filter circuit to which the vibration signal is input;

an offset removing circuit which determines an offset value of the vibration signal on the basis of an output signal of said low pass filter, removes the determined offset value from the vibration signal, and cause said low pass filter to output a signal from which the determined offset value is removed;

a first output line from which the offset value removed signal is output; and a second output line from which the vibration signal is output without passing through said offset removing circuit.

2. A device according to claim 1, further comprising:

a vibration correction member;

a high pass filter circuit to which the signal from said second output line is input; and a microcomputer to which an output signal of said high pass filter circuit and the signal from said first output line are input and which forms a driving signal used for driving said vibration correction member on the basis of each of the input signals.

3. An image blur prevention apparatus which includes a signal processing device for signal processing a vibration signal and a vibration correction device, comprising:

a vibration sensor which outputs the vibration signal;

a low pass filter circuit to which the vibration signal is input;

an offset removing circuit which determines an offset value of the vibration signal on the basis of an output signal of said low pass filter, removes the determined offset value from the vibration signal, and cause said low pass filter to output a signal from which the determined offset value is removed is removed; and a microcomputer which calculates a driving signal used for driving said vibration correction device on the basis of the output of said low pass filter.

4. An apparatus according to claim 3, wherein said microcomputer calculates an other driving signal for driving said vibration correction device on the basis of the vibration signal without passing through said offset removing circuit.

* * * * *

UNITED STATES PATENT AND TRADEMARK OFFICE
CERTIFICATE OF CORRECTION

PATENT NO.   : 6,393,215 B1
DATED        : May 21, 2002
INVENTOR(S)  : Koichi Washisu It is certified that error appears in the above-identified patent and that said Letters Patent is hereby corrected as shown below:

Column 2,
Line 23, "with" should read -- with the turning --;
Line 29, "such" should be deleted;
Line 30, "as" should read -- so as --;
Line 34, "that" should read -- in that --;
Line 36, "since" should read -- after --;
Line 39, "such" should be deleted; and "as" should read -- selected so as --;
Lines 40 and 45, "the" should be deleted;
Line 41, "after" should read -- after the turning --;
Line 44, "(such a" should read -- (a --; and "as" should read -- selected so as --; and
Line 47, "of" should read -- of the --.

Column 3,
Lines 3, 8, 14 and 17, "on" should read -- the turning on --;
Line 15, "such" should be deleted; and
Line 16, "as" should read -- selected so as --; and "the" (second occurrence) should be deleted.

Column 4,
Line 8, "(on" should read -- (the turning on --;
Line 9, "gains" should read -- amplifies (gains) --;
Line 11, "signal" should read -- signals --;
Lines 12 and 45, "on" should read -- the turning on --;
Line 41, "$419p$" should read -- $419p,$ --;
Line 46, "sw2" should read -- sw2, --;
Line 47, "half" should be deleted;
Line 50, "next on of the" should read -- the next turning on of --;
Line 53, "the integral" should read -- integration --; and
Line 57, "off" should read -- the turning off --.

Column 5,
Line 16, "after" should read -- after the turning --;
Lines 22 and 24, "to" should read -- so as to --;
Line 25, "(on" should read -- (the turning on --;
Line 29, "it is needless to" should be deleted;
Line 30, "mention that" should be deleted; and
Lines 49, 52 and 55, "elongate" should read -- elongated --.

Column 10,
Lines 14 and 27, "(on" should read -- (the turning on --.

UNITED STATES PATENT AND TRADEMARK OFFICE
CERTIFICATE OF CORRECTION

PATENT NO. : 6,393,215 B1
DATED : May 21, 2002
INVENTOR(S) : Koichi Washisu

It is certified that error appears in the above-identified patent and that said Letters Patent is hereby corrected as shown below:

Column 11,
Line 25, "amplifier * low" should read -- amplifier • low --;
Line 40, "$V_1$" should read -- V1 --;
Line 42, "To." should read -- $T_0$. --;
Line 55, "signals" should read -- pulse signals --;
Line 60, "clock" should read -- clock pulse --; and
Lines 62 and 65, "clocks" should read -- clock pulses --.

Column 12,
Lines 1 and 2, "clocks" should read -- clock pulses --;
Line 10, "outputted" should read -- output --;
Line 12, "clock" should read -- the clock --;
Line 31, "This is because the output of the" should be deleted; and
Lines 32 to 38, should be deleted.

Column 13,
Line 53, "over the compactification," should read -- than miniaturization --.

Column 15,
Line 14, "such cameras as to" should read -- cameras which --;
Line 35, "with" should read -- with the turning --;
Line 36, "off" should read -- off time --; and
Line 56, "time as it," should read -- time, --.

Column 16,
Lines 7 and 31, "(on" should read -- (the turning on --;
Line 8, "depressed half," should read -- half depressed, --;
Line 18, "yet before" should read -- until --;
Line 46, "whether" should read -- it is determined whether --; and
Line 47, "mode is determined." should read -- mode. --.

Column 17,
Line 4, "with" should read -- by --;
Line 7, "after" should read -- after the turning --;
Line 8, "thus" should read -- thus, --;
Line 12, "since" should read -- since the turning --;
Line 19, "depressed half." should read -- half depressed. --;
Line 20, "depressed half," should read -- half depressed, --; and
Line 22, "terminated" should read -- terminated, --.

UNITED STATES PATENT AND TRADEMARK OFFICE
CERTIFICATE OF CORRECTION

PATENT NO.   : 6,393,215 B1
DATED        : May 21, 2002
INVENTOR(S)  : Koichi Washisu It is certified that error appears in the above-identified patent and that said Letters Patent is hereby corrected as shown below:

Column 18,
Lines 15 and 17, "(upon" should read -- (upon the turning --;
Line 64, "(hereinafter" should be deleted; and
Line 65, "also referred to as a" should be deleted.

Column 19,
Line 39, "from" should read -- from the turning --.

Column 20,
Line 29, "can realize" should read -- realizes --;
Line 43, "the high pass" should be deleted; and
Lines 44 and 45, should be deleted.

Column 22,
Line 27, "(on" should read -- (the turning on --.

Column 23,
Line 12, "clock." should read -- clock pulse. --;
Line 25, "turned on first," should read -- first turned on, --;
Line 35, "To." should read -- $T_0$. --;
Lines 54, 65 and 67, "clock" should read -- clock pulse --; and
Lines 56, 59 and 63 "clocks" should read -- clock pulses --;

Column 24,
Line 52, "compactified considerably." should read -- made considerably compact. --.

Column 25,
Line 35, (close up right margin);
Line 36, (close up left margin);
Line 49, "clock" should read -- clock pulse --;
Line 51, "signal." should read -- signal pulse. --;
Line 52, "clock." should read -- clock pulse. --;
Line 62, "every" should read -- for every --; and "signal" should read -- signal pulse --;
Line 65, "signal" should read -- signal pulses --;
Line 66, "as to" should read -- which --; and
Line 67, "attenuate" should read -- attenuates --.

Column 26,
Line 8, "Thanks to it, the" should read -- The --; and
Line 29, "FIG. 10." should read -- FIG. 20. --.

UNITED STATES PATENT AND TRADEMARK OFFICE
CERTIFICATE OF CORRECTION

PATENT NO. : 6,393,215 B1
DATED : May 21, 2002
INVENTOR(S) : Koichi Washisu

It is certified that error appears in the above-identified patent and that said Letters Patent is hereby corrected as shown below:

Column 27,
Line 30, "can be increased" should be deleted; "clock signals" should read -- clock pulse signals --; and "outputted" should read -- output --;
Line 32, "1116e" should read -- 1116e can be increased, --;
Line 34, "to shutter chances." should read -- to photo opportunities (shutter chances). --; and
Line 63, "depressed half" should read -- half depressed --.

Column 28,
Lines 37 and 58, "signals" should read -- pulse signals --;
Lines 38 and 59, "signals" should read -- pulse signals --; and "clocks" should read -- clock pulses --;
Lines 40 and 61, "clocks" should read -- clock pulses --;
Line 46, "clock." should read -- clock pulses. --;
Line 64, (close up right margin); and
Line 65, (close up left margin).

Column 30,
Line 4, (close up right margin);
Line 5, (close up left margin);
Lines 43 and 47, "as to attenuate the" should read -- which attenuates --;
Line 51, "as to attenuate" should read -- which attenuates --;
Line 52, "the" (first occurrence) should be deleted; and
Line 58, "circumstances" should read -- circumstances, --.

Column 35,
Line 20, "present). When" should read -- present). ¶ When --;
Lines 28 and 30, "clock." should read -- clock pulse. --;
Line 41, "on first," should read -- on, --; and
Line 50, "To." should read -- $T_0$. --.

Column 36,
Line 1, "clock" should read -- clock pulse --;
Lines 3 and 6, "clocks" should read -- clock pulses --;
Line 12, "of" should read -- of the --; and
Line 43, "be compactified considerably." should read -- be made considerably more compact. --.

Column 37,
Line 60, "with" should read -- with the turning --; and
Line 61, "during off" should read -- during the off state --.

UNITED STATES PATENT AND TRADEMARK OFFICE
CERTIFICATE OF CORRECTION

PATENT NO. : 6,393,215 B1
DATED : May 21, 2002
INVENTOR(S) : Koichi Washisu

It is certified that error appears in the above-identified patent and that said Letters Patent is hereby corrected as shown below:

Column 38,
Line 43, "clock" should read -- clock pulse --.

Column 40,
Line 67, "with" should read -- with the turning on --.

Column 41,
Line 50, "compactification" should read -- miniaturization --.

Column 42,
Lines 26, 54, 56 and 60, "the" should read -- a --;
Lines 38-41 should be deleted;
Line 42, "the" (second occurrence) should be deleted;
Line 43, "the" (first occurrence) should be deleted;
Line 45, "forms" should read -- forms, --; and "the" should be deleted;
Line 46, "than the" should read -- other than --;
Line 52, "can provide the" should read -- provides a --;
Line 57, "of" should read -- of an --;
Line 62, "the" (first occurrence) should read -- a --; and
Line 64, "the" (second occurrence) should be deleted.

Signed and Sealed this

Ninth Day of August, 2005

JON W. DUDAS
*Director of the United States Patent and Trademark Office*